July 9, 1957 C. B. SMITH 2,798,554

DATA TRANSFER APPARATUS

Filed Dec. 30, 1955 36 Sheets-Sheet 1

INVENTOR.
CHARLES B. SMITH
BY Charles [signature]
AGENT

| CHARACTER | CARD CODE | TYPE 650 CODE |
|---|---|---|
| BLANK | | = 00 |
| A | 12-1 | = 61 |
| B | 12-2 | = 62 |
| C | 12-3 | = 63 |
| D | 12-4 | = 64 |
| E | 12-5 | = 65 |
| F | 12-6 | = 66 |
| G | 12-7 | = 67 |
| H | 12-8 | = 68 |
| I | 12-9 | = 69 |
| J | 11-1 | = 71 |
| K | 11-2 | = 72 |
| L | 11-3 | = 73 |
| M | 11-4 | = 74 |
| N | 11-5 | = 75 |
| O | 11-6 | = 76 |
| P | 11-7 | = 77 |
| Q | 11-8 | = 78 |
| R | 11-9 | = 79 |
| S | 0-2 | = 82 |
| T | 0-3 | = 83 |
| U | 0-4 | = 84 |
| V | 0-5 | = 85 |
| W | 0-6 | = 86 |
| X | 0-7 | = 87 |
| Y | 0-8 | = 88 |
| Z | 0-9 | = 89 |
| 0 | 0 | = 90 |
| 1 | 1 | = 91 |
| 2 | 2 | = 92 |
| 3 | 3 | = 93 |
| 4 | 4 | = 94 |
| 5 | 5 | = 95 |
| 6 | 6 | = 96 |
| 7 | 7 | = 97 |
| 8 | 8 | = 98 |
| 9 | 9 | = 99 |

BIQUINARY CODE

| DIGIT | $Q_0$ | $Q_1$ | $Q_2$ | $Q_3$ | $Q_4$ | $B_0$ | $B_5$ |
|---|---|---|---|---|---|---|---|
| 0 | X | | | | | X | |
| 1 | | X | | | | X | |
| 2 | | | X | | | X | |
| 3 | | | | X | | X | |
| 4 | | | | | X | X | |
| 5 | X | | | | | | X |
| 6 | | X | | | | | X |
| 7 | | | X | | | | X |
| 8 | | | | X | | | X |
| 9 | | | | | X | | X |

July 9, 1957 C. B. SMITH 2,798,554

DATA TRANSFER APPARATUS

Filed Dec. 30, 1955 36 Sheets-Sheet 3

July 9, 1957 C. B. SMITH 2,798,554

DATA TRANSFER APPARATUS

Filed Dec. 30, 1955 36 Sheets-Sheet 4

July 9, 1957 C. B. SMITH 2,798,554

DATA TRANSFER APPARATUS

Filed Dec. 30, 1955 36 Sheets-Sheet 5

July 9, 1957 C. B. SMITH 2,798,554

DATA TRANSFER APPARATUS

Filed Dec. 30, 1955 36 Sheets-Sheet 7

July 9, 1957 C. B. SMITH 2,798,554

DATA TRANSFER APPARATUS

Filed Dec. 30, 1955 36 Sheets-Sheet 8

July 9, 1957 C. B. SMITH 2,798,554

DATA TRANSFER APPARATUS

Filed Dec. 30, 1955 36 Sheets-Sheet 9

July 9, 1957 C. B. SMITH 2,798,554

DATA TRANSFER APPARATUS

Filed Dec. 30, 1955 36 Sheets-Sheet 10

July 9, 1957 C. B. SMITH 2,798,554

DATA TRANSFER APPARATUS

Filed Dec. 30, 1955 36 Sheets-Sheet 11

July 9, 1957 C. B. SMITH 2,798,554

DATA TRANSFER APPARATUS

Filed Dec. 30, 1955 36 Sheets-Sheet 12

July 9, 1957 C. B. SMITH 2,798,554

DATA TRANSFER APPARATUS

Filed Dec. 30, 1955 36 Sheets-Sheet 14

July 9, 1957 C. B. SMITH 2,798,554

DATA TRANSFER APPARATUS

Filed Dec. 30, 1955 36 Sheets-Sheet 15

July 9, 1957 C. B. SMITH 2,798,554

DATA TRANSFER APPARATUS

Filed Dec. 30, 1955 36 Sheets-Sheet 16

July 9, 1957 C. B. SMITH 2,798,554

DATA TRANSFER APPARATUS

Filed Dec. 30, 1955 36 Sheets-Sheet 19

July 9, 1957 C. B. SMITH 2,798,554

DATA TRANSFER APPARATUS

Filed Dec. 30, 1955 36 Sheets-Sheet 20

July 9, 1957 C. B. SMITH 2,798,554

DATA TRANSFER APPARATUS

Filed Dec. 30, 1955 36 Sheets-Sheet 21

July 9, 1957 C. B. SMITH 2,798,554

DATA TRANSFER APPARATUS

Filed Dec. 30, 1955 36 Sheets-Sheet 23

July 9, 1957 C. B. SMITH 2,798,554

DATA TRANSFER APPARATUS

Filed Dec. 30, 1955 36 Sheets-Sheet 26

July 9, 1957 C. B. SMITH 2,798,554

DATA TRANSFER APPARATUS

Filed Dec. 30, 1955 36 Sheets-Sheet 30

July 9, 1957 C. B. SMITH 2,798,554

DATA TRANSFER APPARATUS

Filed Dec. 30, 1955 36 Sheets-Sheet 32

July 9, 1957 C. B. SMITH 2,798,554

DATA TRANSFER APPARATUS

Filed Dec. 30, 1955 36 Sheets-Sheet 33

July 9, 1957 C. B. SMITH 2,798,554

DATA TRANSFER APPARATUS

Filed Dec. 30, 1955 36 Sheets-Sheet 34

July 9, 1957 C. B. SMITH 2,798,554

DATA TRANSFER APPARATUS

Filed Dec. 30, 1955 36 Sheets-Sheet 35

July 9, 1957 C. B. SMITH 2,798,554

DATA TRANSFER APPARATUS

Filed Dec. 30, 1955 36 Sheets-Sheet 36

United States Patent Office 2,798,554

Patented July 9, 1957

2,798,554

DATA TRANSFER APPARATUS

Charles B. Smith, Vestal, N. Y., assignor to International Business Machines Corporation, New York, N. Y., a corporation of New York Application December 30, 1955, Serial No. 556,598

34 Claims. (Cl. 164—115)

This invention relates to data transfer apparatus, and more particularly to the controls and circuitry for introducing alphabetic and/or numeric information into and out of a magnetic storage device.

Many high-speed digital calculators utilize a rotating magnetic drum as the storage medium for information that is to be or has been processed by the calculator. Storage devices of this type are characterized by large storage capacity and rapid access to the data stored therein. Prior to the processing operations it is necessary to introduce the data which is to be processed into the calculator and after processing to store the results of the processing in other storage media such as punched record cards. The employment of punched cards of the well-known IBM type as an input means to computing machines as well as a storage medium for the output data from computing machines is well known. Heretofore, data processing machines of this type have been limited to the handling of digital information only. There is at the present time a need for a practical form of apparatus which will enable the recognition of alphabetic and/or numeric information in a record card which includes control means for directing the reading of data from the record card and data conversion circuitry for causing the data to be entered into the magnetic storage means. Also there is need for a practical form of apparatus which will enable the recognition of alphabetic and/or numeric information stored in the magnetic storage means and to enable the read-out of data therefrom for conversion and transfer into punched record cards.

It is a prime object of this invention to provide improved data sensing, control and transfer mechanism for such a machine.

Another object is to provide improved means for converting data according to one configuration into a different configuration for magnetic recording purposes.

Another object is to provide improved means for introducing alphabetic and/or numeric data from storage means, such as a record card, to the surface of a magnetic storage medium.

Another object of this invention is to provide an improved form of recording apparatus which functions to record data according to a predetermined pattern.

Another object is to provide improved mechanism for transferring data from a slow access data source into a high-speed data processing machine.

Another object is to provide improved mechanism for transferring alphabetic and/or numeric data from a high-speed data processing machine to storage media of slow entry time.

Other objects of the invention will be pointed out in the following description and claims and illustrated in the accompanying drawings, which disclose, by way of examples, the principle of the invention and the best mode, which has been contemplated, of applying that principle.

Figs 7*a* through 7*h* and 7*j* through 7*r* constitute a block diagram of the circuits for the data transfer system.

Figure 7A:
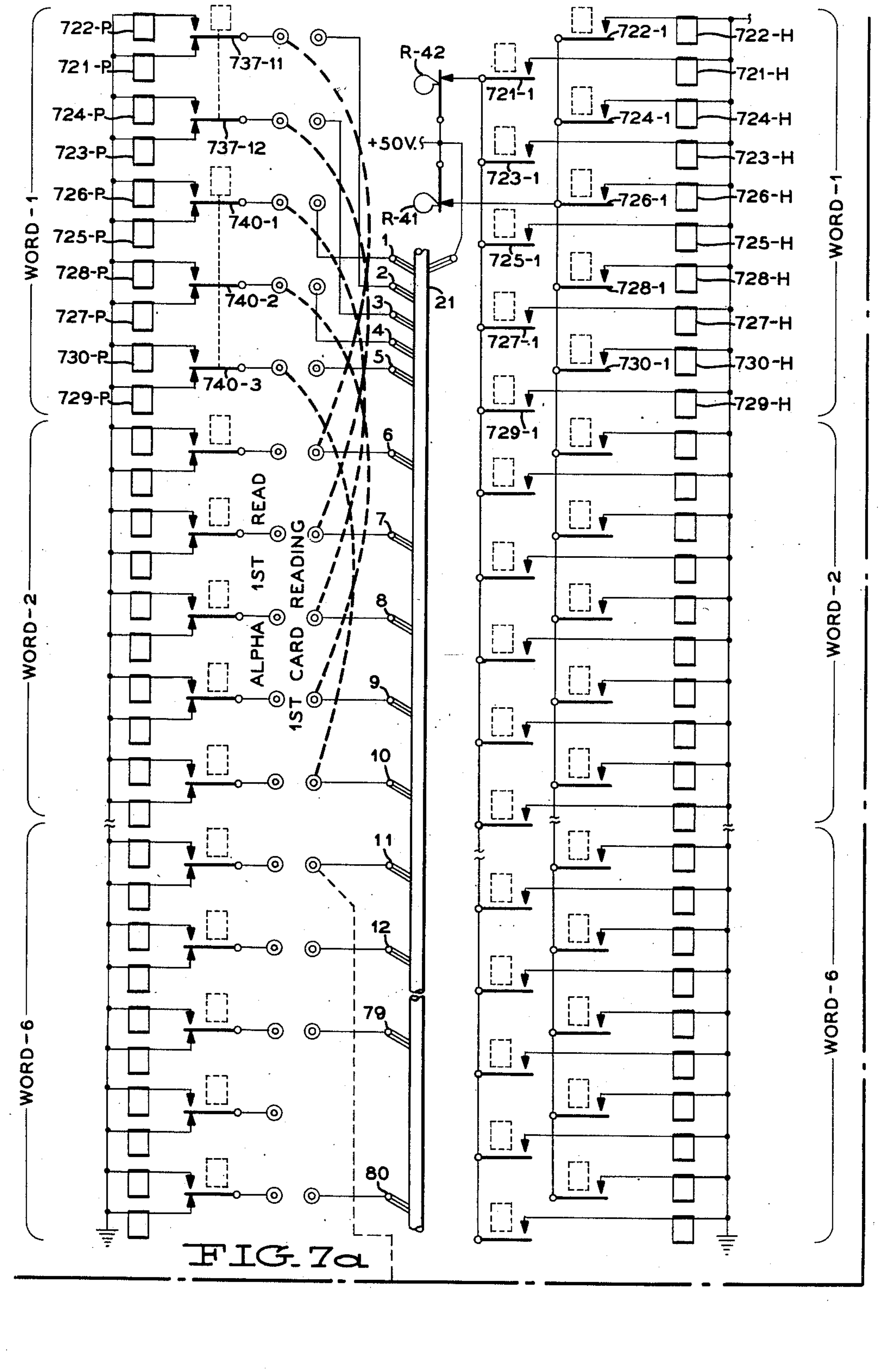
Figure 7B:
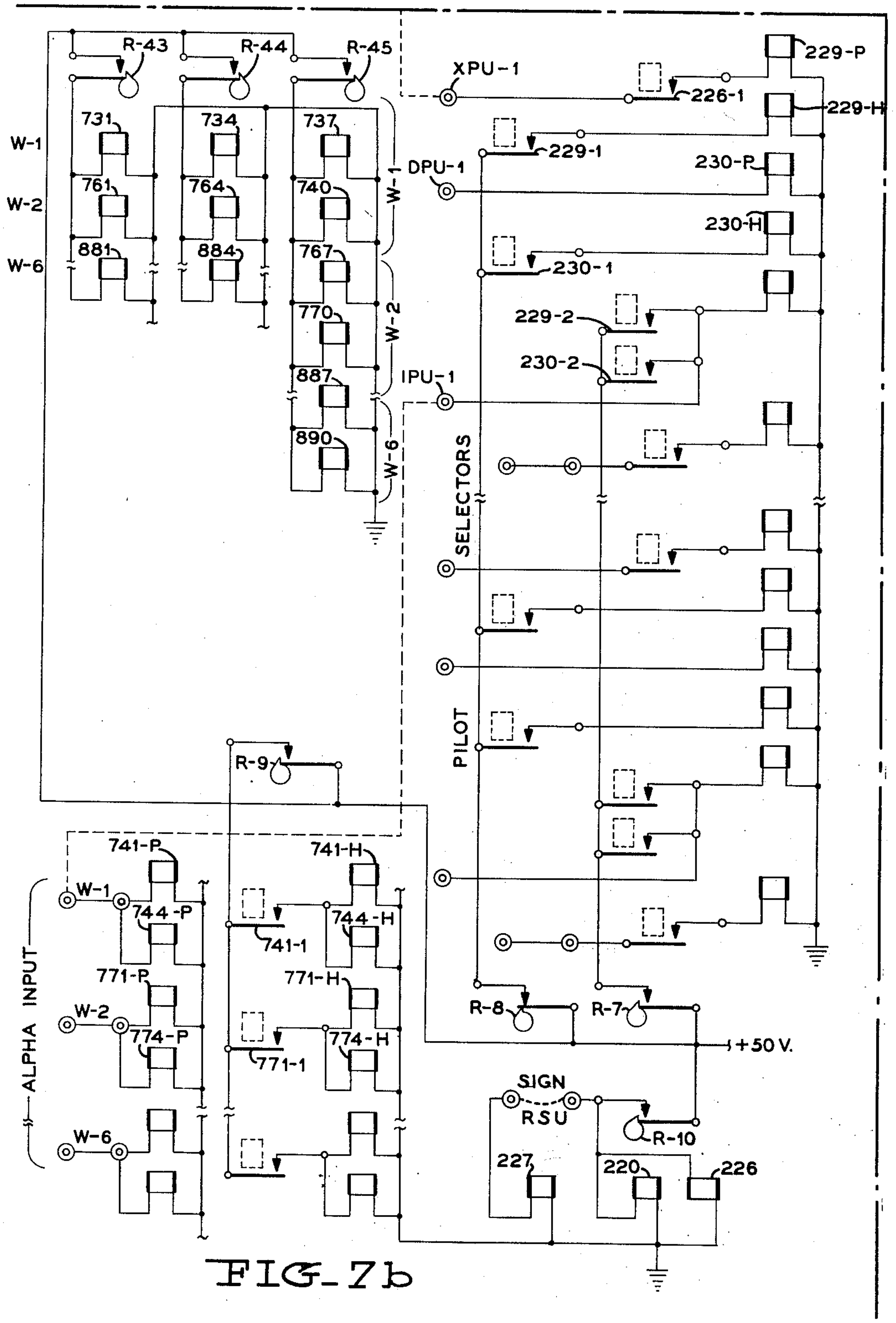
Figure 7C:
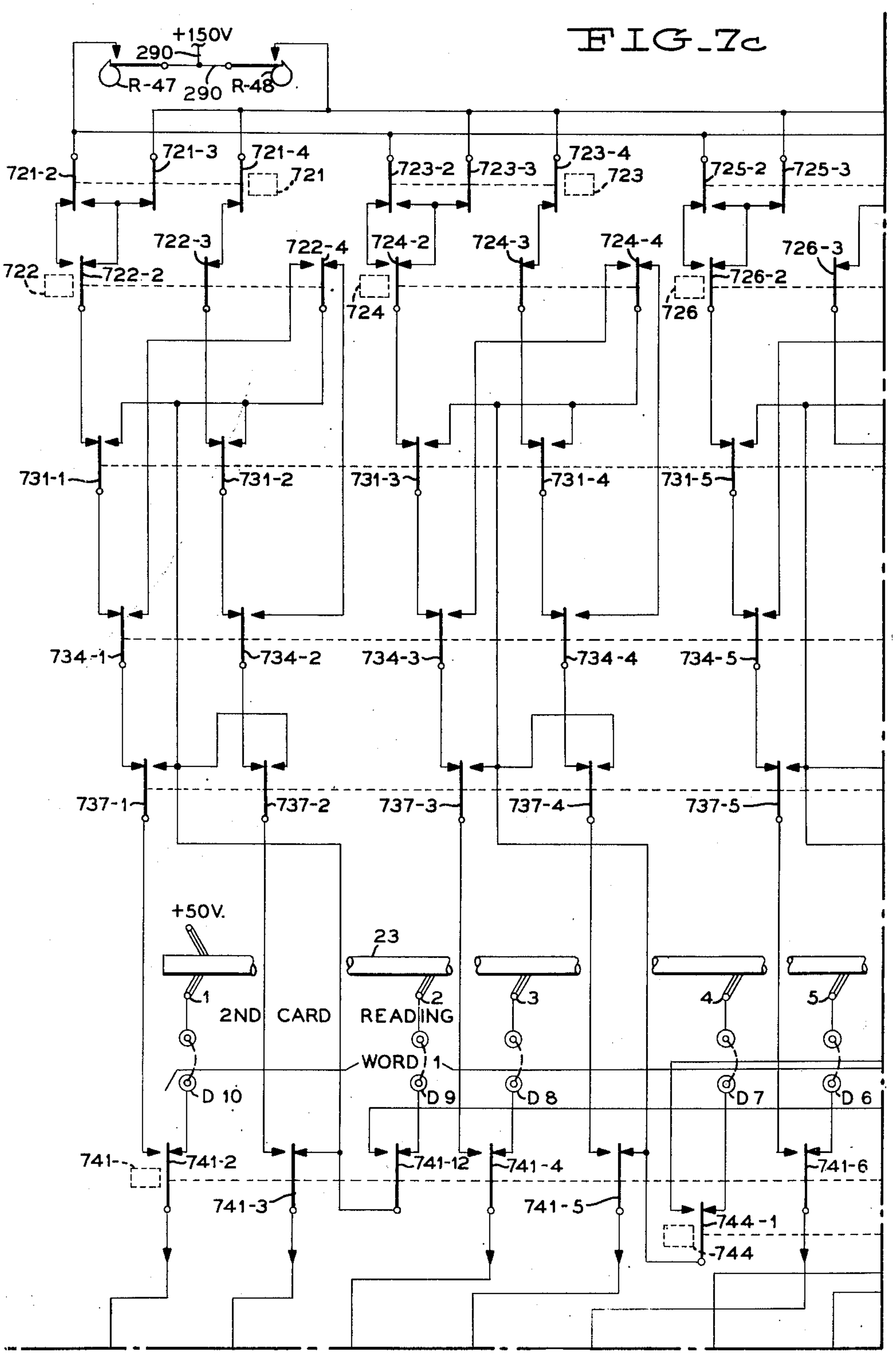
Figure 7D:
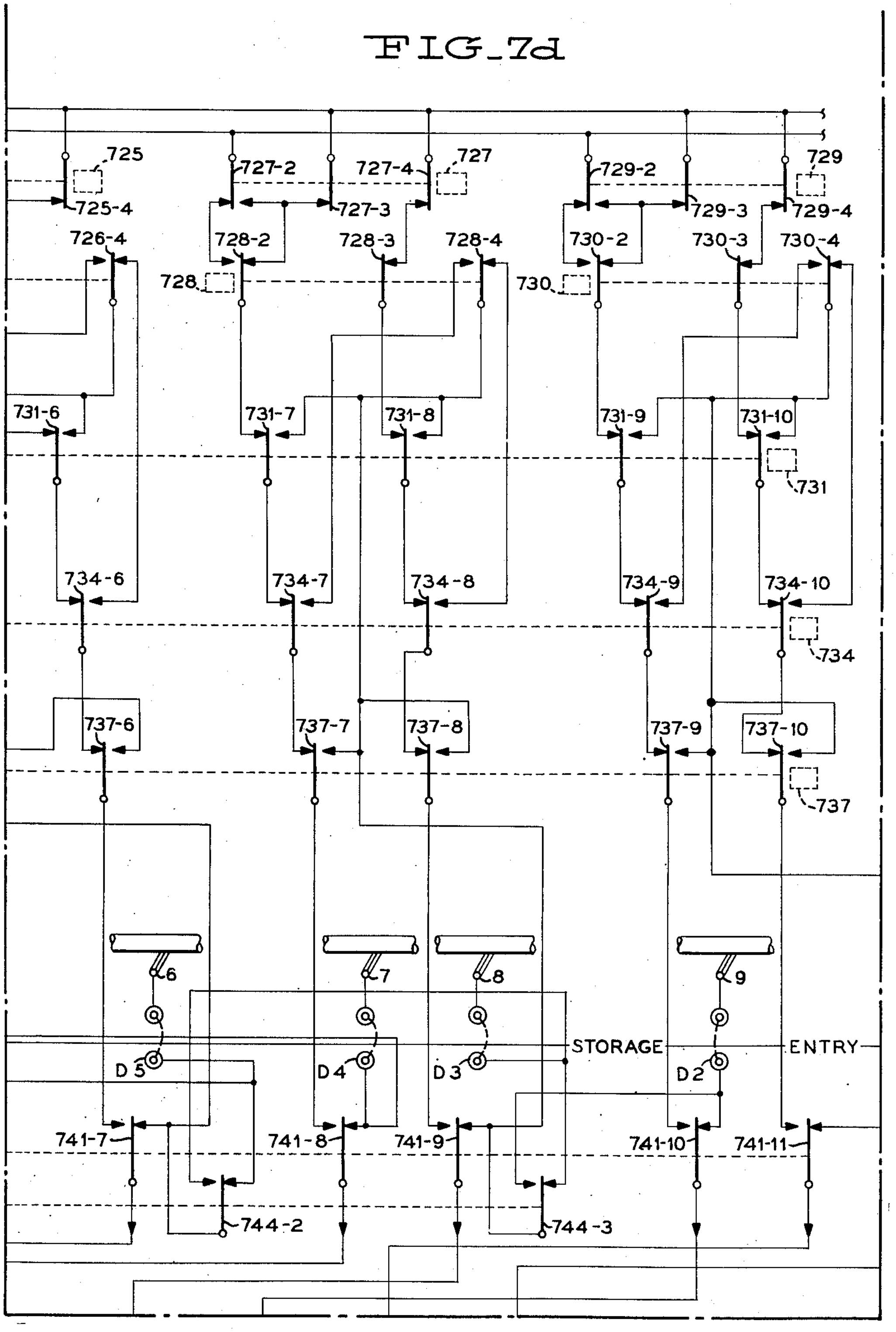
Figure 8:
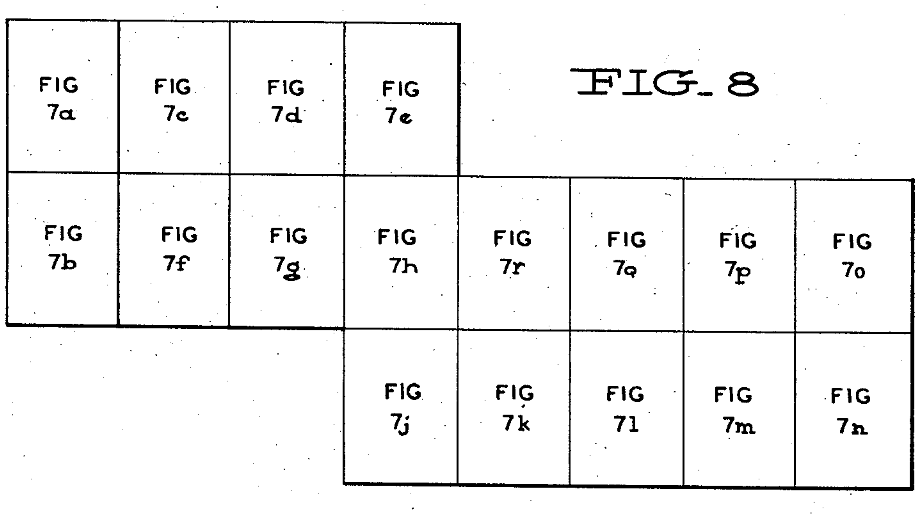

Fig. 8 is a diagram showing the manner in which Figs. 7*a* through 7*h* and 7*j* through 7*r* should be joined together.

Figure 9:
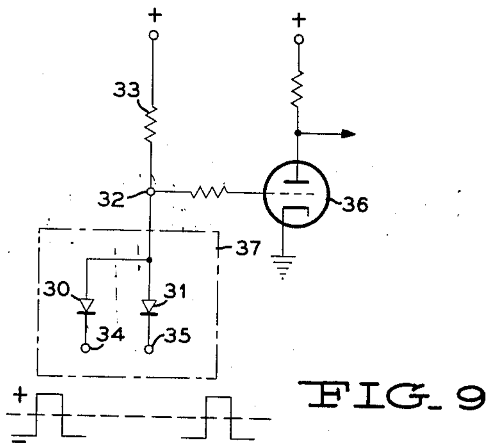

Fig. 9 is the circuit detail for a typical "and" switch.

Figure 10:
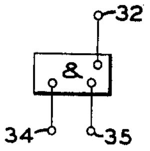

Fig. 10 is the symbolic representation for the "and" (&) circuit shown in Fig. 9.

Figure 11:
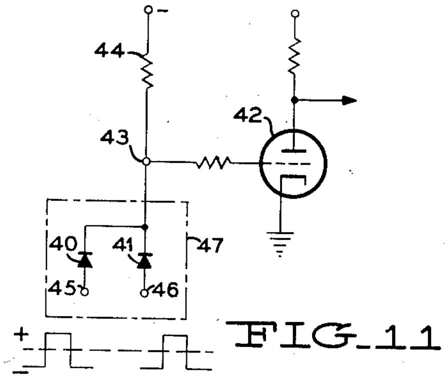

Fig. 11 is the circuit detail for a typical "or" switch.

Figure 12:
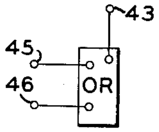

Fig. 12 is a symbolic representation for the "or" circuit shown in Fig. 11.

Figure 13:
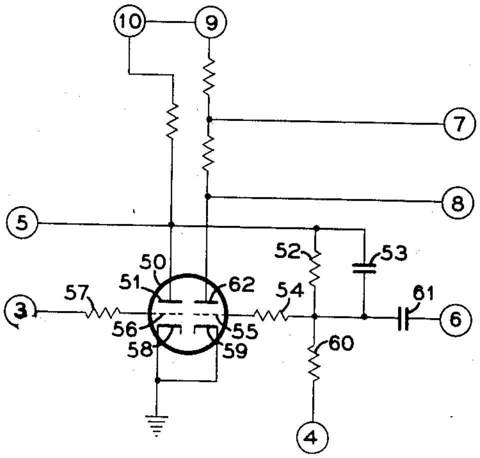

Fig. 13 is the circuit detail for an "IN–1" type double inverter amplifier.

Figure 14:
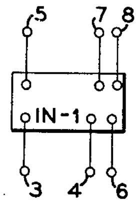

Fig. 14 is a symbolic representation for the "IN–1" type double inverter amplifier circuit shown in Fig. 13.

Figure 15:
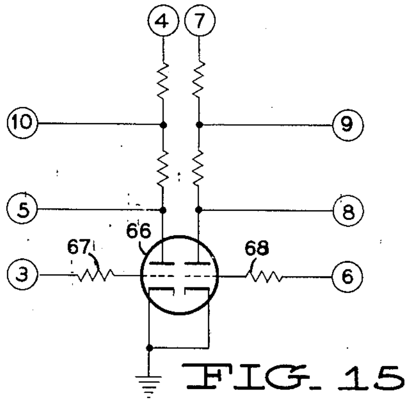

Fig. 15 is the circuit detail for an "IN–3" type double inverter amplifier.

Figure 16:
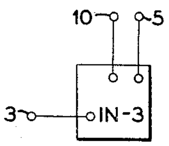

Fig. 16 is a symbolic representation for the "IN–3" type double inverter amplifier circuit shown in Fig. 15.

Figure 17:
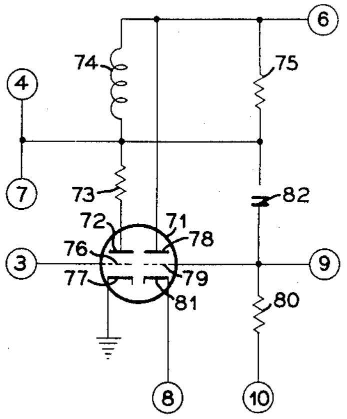

Fig. 17 is the circuit detail for a "PW–2" type amplifier unit.

Figure 18:
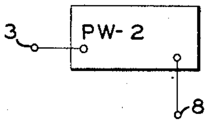

Fig. 18 is a symbolic representation for the "PW–2" type amplifier unit shown in Fig. 17.

Figure 19:
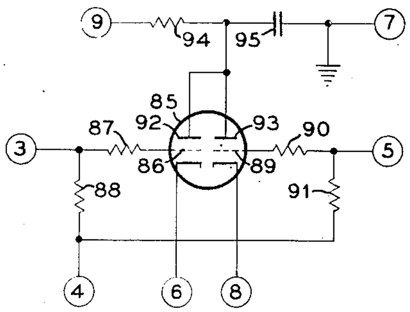

Fig. 19 is the circuit detail for a "PW–3" type power amplifier unit.

Figure 20:
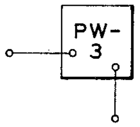

Fig. 20 is a symbolic representation for the "PW–3" type power amplifier unit shown in Fig. 19.

Figure 21:
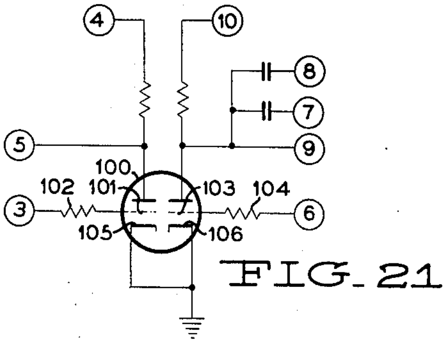

Fig. 21 is the circuit detail for a "PW–4" type power amplifier unit.

Figure 22:
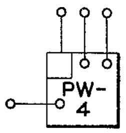

Fig. 22 is a symbolic representation for the "PW–4" type power amplifier unit shown in Fig. 21.

Figure 23:
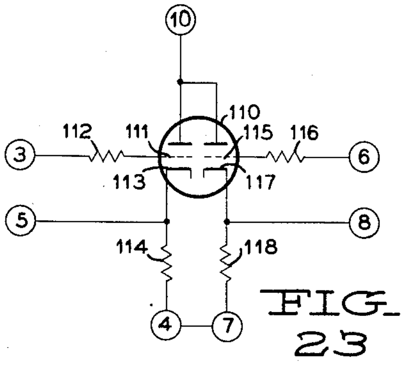

Fig. 23 is the circuit detail for a "PW–5" type power amplifier unit.

Figure 24:
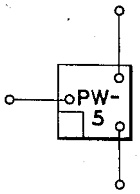

Fig. 24 is a symbolic representation for the "PW–5" type power amplifier unit shown in Fig. 23.

Figure 25:
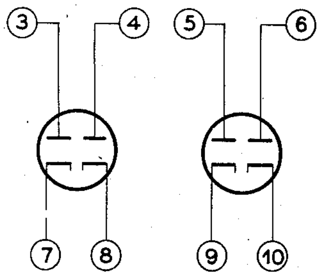

Fig. 25 is the circuit detail for a "DD–1" type double diode unit.

Figure 26:
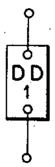

Fig. 26 is a symbolic representation for the "DD–1" type double diode unit shown in Fig. 25.

Figure 27:
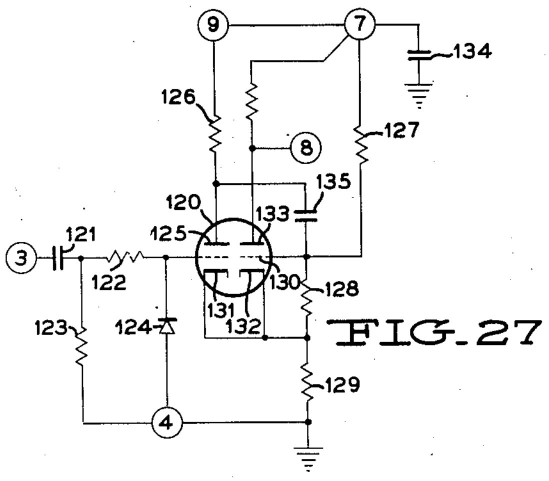

Fig. 27 is the circuit detail for a "SA–1" type shaping amplifier unit.

Figure 28:
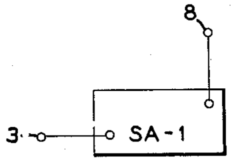

Fig. 28 is a symbolic representation for the "SA–1" type shaping amplifier unit shown in Fig. 27.

Figure 29:
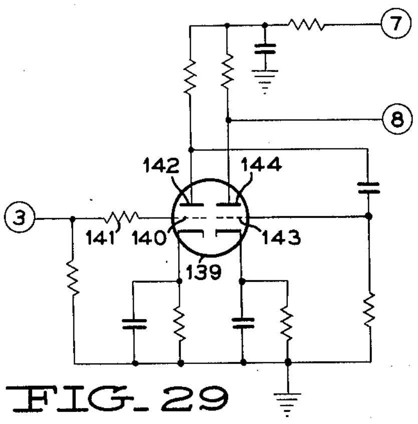

Fig. 29 is the circuit detail for a "VA–1" type voltage amplifier unit.

Figure 30:
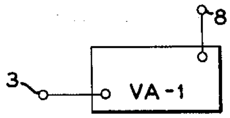

Fig. 30 is a symbolic representation for the "VA–1" type voltage amplifier unit shown in Fig. 29.

Figure 31:
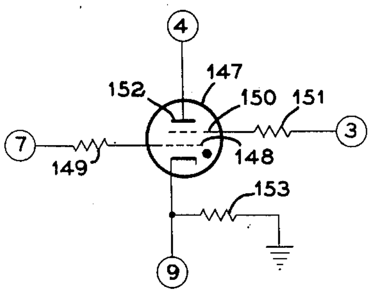

Fig. 31 is the circuit detail for a "TH–1" type thyratron unit.

Figure 32:
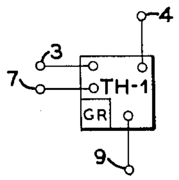

Fig. 32 is a symbolic representation for the "TH–1" type thyratron unit shown in Fig. 31.

Figure 33:
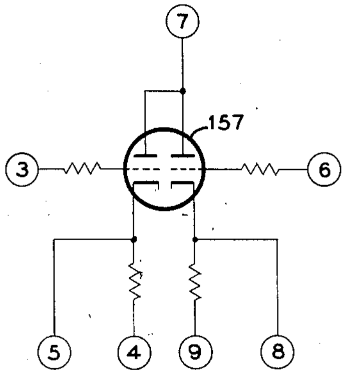

Fig. 33 is the circuit detail for a "CF–1" type cathode follower unit.

Figure 34:
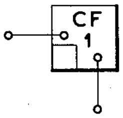

Fig. 34 is a symbolic representation for the "CF–1" type cathode follower unit shown in Fig. 33.

Figure 35:
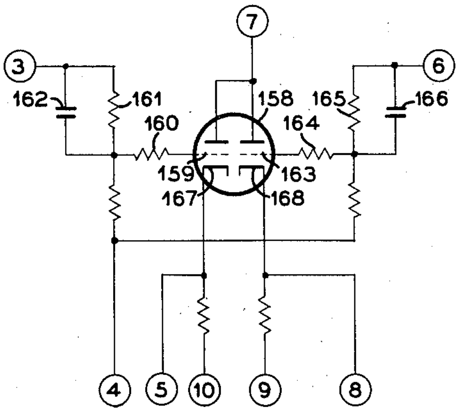

Fig. 35 is the circuit detail for a "CF–3" type cathode follower unit.

Figure 36:
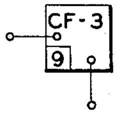

Fig. 36 is a symbolic representation for the "CF–3" type cathode follower unit shown in Fig. 35.

Figure 37:
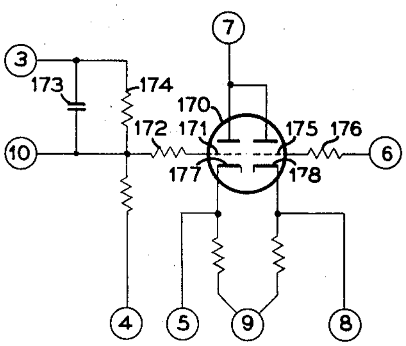

Fig. 37 is the circuit detail for a "CF–6" type cathode follower unit.

Figure 39:
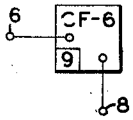
Figure 38:
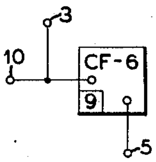

Figs. 38 and 39 are symbolic representations for the left and right halves, respectively, of the cathode follower unit shown in Fig. 37.

Figure 40:
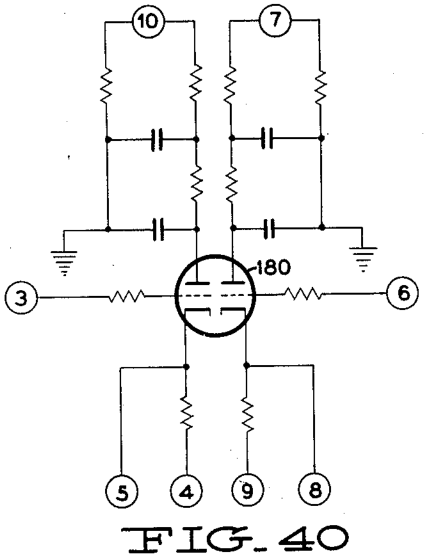

Fig. 40 is the circuit detail for a "CF–7" type cathode follower unit.

Figure 41:
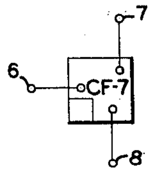

Fig. 41 is a symbolic representation for the "CF–7" type cathode follower unit shown in Fig. 40.

Figure 42:
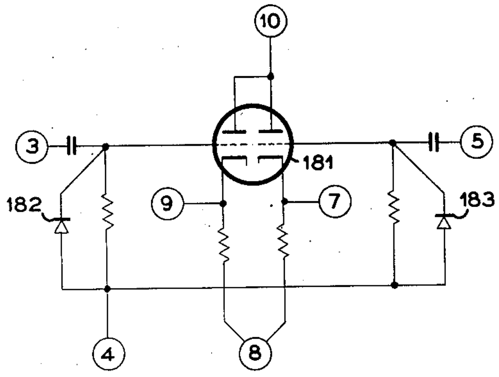

Fig. 42 is the circuit detail for a "CF–13" type cathode follower unit.

Figure 43:
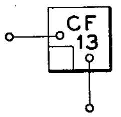

Fig. 43 is a symbolic representation for the "CF–13" type cathode follower unit shown in Fig. 42.

Figs. 44 through 48 are symbolic representations for different combinations of the above-listed circuit units to form latch type units that are employed in the data transfer circuits.

Figure 49:
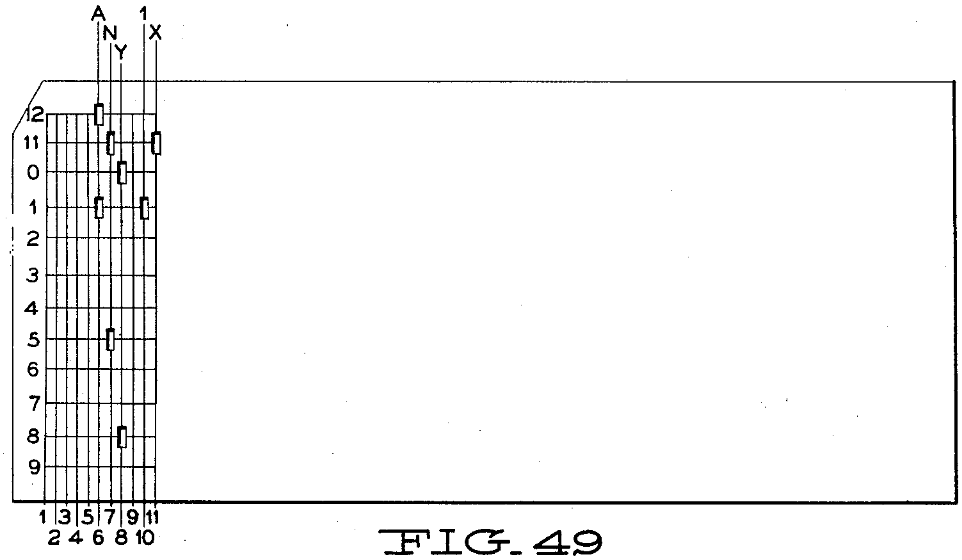

Fig. 49 shows a diagrammatic arrangement of the well-known IBM record card in accordance with a particular illustrative example of alphanumerical data punched therein.

Figure 50:
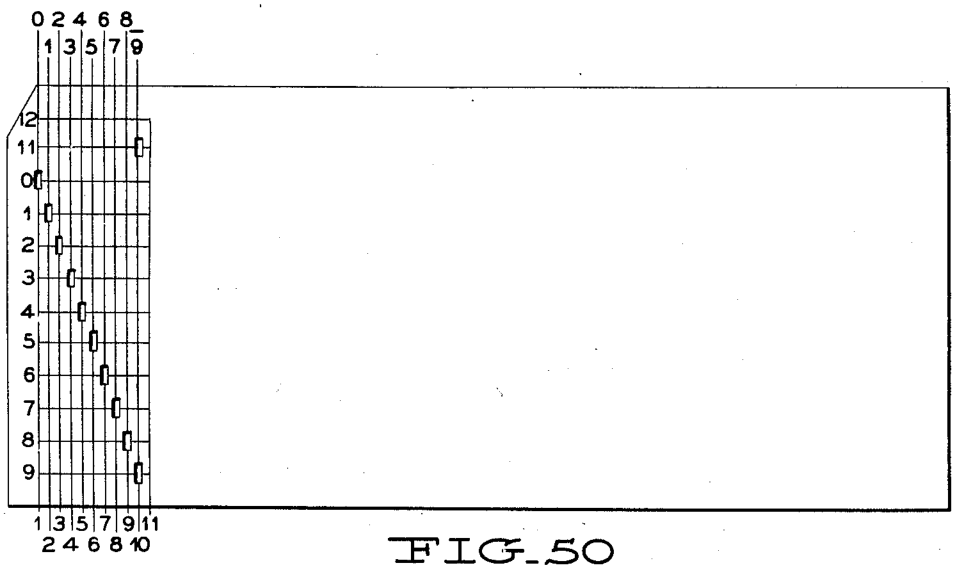

Fig. 50 shows a diagrammatic arrangement of an IBM record card in accordance with a particular illustrative example of numeric data punched therein.

Figure 51:
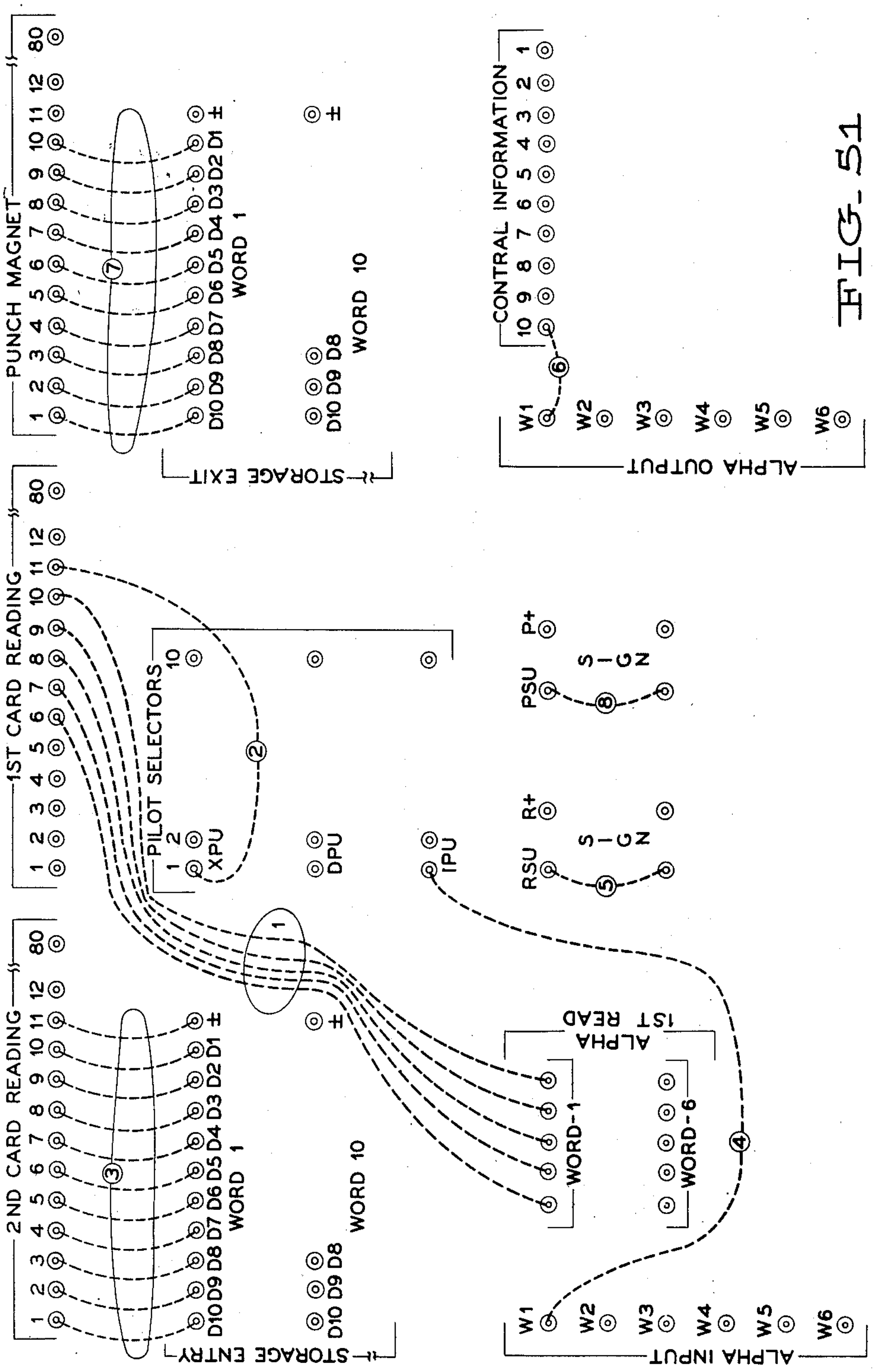

Fig. 51 is a partial plugboard chart showing the plugging for a particular read-in and read-out operation.

Figure 52:
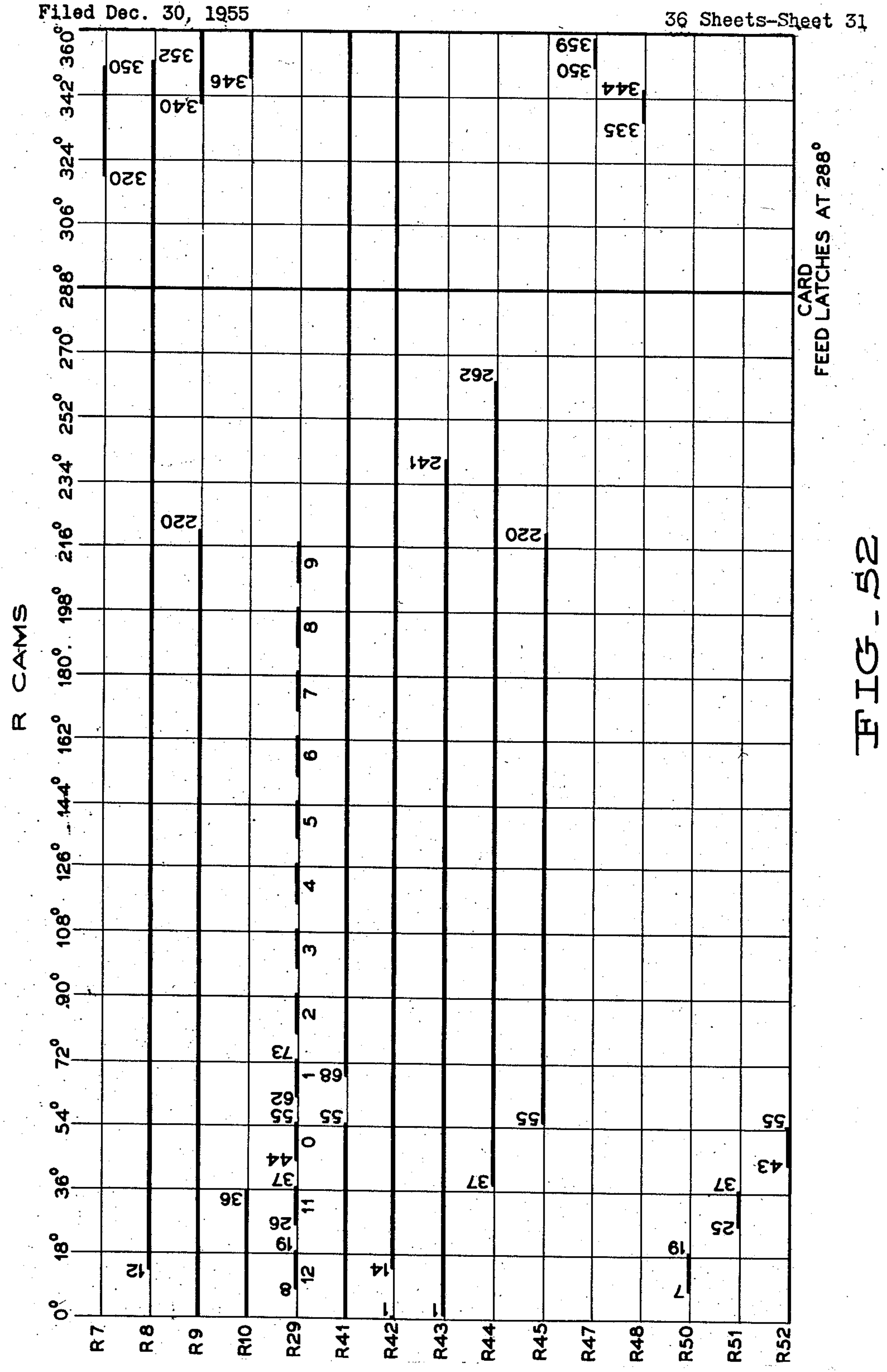

Fig. 52 is a timing chart for the cams associated with the reader portion of the read-punch unit.

Figure 53:
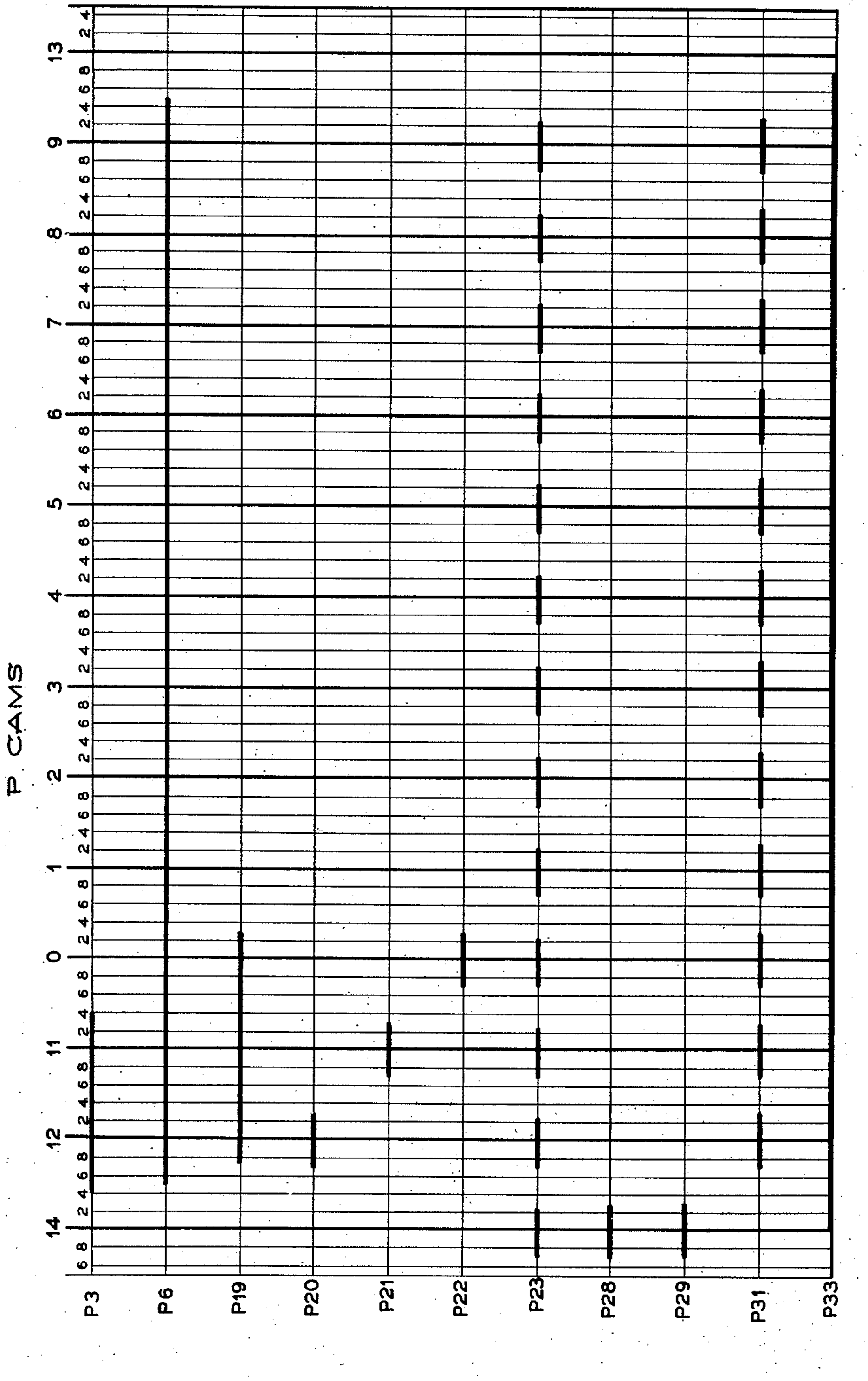

Fig. 53 is a timing chart for the cams associated with the punch portion of the read-punch unit.

Figure 54:
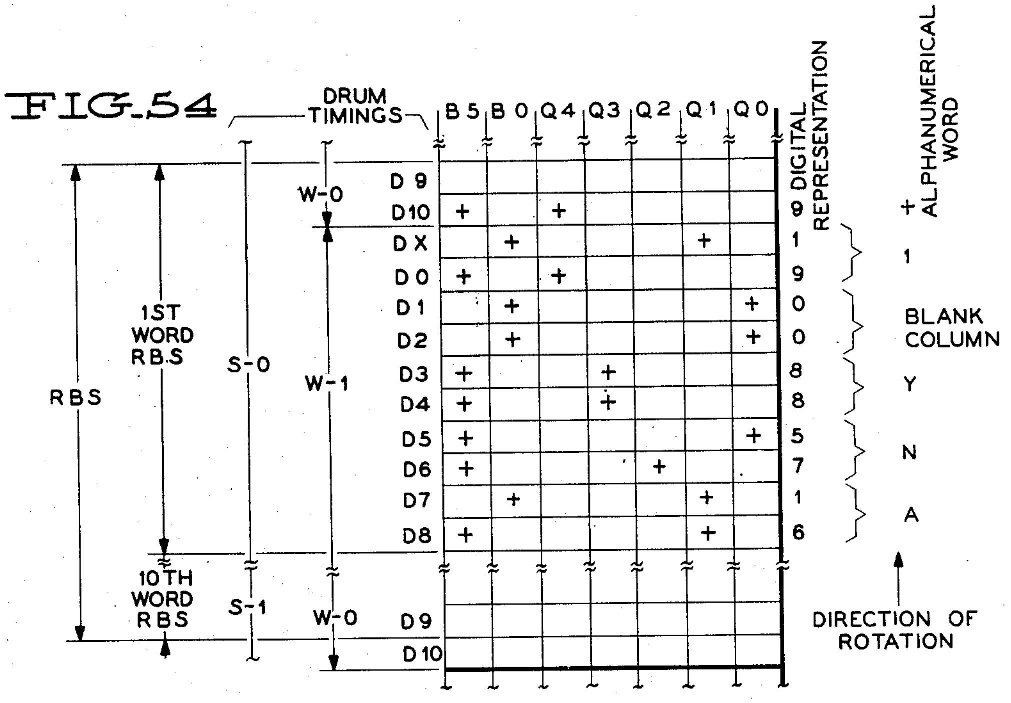

Fig. 54 is a fragmentary schematic of the read buffer storage portion of the buffer storage band showing the positioning of digits for a particular illustrative example of alphanumerical data storage.

Figure 55:
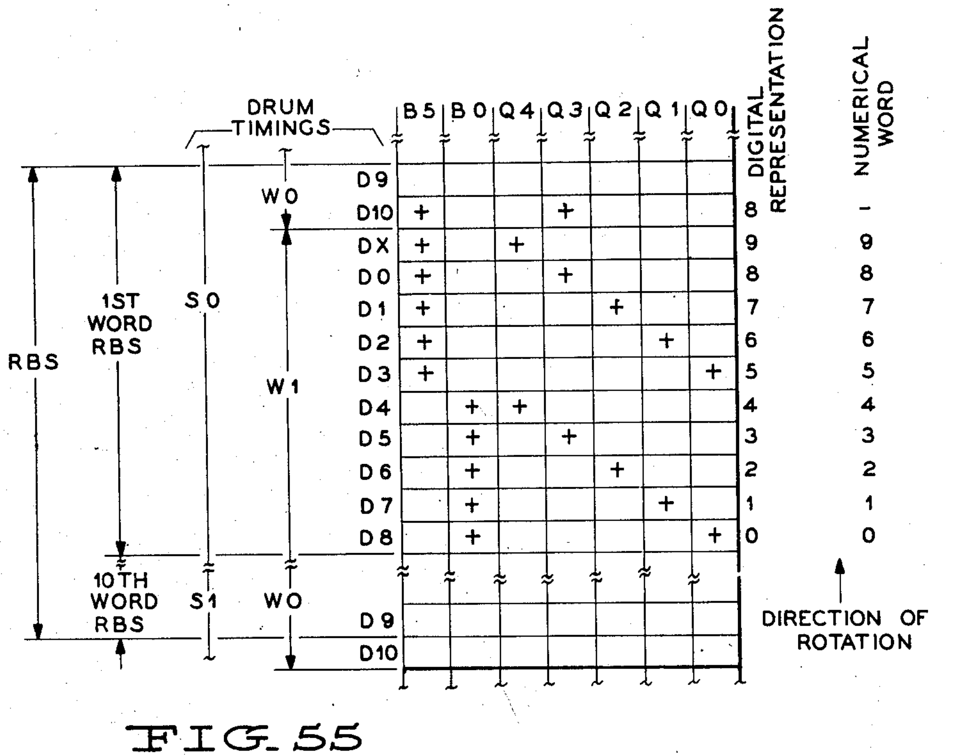

Fig. 55 is a fragmentary schematic of the read buffer storage portion of the buffer storage band showing the positioning of digits for a particular illustrative example of numerical data storage.

Figure 56:
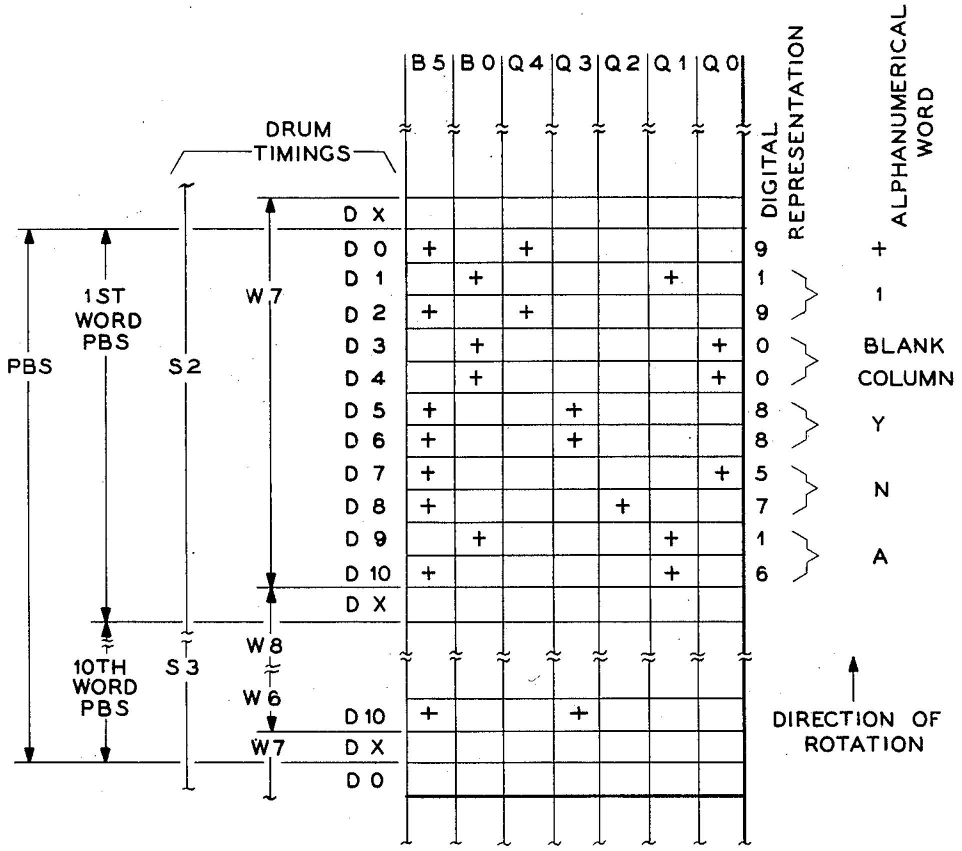

Fig. 56 is a fragmentary schematic of the punch buffer storage portion of the buffer storage band showing the positioning of digits for a particular illustrative example of alphanumerical data storage.

Figure 57:
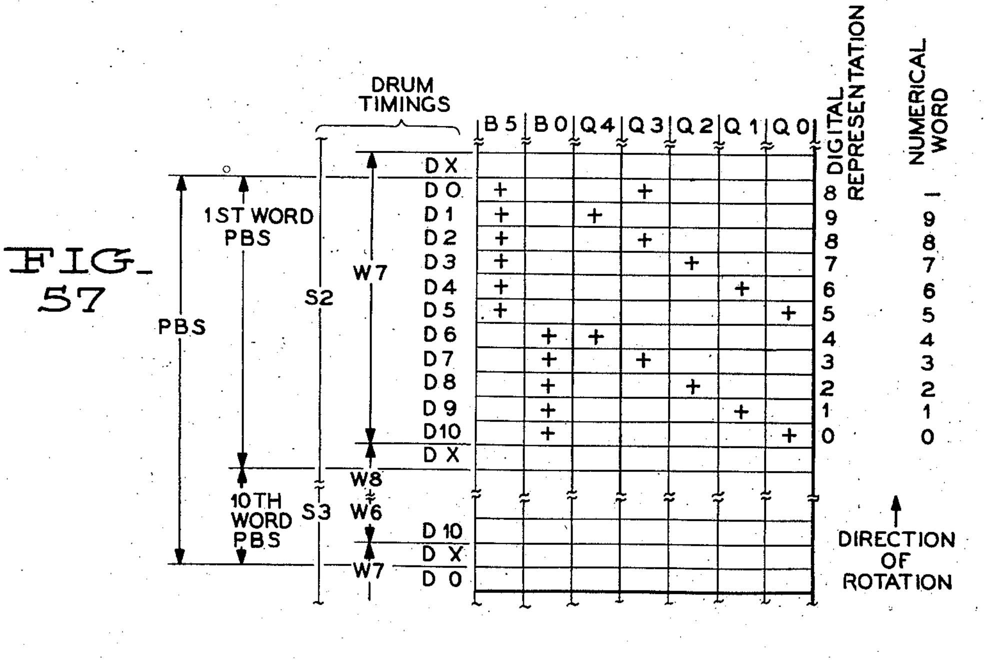

Fig. 57 is a fragmentary schematic of the punch buffer storage band showing the positioning of digits for a particular illustrative example of numerical storage.

Figure 58:
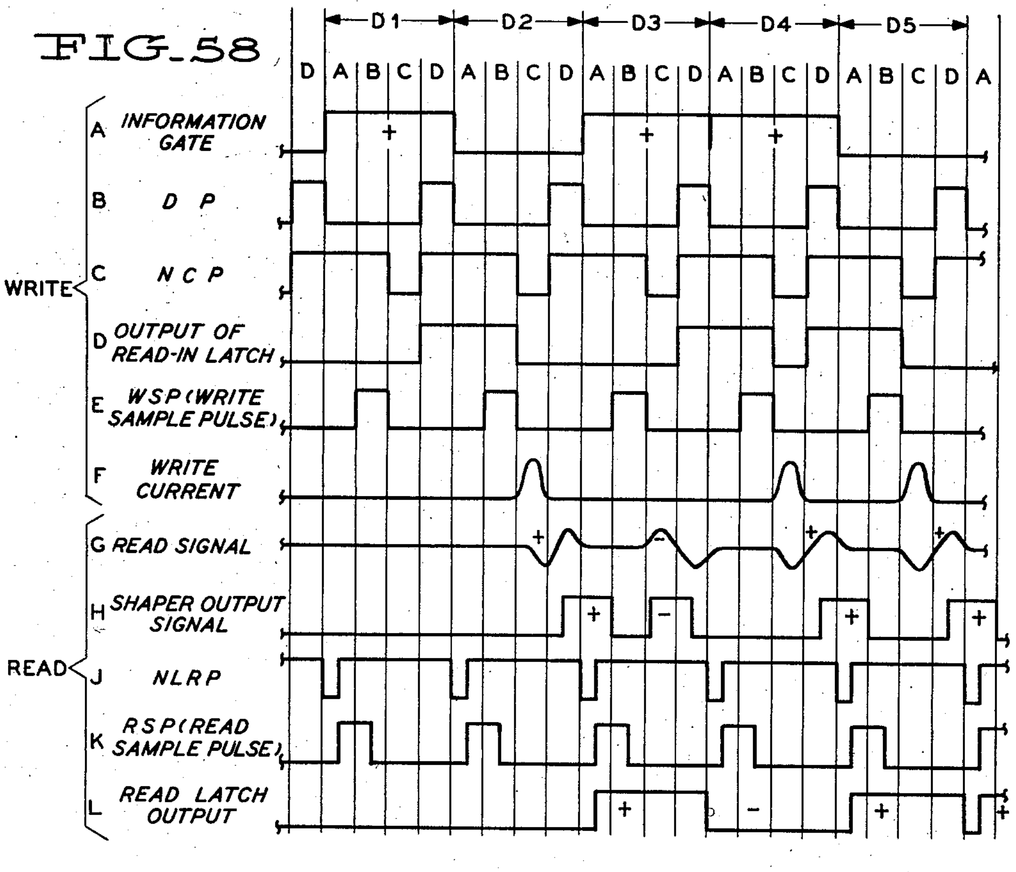

Fig. 58 is a timing diagram showing various wave forms produced during data read-in to the drum storage device and during data read-out from the drum storage device.

Figure 59:
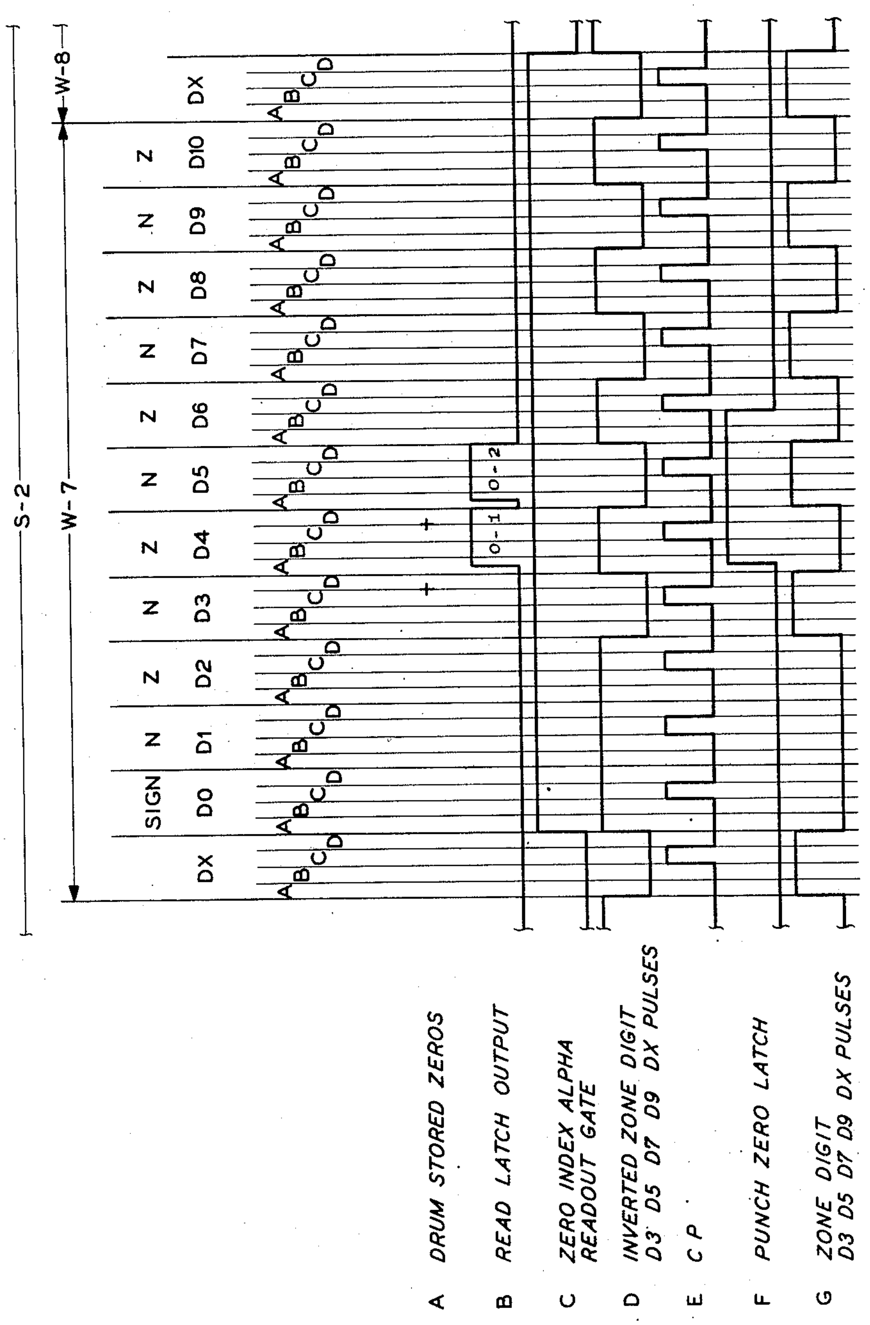

Fig. 59 is a timing diagram showing various wave forms produced during data read-out from the drum storage device of blank column and numeric zero information.

*General description*

The instant invention concerns an input transfer of alphabetic and numeric data commonly called alphanumeric data or numeric data only, from static storage means, such as a record card, to a cyclically moving magnetic storage device, such as a magnetic drum, and conversely, an output transfer of data from a cyclically moving magnetic storage device to static storage means. In the static storage means the data is represented by designations in columns and rows, the different columns being assigned to different character denominations, and the row positions of the designations either singly or combinationally serving to identify the character.

Figure 1:
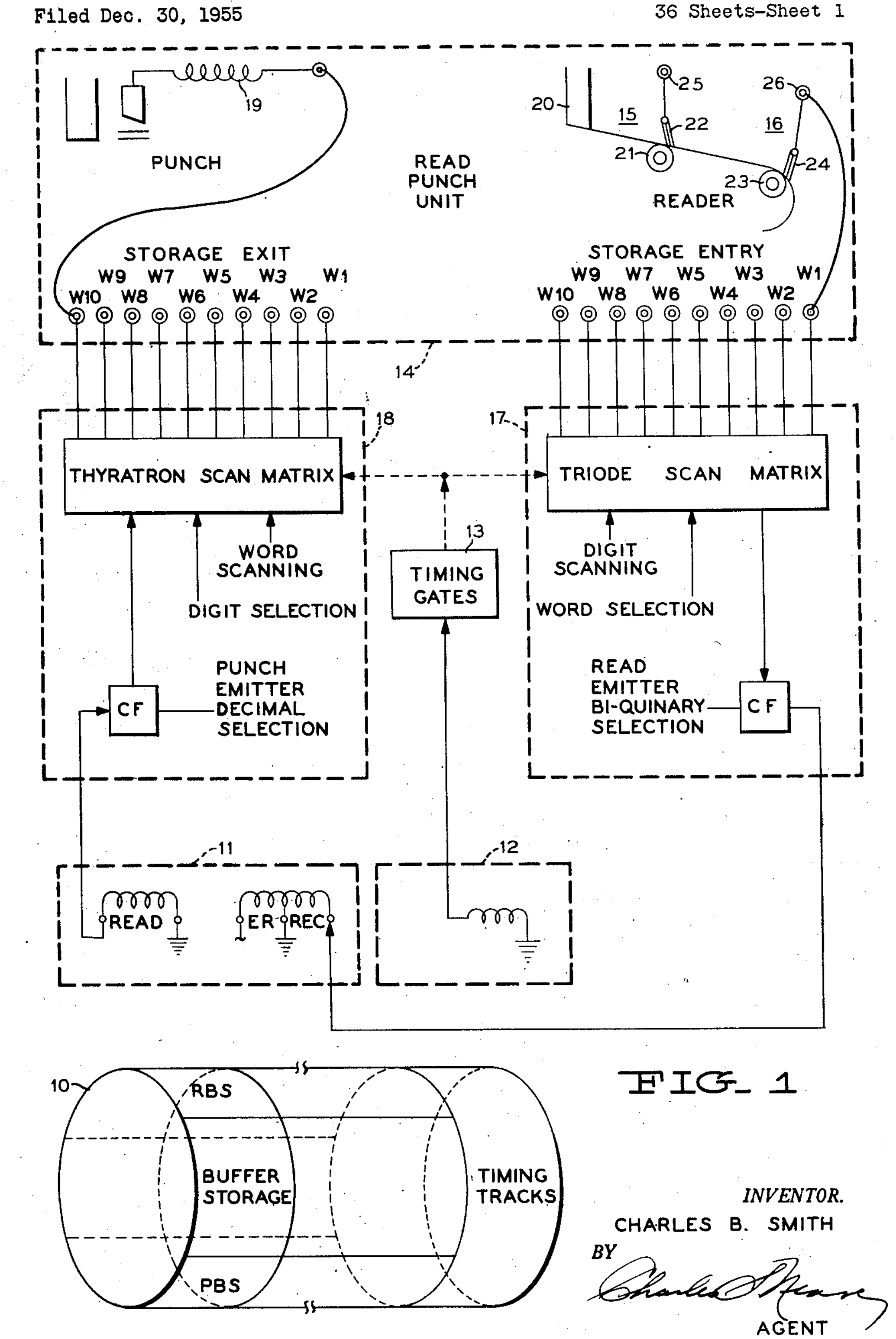
Fig. 1 is a general flow diagram of a data transfer system which employs a magnetic drum storage unit in accordance with the principles of the invention.

In Fig. 1 there is shown schematically a data transfer mechanism adapted for use in a high-speed digital storage and data processing machine of the type that utilizes a rotating magnetic drum 10 for data storage purposes. The drum 10 is longitudinally divided and comprises three sections, namely, a buffer storage, a general storage and timing sections. The buffer storage section has two portions RBS (read buffer storage) and PBS (punch buffer storage). The RBS portion of the drum 10 serves as an intermediate storage medium for information that is being transferred from a record card into the general storage section of the drum. The PBS portion of the drum 10 serves as an intermediate storage medium for information that is being transferred from the general storage section of the drum for punching into a record card. The general storage section has the function of a general storage unit. The general storage and buffer storage sections of the drum each comprise a plurality of tracks defined on the surface of the drum 10 and extending circumferentially about the drum. A recording and reading device 11 is associated with each of the tracks and may be a single magnetic head having both a recording and reading coil wound thereon.

The timing section of the drum 10 constitutes several tracks defined on the surface of the drum each having permanently recorded spots. Each track in the timing section has an associated read head device 12 which supplies signals to the timing gates represented by the block 13. This section will be described more fully hereinafter.

In the particular system there is a read-punch unit 14 which has a read feed that includes two reading stations 15 and 16. A record card in passing the first reading station 15 is sensed for alphabetic or numeric information. If the record card contains only numeric information, the digital data is sensed as the card passes through the second reading station 16, which is adapted for pluggable connection with the storage entry hubs. From the storage entry hubs the data representing signals are passed to a sequencing and conversion unit 17. Herein the data signals are sequenced under control of timing signals and converted to codal signals under control of the read emitter for drum storing purposes. In this manner, the digital data is sensed as the record card passes the second reading station 16 and sequentially and asynchronously stored on the surface of the drum 10 in the RBS portion.

If the record card contains alphabetic information, two digital positions on the drum are required for the storage of each alphabetic character. As an alphabetic record card passes through the first reading station 15, a zone control relay condition is established. Then during the early part of the succeeding cycle when the card is passing through the second reading station 16, digital representing signals characteristic of a zone condition are manufactured and stored in appropriate zone locations on the drum 10. This is successively followed by an actual sensing of the punched record card wherein actual digital representing signals are initiated, sequenced, converted and interspersedly stored in appropriate numeric locations in RBS of the drum 10.

During a data output transfer, data stored in PBS is sequentially sensed by the read coil of the read-record head 11 and signals are presented to a conversion and sequencing unit 18. Herein the data signals are converted from codal form to IBM code form under control of a punch emitter. The data signals are then passed to the Thyratron scan matrix under control of timing gates. The output of the Thyratron scan matrix occurring at the storage exit plughubs are pluggably connected with the punch control magnets 19 which in turn control the punching of data into a record card as it passes the punch station.

*Magnetic drum storage device*

In the particular embodiment, the drum 10 is a cylindrical member with a plated surface and having excellent magnetic qualities. The drum is approximately four inches in diameter and approximately sixteen inches long. The drum is mounted on bearings about a shaft and adapted to be driven at a speed of approximately 12,500 R. P. M. The driving means may comprise any driving motor capable of driving the drum at the selected speed.

Figures 2, 3, 4:
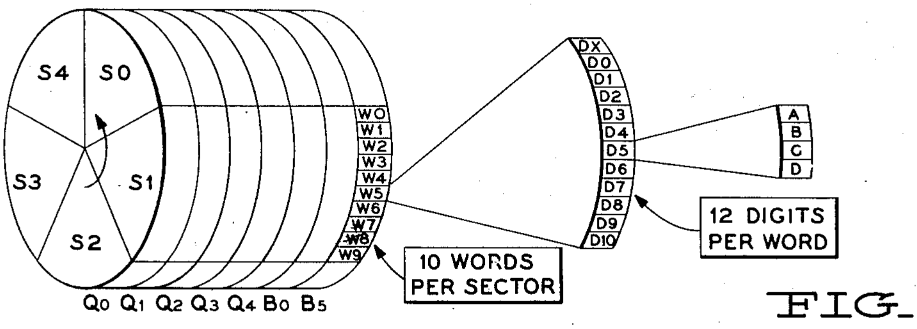
Fig. 2 is a schematic representation of the buffer storage band showing the arrangement of the storage tracks, the word positions, the digital positions and cell positions.
Fig. 3 is a chart showing the representations of digital data in accordance with a biquinary code.
Fig. 4 is a chart showing the representations of alphabetic and numeric characters in accordance with the well-known IBM card code and in accordance with the digital code for magnetic drum storage purposes.

The drum is longitudinally divided into areas designated as tracks which extend circumferentially about the surface of the drum. In the present system we have chosen to store the digital data in the buffer storage section of the drum 10 (Fig. 1) in accordance with a 7-bit biquinary code. The magnetic recording and reading of digital information is according to a parallel-by-bit and serial-by-digit system, i. e., the bits representing a digit are simultaneously recorded on or read from the drum and the digits are serially recorded or read from the drum. Seven tracks forming a band are used to accommodate the 7-bit biquinary code, as shown by Fig. 2. The tracks are respectively designated as the "Q–0," "Q–1," "Q–2," "Q–3," "Q–4," "B–0," and "B–5" tracks. Circumferentially the drum is divided into five sectors designated as "S–0," "S–1," "S–2," "S–3" and "S–4." Each sector is divided into ten word positions designated as "W–0," "W–1," "W–2" through "W–9." Each word position is divided into twelve digit positions designated as "D–X," "D–0," "D–1," "D–2," "D–3" through "D–10." Consequently the buffer storage band is arranged to store up to a maximum of fifty words of digital data.

Each digit position of each of the seven tracks is capable of being magnetized selectively. The first five tracks respectively pertain to the storage of quinary bits designated as "Q–0," "Q–1," "Q–2," "Q–3" and "Q–4." The next two tracks respectively pertain to the storage of binary bits designated as "B–0" and "B–5." Any digit can be represented by selectively magnetizing one track in the quinary level and one track in the binary level. The chart of Fig. 3 shows the digital representation in accordance with the biquinary code system. For example, the digit "3" is represented in any digital position by simultaneously magnetizing the digital position in the "Q–3" and "B–0" tracks. The digit "7" is represented by magnetizing the "Q–2" and "B–5" tracks. In this manner each digit can be represented by two active spot magnetizations, one in each level.

Each word of magnetic storage is composed of ten digits plus an algebraic sign, i. e., plus or minus, represented in digital form. The system disclosed herein employs the convention of representing a negative sign by a digit "8" recording, while a positive sign is represented by a digit "9" recording.

While it has been described above how the buffer storage section of the drum 10 is arranged to provide storage for a maximum of fifty words of digital information, in the preferred embodiment only two ten word portions are actually utilized. One ten word portion is designated as the RBS (read buffer storage), which serves as a buffer storage for digital information being transferred into the data processing machine from a data source such as a record card. The second ten word portion is designated as the PBS (punch buffer storage), which serves as a buffer storage for digital information being transferred from the data processing machine for storage in another medium such as a punched record card. In the preferred embodiment the RBS section actually begins at the S–0, W–0, D–9 position of the drum and continues through the succeeding ten word positions. The PBS section actually starts at the S–2, W–7, D–0 position of the drum and continues through the succeeding ten word positions.

*Timing*

Figure 5:
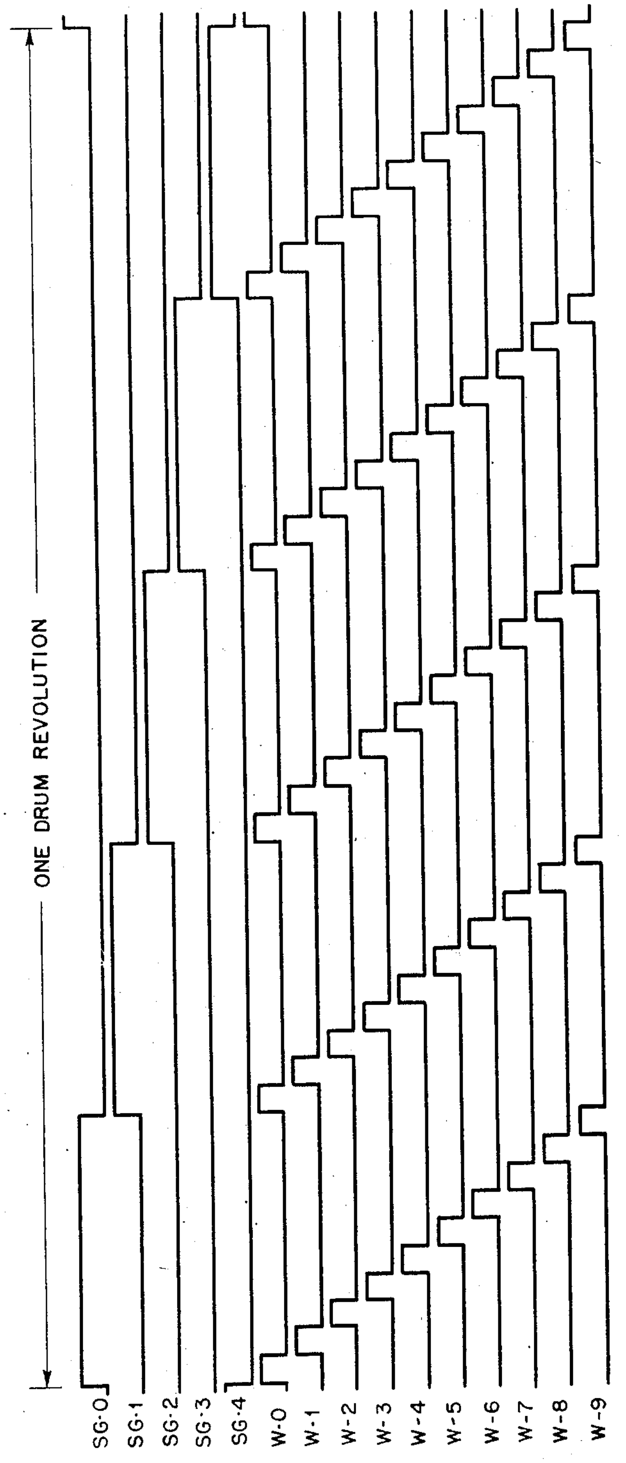
Figs. 5 and 6 are timing diagrams showing various timing pulses generated under control of the timing section of the drum storage device.
Figure 6:
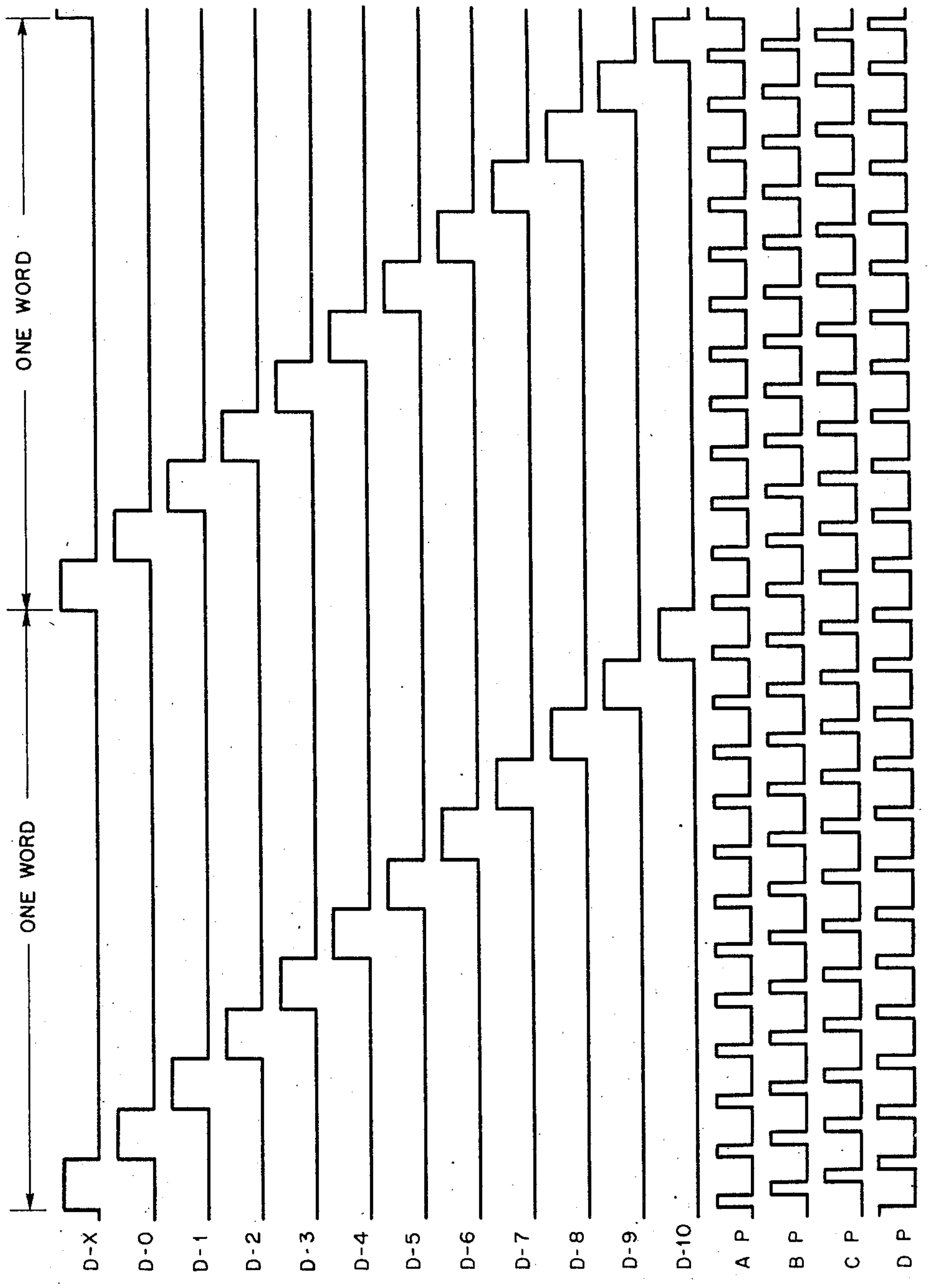

The timing section of the magnetic drum 10 is schematically indicated by Fig. 1. This section constitutes several tracks having permanently recorded spots. Each track has an associated read head 12. A signal is generated in the read heads as each magnetically recorded spot passes in close proximity to the read heads. These signals are used to control a plurality of timing circuits represented by the block 13. The timing circuits produce various basic timing pulses, as shown by Figs. 5 and 6, in accordance with techniques that are well known in the art. These figures are according to different time bases in order that pulses of shorter duration may be clearly distinguished from one another. These timing pulses are cyclically supplied to the data transfer circuits for controlling various timing and switching functions, as will be described more fully hereinafter.

As schematically shown in Fig. 2, each digital position is divided into four cell positions respectively designated as "A," "B," "C" and "D." Timing pulses are generated by the timing circuits in accordance with these cell positions, as shown by Fig. 6. For example, "A" pulses (AP) are short timing pulses which are initiated at the beginning of the A cell position and have a duration for the entire A cell position. Due to the rate of rotation of the magnetic drum in the preferred embodiment, these pulses have a duration of two microseconds. "B" pulses (BP) are two microsecond pulses which last for the entire B cell position, and so on.

Digit pulses, identified as D–X, D–0, and so on, through D–10, are timing pulses which are generated in accordance with the respective digital positions and have a duration of eight microseconds and last for the entire digital position.

Word pulses, identified as W–0, W–1, and so on, through W–9, are pulses which are generated in accordance with the respective word positions and have a duration for the entire word position. Sector gate pulses, identified as SG–0, SG–1, SG–2, SG–3 and SG–4, are gating pulses generated in accordance with the respective sector positions of the drum, and have a duration for the entire sector division.

In some instances in the circuitry negative timing pulses (not shown in the timing charts) are utilized which are designated with a prefix "N," e. g., a negative "C" pulse will be designated "NCP." A negative pulse has a normally positive voltage level except during the designated pulse time. These negative pulses are obtained by inverting the normal pulses.

In some instances pulses that occur just prior to a designated pulse time are signified with a prefix "E" meaning "early," e. g., "EAP" meaning early "A" cell pulse. Early pulses are often used to compensate for time lost between stages of electronic circuitry which require pulses at a certain designated time. Early pulses are obtained by delaying certain preceding pulses by a predetermined amount in accordance with well-known delay techniques, e. g., early "A" pulses (EAP) are obtained by delaying "D" pulses (DP).

*Card reader*

The read-punch unit 14, as schematically represented in Fig. 1, includes a card reader which has the primary function of feeding and sensing perforated record cards of the IBM type and to initiate electrical pulses corresponding to the data sensed. The reader is similar in its general construction and operation to the one shown in Fig. 1 of U. S. Patent No. 2,340,722, issued to D. W. Rubidge et al., and described therein.

The record cards of the type shown in Figs. 49 and 50 are subdivided into vertical columns and horizontal rows, or index point positions. The vertical columns may be grouped into fields and within each field the different columns pertain to different denominational orders. Data is recorded in the cards by selectively punched holes in index positions of the columns of the cards. The numbers 0 to 9 are designated by single perforations in corresponding index positions of the columns, only one perforation being made in any one column. The index positions 1 to 9 are known as the numeric positions. The index positions 12, 11 and 0 are known as the zone positions. Alphabetic characters are designated by a perforation in a zone position combined with a perforation in a numeric position. Thus, it may be seen that the numeric perforations may occur alone or in combination with zone perforations. Also, the 0 perforation may occur alone or in combination. As indicated in the chart of Fig. 4, a perforation in the 12 index position combined with a perforation in one of the positions 1 to 9 represents one of the letters A to I. An "11" hole combined with one of the perforations in positions 1 to 9 represents one of the letters J to R. A "0" hole combined with a perforation in one of the positions 2 to 9 represents one of the letters S to Z.

A stack of cards, such as shown in Fig. 49, is placed in the supply hopper 20 (Fig. 1). When a read feed cycle is initiated, a card picker (not shown) feeds one card at a time from the bottom of the hopper 20 to a first pair of a plurality of feed rollers (not shown). The feed rolls feed the card continuously through the upper analyzing station 15 and one cycle later through the lower analyzing station 16 and then to a stacker hopper (not shown). The upper analyzing station 15 comprises a common contact roller 21 and a row of conductive sensing brushes 22, one for each column of the record card. The lower analyzing station 16 has a similar contact roller 23 and a similar row of sensing brushes 24. Each brush is adapted to sense one card column and to engage through a hole in a column with the common contact roller. The card feed means is driven from a continually rotating shaft through releasable clutch means that may be selectively and intermittently engaged for the purpose of individually feeding cards through the card feeding means.

Each of the sensing brushes 22 in the upper analyzing station is directly connected to a plughub 25. Each of the sensing brushes 24 in the lower analyzing station is directly connected to a plughub 26. These plughubs are part of a plugboard. The plugboard is a component part of the read-punch unit 14 (Fig. 1). It is similar in construction to the plugboard shown in U. S. Patent No. 2,111,118, to C. D. Lake, issued March 15, 1938. The plugboard provides a flexible and convenient means for selectively making electrical connections. The advantages of selective plugging will become more fully apparent later in the description.

The purpose of the upper analyzing station 15 is to sense the record cards to determine if the information contained in the card is alphanumeric or pure numeric. According to the determination made in the upper analyzing station 15 a control condition is established for the reading of the card in the lower analyzing station 16. If the information on the card is alphanumeric, each character must be translated into a two digit representation, as shown in the chart of Fig. 4, for drum storing purposes. If the information is pure numeric then each character representation is directly stored on the drum as it is read from the record card when passing the lower analyzing station 16. In the lower analyzing station 16 the information is read for recording on the drum storage device. This will be more fully described later in the description.

The preferred embodiment is arranged to provide for the input and output of up to six words of alphanumerical data. In other words thirty alphanumerical data columns on a record card can be accommodated in the magnetic drum storage device.

*Data transfer circuits*

The principal circuits of the data transfer mechanism are illustrated in block diagram form in Figs. 7*a* through 7*h* and 7*j* through 7*r*. Fig. 8, shown on the sheet for Fig. 7*e*, indicates the manner in which these various views should be assembled.

Attention will be given now to various typical forms of tubes and diode circuits which are shown diagrammatically in Figs. 7*a* through 7*h* and 7*j* through 7*r*. In Fig. 9, for example, there is shown a typical coincidence switch, otherwise known as logical "and" circuit comprising the germanium crystal diodes 30 and 31. The common terminal 32 of the diodes 30 and 31 is connected through a voltage-dropping resistance 33 to a source of positive voltage. The individual input terminals 34 and 35 of the diodes 30 and 31 are normally biased negatively so that the common terminal 32 is normally at a negative potential with respect to ground. If coincident positive pulses are applied to the terminals 34 and 35, the potential of the terminal 32 is raised. However, if only one of the terminals 34 and 35 is pulsed positively, the potential of the terminal 32 is not raised appreciably. A voltage responsive device, such as an electron tube amplifier 36, is controlled by the potential of the terminal 32 to furnish a usable output voltage pulse whenever a coincidence of positive input pulses is detected. For simplicity, the portion of the coincidence switch shown in the broken line rectangle 37, Fig. 9, is generally represented as shown in Fig. 10. There are frequently more than two input terminals such as 34 and 35, and it is to be understood that each of the input terminals is to have a diode connected thereto in the same manner as diode 31 is connected to terminal 35 in Fig. 9.

In Fig. 11 there is shown a typical mixer, otherwise known as a logical "or" circuit, comprising the diodes 40 and 41. A voltage responsive device, represented by the electron tube amplifier 42, is controlled by the potential of the common output terminal 43 of the diodes 40 and 41, which terminal is connected by a resistor 44 to a source of negative voltage. The diode input terminals 45 and 46 are normally biased negatively. If either one or both of the diode input terminals 45 and 46 is pulsed positively, the potential of the terminal 43 is raised. For convenience, the portion of the mixer circuit shown in the broken line rectangle 47, Fig. 11, is generally represented as shown in Fig. 12. It should be understood that more than the two shown input terminals may be used and that each additional input terminal will be provided with an additional diode, such as the diodes 40 and 41 of Fig. 11, and that each of these additional diodes will be connected to the terminal 43.

Various types of tube circuits are indicated by blocks in the master diagram, Figs. 7*a* through 7h and 7*j* through 7*r*. These circuits will be described now in greater detail. Fig. 14, for example, represents in block form a double inverter unit identified as a type "IN–1." This unit is shown schematically in Fig. 13, where it is seen to comprise a twin triode amplifier 50 in which the plate 51 of the first triode is coupled through a parallel connected resistor 52 and capacitor 53 in series with a resistor 54 to the grid 55 of the second triode. The grid 56 of the first triode is connected through resistor 57 to an input terminal "3." The cathodes 58 and 59 have a common ground connection as shown. The grid 55 is connected through resistors 54 and 60 to a grid input terminal "4" and is also coupled through resistor 54 and capacitor 61 to a grid input terminal "6." The plates 51 and 62 of the first and second triodes, respectively, are connected to plate output terminals "5" and "8." The plate circuit of the second triode also has a tap connected to the plate tap terminal "7."

The operation of the double inverter amplifier unit shown in Figs. 13 and 14 is such that when a positive pulse is applied to the grid input terminal "3," the resulting drop of voltage at the plate 51 is communicated to the grid 55, causing a rise in voltage at the plate 62. Hence, a positive output voltage pulse is available at the plate output terminals "7" and "8," and a negative output pulse is available at the plate output terminal "5." The duration of the output pulses is substantially equal to the duration of the input pulses. A double inverter unit shown in Figs. 13 and 14 is adapted to be used in conjunction with a cathode follower type of circuit to provide a so-called "latch" unit. When used in this fashion, the unit is turned "on" by a positive pulse applied to the grid input terminal "3," and may be turned "off" or reset by the application of a positive pulse to the grid input terminals "4" or "6" or by the application of a negative pulse to the plate terminal "8." This will be explained more fully later in the description.

Figs. 15 and 16 illustrate another form of double inverter unit identified as a type "IN–3" comprising a twin triode 66 in which the two triode sections operate independently of each other. One triode section has a grid input terminal "3" coupled to the grid through resistor 67, a plate output terminal "5" and a plate tap terminal "10." The other triode section has a grid input terminal "6" coupled to the grid through resistor 68, a plate output terminal "8" and a plate tap terminal "9." This type of inverter unit also can be employed in a latch unit, as will be explained later. Since the unit shown in Fig. 15 is actually two separate inverters, each half of the tube is represented by the symbol shown in Fig. 16.

Fig. 17 schematically shows a twin triode tube 71 connected as a combinational amplifier and cathode follower unit, which is identified as a type "PW–2." The amplifier section comprises a plate 72 connected to the plate voltage supply terminal "6" through a resistor 73 in series with the parallel connected inductor 74 and resistor 75, a grid 76 connected to the grid input terminal "3" and a cathode 77 connected to ground. The plate 72 is connected through resistor 73 to the plate voltage output terminals "4" and "7." The cathode follower section comprises a plate 78 directly connected to the plate voltage supply terminal "6," a grid 79 connected to a grid input terminal "9" and also to the grid bias supply terminal "10" through the resistor 80, and a cathode 81 connected to the cathode output terminal "8." The plate output from the amplifier section is capacitively coupled to the grid 79 of the cathode follower section through the capacitor 82.

This tube is used in the recording circuitry as will become more apparent later in the description. The left half of the "PW–2" tube 71 is normally non-conductive. The grid input terminal "3" is generally controlled by positive pulses having a pulse-width of two microseconds. The application of a positive pulse to the grid input terminal "3" causes the left half of tube 71 to be made conductive. Plate current will flow through the inductor 74 for a two microsecond interval, which is sufficient for the current to build up to about seventy percent of its maximum value, as determined by the grid drive, plate voltage, current limiting resistors, and plate resistance. The plate current stores energy in the inductor 74 so that when the sharp trailing edge of the pulse applied to the grid input terminal "3" renders the left half of tube 71 non-conductive, the energy stored in inductor 74 will cause an inductive spike of voltage to occur at the plate terminals "4" and "7." This spike is capacitively coupled to the grid of the right half of the tube 71, which serves as a cathode follower. Due to the biasing of the cathode follower, only the positive portions of the inductively produced signal will be effective in causing an output signal to occur at the cathode output terminal "8." The "PW–2" unit is represented in block form by the symbol shown in Fig. 18.

Fig. 19 illustrates another form of power amplifier unit identified as a type "PW–3" comprising a twin triode 85 in which each of the sections is connected in a cathode follower type of arrangement. The two triode sections operate independently of each other. One triode section has a grid input terminal "3" coupled to the grid 86 through resistor 87, and a cathode output terminal "6." Grid 86 is biased from the bias supply terminal "4" through resistor 88. The other triode section has a grid input terminal "5" coupled to the grid 89 through resistor 90, and a cathode output terminal "8." Grid 89 is biased from the bias supply terminal "4" through resistor 91. The plates 92 and 93 of the first and second triode sections, respectively, are commonly connected to the plate supply terminal "9" through resistor 94. The plates 92 and 93 are capacitively coupled to ground through capacitor 95, which serves as a filtering means for the plate supply voltage. The unit shown in Fig. 19 is represented by the symbol shown in Fig. 20.

The "PW–3" unit is primarily utilized in the data transfer circuitry as an impedance matching device. The biasing of the grids 86 and 89 is such that only positive pulses applied to the grid input terminals "3" and/or "5" and in excess of a predetermined minimum voltage amplitude will render either or both sections of the "PW–3" conductive.

Figs. 21 and 22 illustrate another form of power amplifier unit identified as a type "PW–4" comprising a twin triode 100. One triode section has a grid input terminal "3," coupled to the grid 101 through resistor 102, and a plate output terminal "5." The other triode section has a grid input terminal "6," coupled to the grid 103 through resistor 104, and a plate output terminal "9." The plate output is also capacitively coupled to each of the plate output terminals "7" and "8." The cathodes 105 and 106 are commonly connected to ground. The unit shown in Fig. 21 is represented by the symbol shown in Fig. 22.

The "PW–4" unit is adapted for use as an amplifier inverter wherein the two triode sections operate independently of each other. For example, the operation is such that when a positive pulse is applied to the grid input terminal "3" there will be a negative pulse output available at the plate output terminal "5." The same operation occurs independently for the other section of the twin triode.

Fig. 23 illustrates a form of power amplifier unit identified as a type "PW–5" comprising a twin triode 110. One triode section has a grid 111 coupled to the grid input terminal "3" through resistor 112. The cathode 113 is connected with the cathode output terminal "5" and through resistor 114 to the terminal "4." In a similar manner, the other triode section has a grid 115 coupled to the grid input terminal "6" through resistor 116. The cathode 117 is connected with the cathode output terminal "8" and through resistor 118 to the terminal "7." Herein each triode section is connected in a cathode follower type of arrangement. Both sections operate independently of each other. Each half of the unit shown in Fig. 23 is represented by the symbol shown in Fig. 24.

Fig. 25 shows an arrangement referred to herein as a double diode unit identified as a type "DD–1," comprising two twin diode tubes. Each twin diode comprises two plates and two cathodes. Each diode section is represented by the symbol shown in Fig. 26. These units are used as isolation means and to provide back-circuit elimination.

Fig. 27 shows a shaping amplifier unit identified as an "SA–1" comprising a twin triode 120, which serves as a two-stage shaping amplifier. The combination of capacitor 121, resistors 122 and 123, and diode 124 serves as a signal clamping and limiting means for signals applied to the grid input terminal "3." The plate 125 is connected to the common plate supply terminals "7" and "9" through the resistor 126. The resistors 127, 128 and 129 connected between the plate supply terminal "7" and ground serve as a voltage divider network for biasing the grid 130 for the right half of tube 120 and the commonly connected cathodes 131 and 132. The plate 133 is connected to the plate output terminal "8." Capacitor 134 serves as a filtering means for the plate supply potential applied to the plate supply terminal "7." In this particular circuit arrangement the plate output from plate 125 is R-C coupled to the grid 130 through condenser 135. The circuit also utilizes the principles of cathode regeneration. The function of this unit is to shape an inductively produced type of input signal applied to the grid input terminal "3" into an amplified square wave output which occurs at the plate output terminal "8." This unit is represented by the symbol shown in Fig. 28.

Fig. 29 shows a voltage amplifier unit identified as a "VA–1." This unit is a two-stage class A voltage amplifier using R-C coupling and cathode bias. The unit is seen to comprise a twin triode 139 having a grid input terminal "3" coupled to the grid 140 through resistor 141. The plate 142 is R-C coupled to the grid 143 of the second triode section. Plate 144 is connected to the plate output terminal "8." Herein a signal applied to the grid input terminal "3" will be amplified through the two stages and appear at the plate output terminal "8" in an amplified form. This unit is represented by the symbol shown in Fig. 30.

Fig. 31 shows a heated cathode gas tube otherwise known as a Thyratron and identified as a "TH–1." This unit comprises a gas-filled tetrode tube 147 having one grid 148 connected to the grid input terminal "7" through resistor 149 and a second grid 150 connected to the grid input terminal "3" through resistor 151. The plate 152 is connected to the plate voltage supply terminal "4." The cathode is connected to the cathode output terminal "9" and to ground through resistor 153. Tube 147 is normally non-conductive and is rendered conductive by the coincident application of positive pulses to the grid input terminals "7" and "3." Once the Thyratron is fired, the grids lose control and do not affect the current flow. A positive signal occurs at the cathode output terminal "9" and lasts until such time that the plate voltage supply to terminal "4" is interrupted. This causes tube 147 to be deionized. This unit is represented by the symbol shown in Fig. 32.

Numerous cathode followers are employed in the data transfer circuits, and in most instances it is found economical to utilize double units of this type. Fig. 33, for example, illustrates a double cathode follower unit identified as a "CF–1" and utilizing a twin triode 157 having grid input terminals "3" and " 6" and cathode output terminals "5" and "8." The two cathode followers of this unit operate independently of each other. Each half of this unit is represented by the symbol shown in Fig. 34.

In Fig. 35 there is shown a double cathode follower unit identified as a "CF–3." This unit is seen to comprise a twin triode 158 in which the grid 159 is connected with the grid input terminal "3" through a resistor 160 in series with a parallel connected resistor 161 and capacitor 162. The grid 163 is connected with the grid input terminal "6" through a resistor 164 in series with a parallel connected resistor 165 and capacitor 166. The grids 159 and 163 are biased from the bias voltage supply terminal "4." The cathodes 167 and 168 are respectively connected to the cathode output terminals "5" and " 8." Fig. 36 illustrates the simplified showing of each half of this unit.

Fig. 37 shows a double cathode follower unit identified as a "CF–6." This unit comprises a twin triode 170 in which the grid 171 is connected through resistor 172 to the grid input terminal "10" and through resistor 172 in series with the parallel connected capacitor 173 and resistor 174 to the grid input terminal "3." Grid 175 is connected through resistor 176 to grid input terminal "6." The cathodes 177 and 178 are respectively connected to the cathode output terminals "5" and "8." The two cathode followers of this unit operate independently of each other. The left half of the unit is represented by the symbol shown in Fig. 38. The right half of the unit is represented by the symbol shown in Fig. 39.

Fig. 40 illustrates another double cathode follower unit identified as a "CF–7" and utilizing a twin triode 180 having grid input terminals "3" and "6" and cathode output terminals "5" and "8." In this unit the plate circuitry includes filtering means. The two cathode followers of this unit operate independently of each other. Each half of this unit is represented by the symbol shown in Fig. 41.

Fig. 42 shows a double cathode follower unit identified as a "CF–13." This unit comprises a twin triode 181 in which the grid input terminals "3" and "5" are each capacitively coupled to a grid. In this unit the grid circuits are provided with clamping means by use of the diodes 182 and 183. Diode clamping is utilized to establish a reference potential axis for the input signals. This unit is provided with cathode output terminals "9" and "7." The cathode followers operate independently of each other.

Each half of this unit is represented by the symbol shown in Fig. 43.

Figure 44:
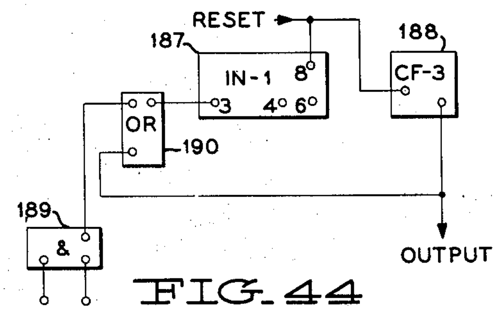

Figs. 44 through 48 relate to various forms of latch units that are employed in the data transfer circuits. Certain of these latch units are disclosed and claimed in the U. S. patent to Ernest S. Hughes, Jr., No. 2,628,309, issued February 10, 1953. The latch unit which is illustrated in Fig. 44 uses a double inverter 187 of the type "IN–1" shown in Figs. 13 and 14 above, a cathode follower unit 188 of the type "CF–3" shown in Figs. 35 and 36 above, and a combination of an "and" switch 189 and an "or" switch 190 for input and feed-back purposes. In the normal "off" condition of the latch unit, the left-hand section of the double inverter 187 is cut off and the right-hand section thereof is conducting. The application of coincident positive pulses to the "and" switch 189 input terminals causes a positive pulse to be applied to the grid input terminal "3" of the double inverter 187, thereby turning the unit "on." The positive output voltage at the plate output terminal "8" is fed back through the cathode follower 188 and the "or" switch 190 to the grid input terminal "3" of the double inverter 187, thereby maintaining the latch unit "on." The output of the latch unit is taken from the output side of the cathode follower 188.

There are several methods by which the latch unit may be reset. For example, a positive pulse may be applied to either of the grid input terminals "4" or "6" of the double inverter 187 either of which will cause the right-hand section of the inverter to be made conductive. The resultant drop in voltage at the plate output terminal "8" is fed back through the cathode follower 188 and the "or" switch 190 to the grid input terminal "3" of the inverter 187, thereby causing the left-hand section to be rendered non-conductive. Another method of resetting the latch unit is by the application of a negative pulse to the plate output terminal "8" of the inverter 187, and in the same manner, the drop in voltage at terminal "8" is fed back through the cathode follower 188 and the "or" switch 190 to the grid input terminal "3" of the inverter 187, which renders the left-hand section of the inverter 187 non-conductive.

Figure 45:
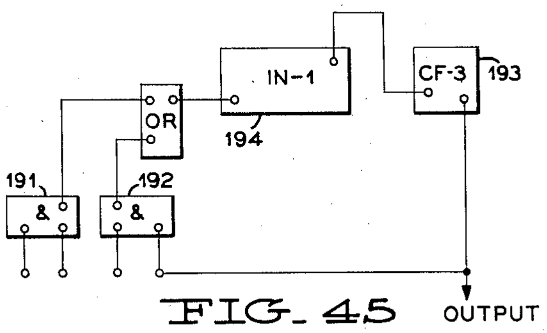

Fig. 45 illustrates a type of latch unit which is similar to that shown in Fig. 44. The latch unit is turned "on" by coincident positive pulses applied to the input terminals of "and" switch 191. The latching action depends upon the coincidence of positive voltages at the input terminals of "and" switch 192. One of these coincident voltages, of course, is the positive output furnished by the cathode follower 193 when the double inverter 194 is "on." The other coincidence voltage to the input terminals of "and" switch 192 is supplied by a normally positive potential source which controls the latching action. So long as the "and" switch 192 is energized by these coincident positive voltages, the double inverter 194 is latched in its "on" condition, but when the coincidence is destroyed, the unit is immediately turned "off." It is not necessary to supply a separate reset pulse for this purpose.

Figure 46:
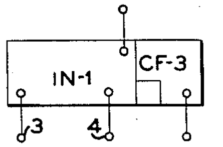

Fig. 46 is an alternate block symbol showing a merged representation of the double inverter and cathode follower units when used as a latch unit as shown in Figs. 44 and 45.

Figure 47:
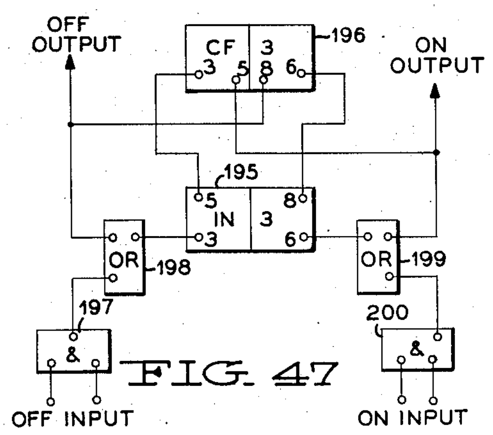

Another form of latch unit is shown by Fig. 47. This unit utilizes a double inverter 195 of the "IN–3" type shown in Figs.15 and 16, a cathode follower unit 196 of the "CF–3" type shown in Figs. 35 and 36, and a combination of switches 197 through 200 for input and feed-back purposes. In the normal "off" condition of the latch unit, the right-hand section of the double inverter unit 195 is non-conductive. The application of coincident positive pulses to the "and" switch 200 input terminals causes a positive pulse to be applied to the grid input terminal "6" of the double inverter 195, thereby turning the latch unit "on" and causing the right-hand section to become conductive. This causes a drop in voltage at the plate output terminal "8" which is coupled to the grid input terminal "6" of the cathode follower unit 196. In turn there is a voltage drop at the cathode output terminal "8" which is coupled through the "or" switch 198 to the grid input terminal "3" of the double inverter 195. This causes the left-hand section of the double inverter 195 to be made nonconductive. The resultant rise in voltage at the plate output terminal "5" is coupled to the grid input terminal "3" of the cathode follower 196 causing a positive potential output from the cathode output terminal "5." The positive potential output from cathode output terminal "5" is coupled through the "or" switch 199 to the grid input terminal "6" of the double inverter 195, thereby maintaining the latch unit "on." The "on" output of the latch unit is taken from the cathode output terminal "5" of the cathode follower 196. An "off" output control gate is available from the cathode output terminal "8" of the cathode follower tube 196.

The latch unit is turned "off" by the application of coincident positive pulses to the "and" switch 197 input terminals which causes a positive pulse to be applied to the grid input terminal "3" of the double inverter 195, thereby rendering the left-hand section conductive. This causes a drop in voltage at the plate output terminal "5" which is coupled to the grid input terminal "3" of the cathode follower unit 196. In turn there is a voltage drop at the cathode output terminal "5" which is coupled through the "or" switch 199 to the grid input terminal "6" of the double inverter 195. This causes the right-hand section of the double inverter 195 to be made nonconductive. The resultant rise in voltage at the plate output terminal "8" is coupled to the grid input terminal "6" of the cathode follower 196 causing a positive potential output from the cathode output terminal "8." The positive potential output from cathode output terminal "8" is coupled through the "or" switch 198 to the grid input terminal "3" of the double inverter 195, thereby maintaining the latch unit "off."

Figure 48:
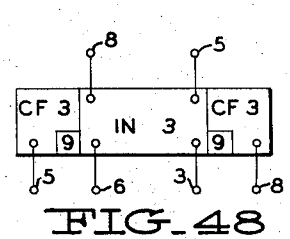

Fig. 48 is an alternate block symbol of the double inverter and cathode follower units when used as a latch unit as shown in Fig. 47.

The details of the component circuits having been fully covered, the operation of the data transfer apparatus will now be described. Reference will be made to the composite diagram of Figs. 7*a* through 7*h* and 7*j* through 7*r*, inclusive, wherein the tube stages are shown schematically by block symbols.

*Data read-in*

The operation of transferring data from a record card to buffer storage will be most easily understood by following the description of the transfer of an illustrative value from the record card.

With reference to Figs. 49 and 50, we may assume a field consisting of columns 1 through 11 of a record card which may be numeric or alphanumeric depending upon the presence or absence of an "11" index position punch in column 11. The absence of an "11" perforation in column 11 is to be indicative that the word field is numeric and the value extends from column 1 through column 10 in which case a sign over the units digits technique will be effective. A "12" index position perforation in column 10 of the record card will be representative of a positive sign for the numeric value and an "11" index position hole in column 10 of the card will be indicative of a negative sign for the numeric word value.

The presence of an "11" perforation column 11 is to be indicative that the word field is alphanumerical in which case the word value will extend from column 6 through column 10. In the preferred embodiment of the invention when an input word is alphanumerical, each word in the record card must be limited to five characters. The reason for this is that each character during a data input transfer operation is translated into a two-digit number according to the chart of Fig. 4 for drum storing purposes. For example, a value such as ANY (Blank Column) 1 will be recorded in drum storage as 61758800919 as will become more fully apparent as the description proceeds. The "9" in the last position is representative of a positive value. Alphanumerical words are automatically read into the drum storage device as positive numbers.

As shown by the card of Fig. 49, the perforations in columns 6 through 11 of the card are representative of the information ANY (Blank Column) 1 with the "11" perforation in column 11 being indicative that the information is alphanumerical.

Fig. 51 shows the pluggable arrangement for the illustrative examples. (1) The "1st Card Reading" plughubs for columns 6 through 10 are connected with the "Alpha First Read" plughubs for Word 1. (2) The "1st Card Reading" plughub for column 11 is plugged with the "Pilot Selector" XPU plughub 1. (3) The "2nd Card Reading" plughubs for columns 1 through 11 are connected with the "Storage Entry" plughubs for Word 1. (4) The "IPU and Couple Exit" plughub of the pilot selector is plugged to the "Alpha-Input" plughub for Word 1. (5) Sign control for read-in is plugged for sign over units. The above-described plugboard wiring will be applicable to the alphanumerical input example now to be described and the numerical input example to be described subsequently.

*Alpha controls*

Assume the record card of Fig. 49 to be the bottommost card in the hopper 20 of Fig. 1 and that a card read operation has been initiated. The card will advance to the feed rolls and then pass between the read sensing brushes 22 and the contact roll 21 of the first reading station. The contact roll 21 will be connected with a constant source of potential as the card passes between the brushes 22 and the contact roll 21. In the present system the cards are fed past the sensing brushes with the "12" edge leading. The reader starting from its inoperative condition at the 288° position, as indicated by Fig. 52, proceeds through two complete read cycles; one cycle for passing the card by the 1st reading or upper analyzing station and the second cycle for passing the card by the 2nd reading or lower analyzing station.

Referring now to the circuitry of Figs. 7*a* and 7*b* and in conjunction with the timing chart of Fig. 52, at "12" index time of the first read cycle the first read sense brush for column 6 of the record card will sense the "12" perforation in column 6 of the record card and complete a circuit from the common contact roll 21, through the read sense brush for column 6 through the pluggable connections to the alpha first read plughub of Word 1, through the normally closed relay points 737–11 to energize the pick coil of zone relay 721–P.

At "11" index time, the first read sense brush for column 7 will sense the perforation completing a circuit from the common contact roll 21, through the column 7 sense brush, through the pluggable connection to the alpha first read plughub of Word 1, through the normally closed relay points 737–12 to energize the pick coil of zone relay 723–P. Also at "11" index time, the first read sense brush for column 11 will sense the perforation in the "11" index position of column 11 completing a circuit from the common contact roll 21, through the read sense brush for column 11, through the XPU plughub, through the relay points 226–1, closed under control of cam R–10 (bottom of Fig. 7*b*) during "12" and "11" index times, to energize the pick coil of the pilot select relay 229–P.

At "Zero" index time, the first read sense brush for column 8 will sense the perforation in column 8 completing a circuit from the common contact roll 21, through the read sense brush for column 8, through the pluggable connection to the alpha first read plughub of Word 1, through the normally closed relay points 740–1 to energize the pick coil of zone relay 725–P.

Summarizing the above, it has been shown that in the first reading station the sensing of the zone index positions of the illustrative record card has caused zone relays 721, 723, 725 and pilot select relay 229 to be energized. An examination of the circuit diagram (Fig. 7*a*) and the timing chart of Fig. 52 will indicate that the hold coils of the zone relays 721, 723 and 725 will remain energized through the −1 contact points of the relays in a closed position and under control of the cam R–42 until the 1° position of the second read cycle. The pilot select relay 229 (Fig. 7*b*) will remain energized through its own relay points 229–1 and under control of the cam R–8 until the 352° position of the second read cycle.

As the record card continues through the first reading station and at "1" index time the first read brush for column 6 will sense the hole in the corresponding column of the record card. This will cause an impulse to be supplied to the alpha first read plughub of Word 1. Relays 737 and 740 (Fig. 7*b*) are energized from "1" through "9" index times under control of cam R–45. Thus, the impulse at the alpha first read plughub will pass through the transferred contact points 737–11 and energize the pick coil of the numeric relay 722–P. Also at "1" index time the read brush for column 10 will sense the hold in column 10. This will cause an impulse to be passed through the alpha first read plughub of Word 1 and the transferred contact points 740–3 to energize the pick coil of the numeric relay 730–P.

At "5" index time of the first read cycle the hole in column 7 of the record card will be sensed and an impulse transferred through the alpha first read plughub and the relay points 737–12 transferred will serve to energize pick coil of numeric relay 724–P.

Similarly at "8" index time the hole in column 8 of the record card will be sensed and an impulse transferred that causes the pick coil of the numeric relay 726–P to be energized.

Summarizing, it has been shown that during the "1" through "9" index times of the first reading cycle the numeric relays 722, 730, 724 and 726 have been energized. These relays will hold through their respective −1 contact points under control of cam R–41 until the 55° position of the second read cycle. During the first read cycle the zone and numeric relays have been conditioned for the alpha-numeric input to the data processing machine. The data storing operation will now be described in detail.

*Data storing*

As the record card continues to move in the second read cycle towards the second reading station, during the 335° to 344° positions cam R–48 will close providing an "early time 1" potential impulse that is applied to various contact points of the zone control relays (Figs. 7*c* and 7*d*). The "early time 1" impulse proceeds through two circuit paths as follows: circuit one, from the plus potential line 290 through contacts controlled by cam R–48, through relay points 727–3N/C, through relay points 728–2N/C, through relay points 731–7N/C, through relay points 734–7N/C, through relay points 737–7N/C, through relay points 741–8 transferred to the plate of tube 306 in the read scan matrix; and circuit two from the plus potential line 290 through contacts controlled by cam R–48, through relay points 727–4N/C, through relay points 728–3N/C, through relay points 731–8N/C, through relay points 734–8N/C, through relay points 737–8N/C, through relay points 741–9 transferred to the plate of tube 307 in the read scan matrix.

*Read scan matrix*

The purpose of the read scan matrix is to sequence the transfer of electrical signals that are simultaneously initiated under control of the reader portion of the read-punch unit by the utilization of scanning pulses produced under control of the magnetic drum storage device. This effects a synchronization between the reader and the revolving magnetic storage drum, which units operate independently and are devoid of any mechanical connections therebetween.

Figure 7E:
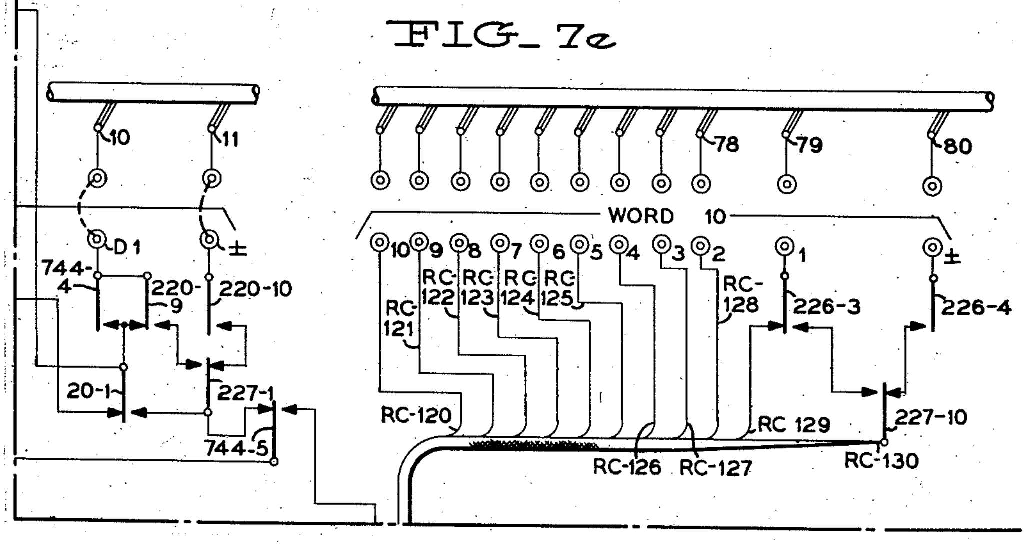
Figure 7F:
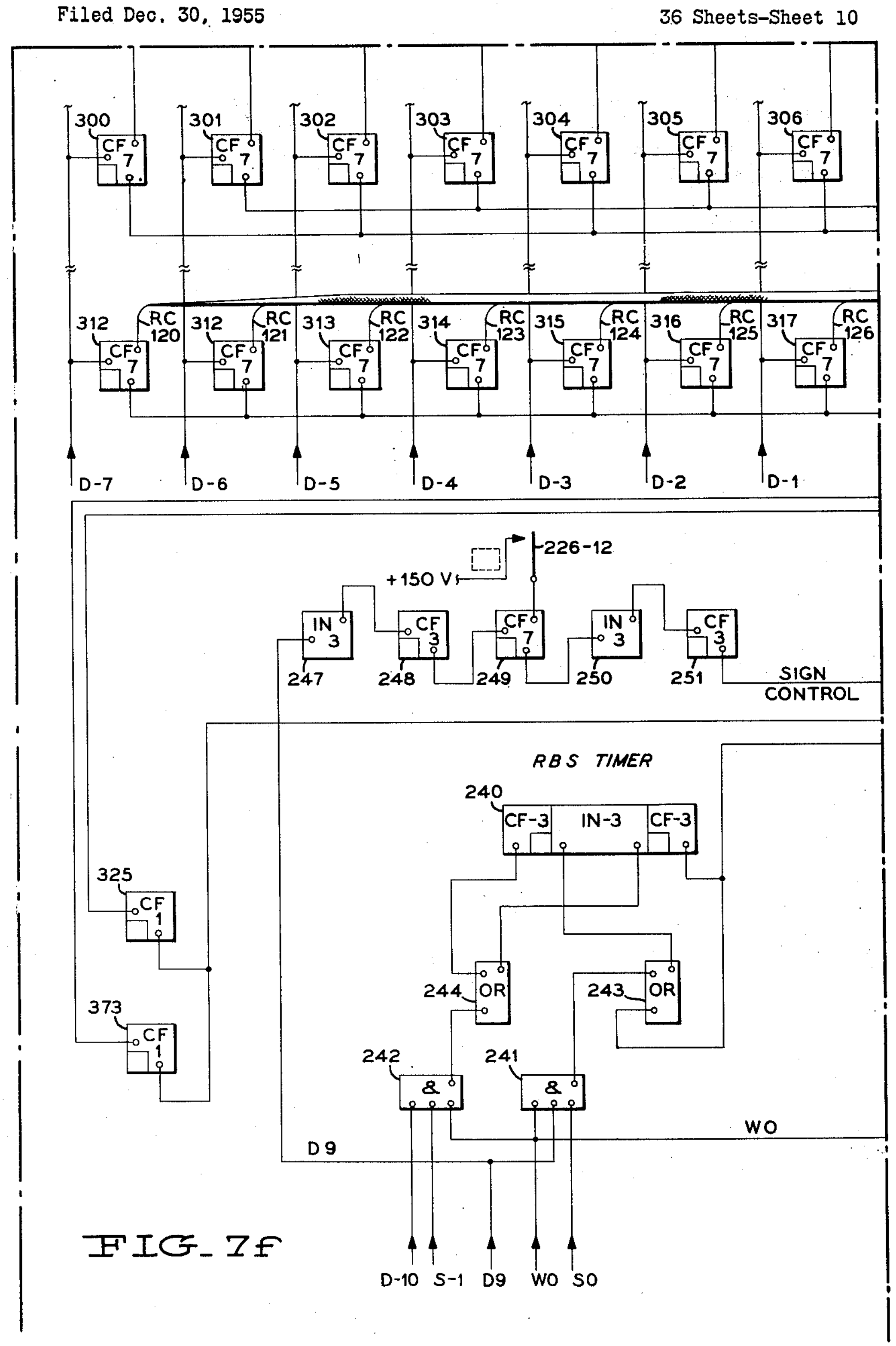
Figure 7G:
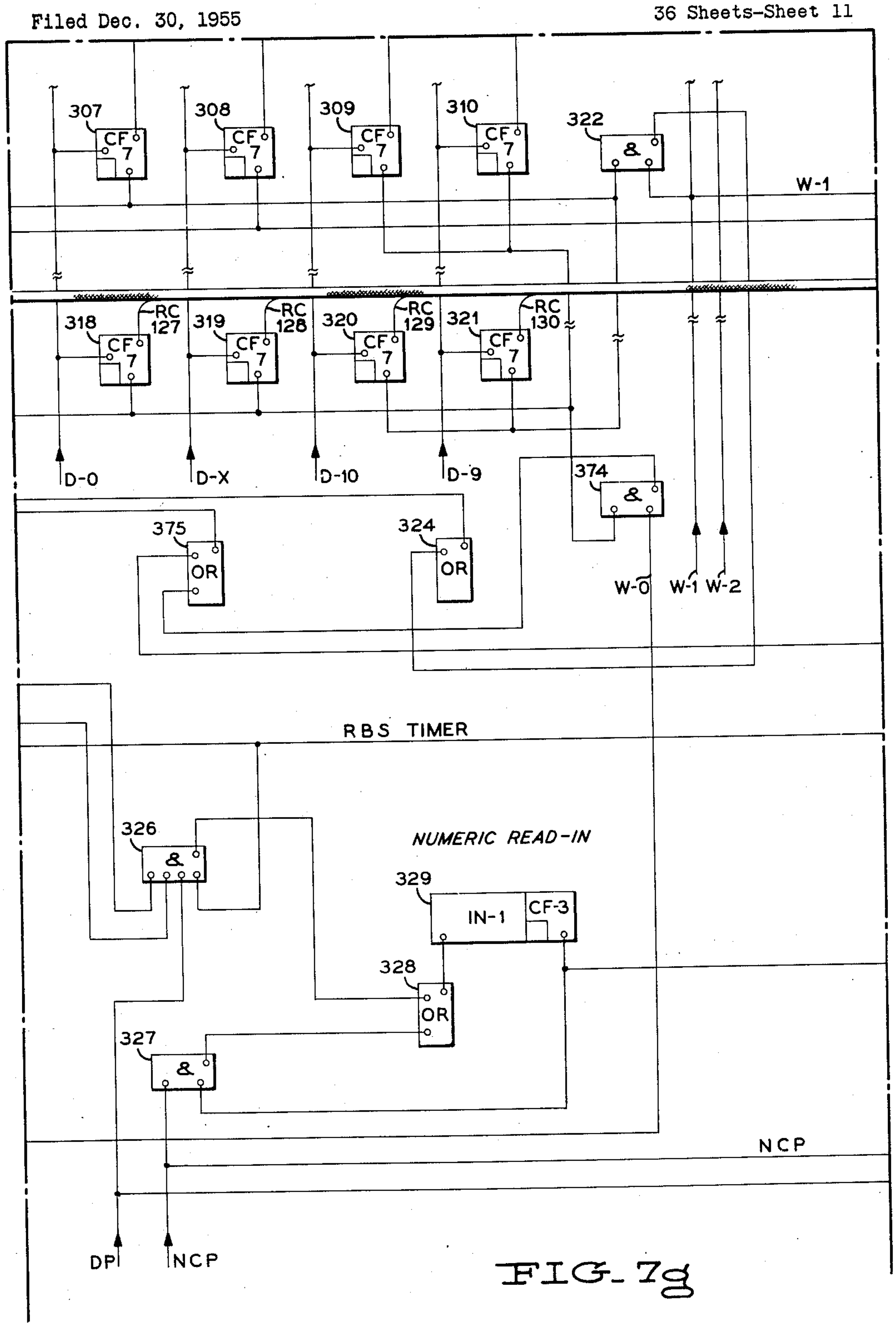
Figure 7H:
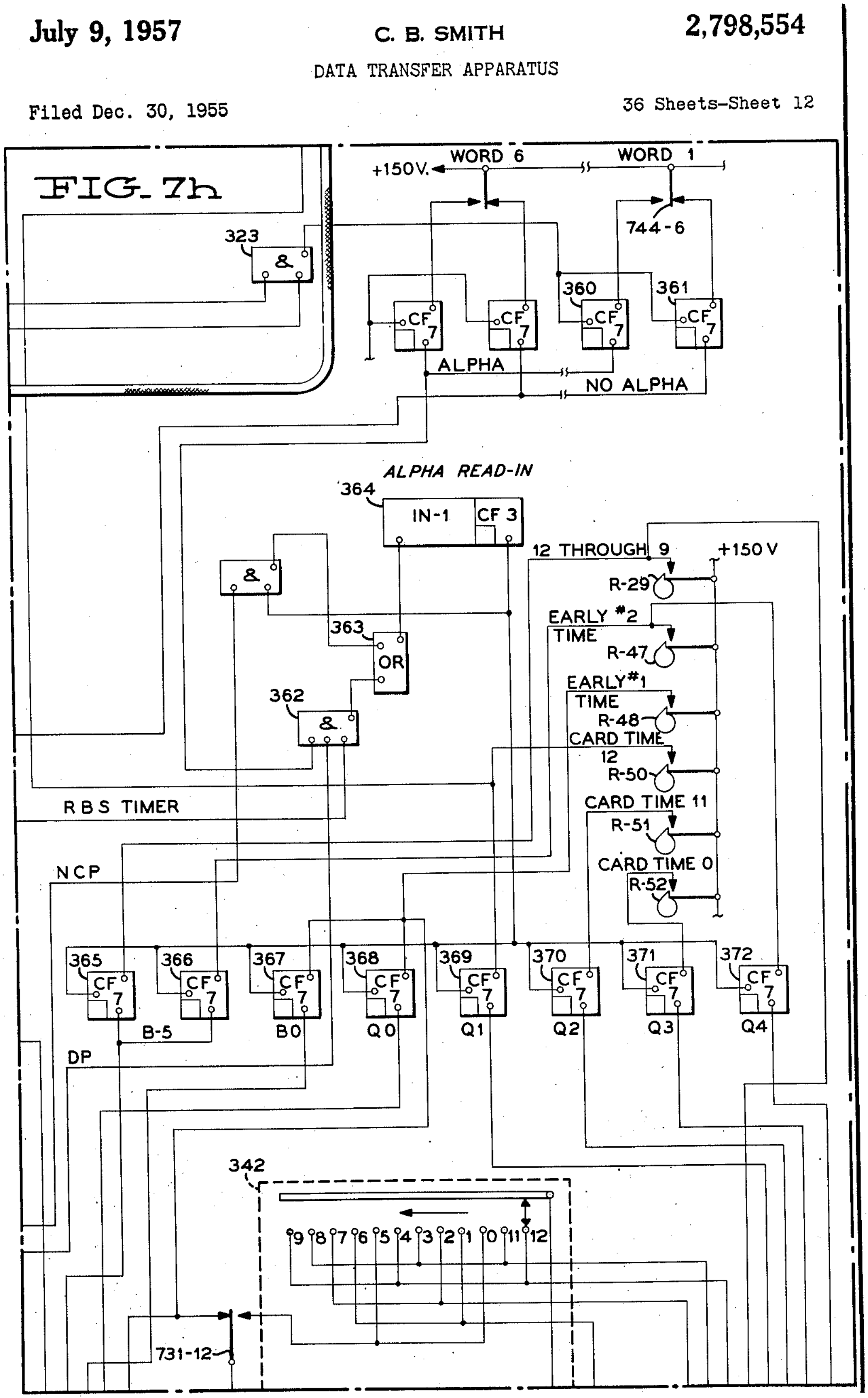

As represented on Figs. 7*f* and 7*g* the read scan matrix comprises ten horizontal rows of tubes (two rows of which are shown) with each horizontal row having eleven tubes. Each of the tube stages functions as a cathode follower type of circuit. The plate potential for each tube in the matrix is supplied from either a reader controlled cam contact or from the contact roll 23 (Figs. 7*c* and 7*d*) through one of the read sensing brushes of the second analyzing station under control of the perforation in the record card being read. The control grids of the tubes in each vertical row are common connected and the vertical rows are sequentially pulsed with digit pulses, from the right-hand row to the left-hand row for each word timing of the drum.

The tubes of the matrix are normally non-conductive. Any tube having a plate potential coincident with its corresponding digital timing pulse will be rendered conductive. The resulting output pulse from the cathode of a conductive tube is coupled to an "and" switch for the respective horizontal row in which the conductive tube is located. The "and" switches for each of the horizontal rows are scanned with word timing pulses. There will be a resultant pulse output from an "and" switch whenever there is a tube output which is coincident with a "W" pulse. The read scan matrix is scanned from right to left in each horizontal row and from top to bottom a total of five complete times for each complete rotation of the drum storage device.

Furthermore, it may be well to point out at this time that the read scan matrix is scanned with "D" and "W" pulses in advance of the true digital timings. This method of scanning is purposely done to offset electronic switching and data transfer delays which are inherent within the data processing machine. The actual method of recording will become more fully apparent as the description proceeds.

Returning now to the illustrative example, the positive plate potentials are simultaneously applied to the plates of tubes 306 and 307 during "early time 1" as described above. The grids of tubes 307 and 306 are repeatedly and successively scanned by D–0 and D–1 pulses for each word timing of the magnetic storage drum. The successively occurring output pulses from the cathodes of tubes 307 and 306 are successively applied to the "and" switches 322 and 323, respectively, which in turn are scanned by "W–1" timing pulses. On each occasion that there is a coincident input of a W–1 and signal impulses to the "and" switch 322 there will be a resultant pulse output. This resultant pulse output is passed through the "or" switch 324, the CF–1 tube 325 and applied to the "and" switch 326 wherein it is switched with an "RBS Timer" gate pulse, a "DP" and the "Sign Control" gate pulse.

The "RBS Timer" gate is cyclically positive during read-in cycles for one-fifth of each drum revolution when the RBS section of the buffer storage band is passing under the read-record heads associated with the buffer storage band of the drum to dynamically control the entry of data into RBS. The "RBS Timer" latch (Fig. 7*f*) comprises the tubes 240, "and" switches 241 and 242, and "or" switches 243 and 244. The "RBS Timer" latch is turned "on" by coincident S–0, W–0 and D–9 timing pulses applied to the "and" switch 241. The latch is turned "off" by coincident S–1, W–0 and D–10 timing pulses applied to the "and" switch 242. The details of the "on" and "off" switching in this type of latch were presented earlier.

The "DP" ("D" cell pulses) are cyclically occurring positive timing pulses that correspond to the "D" cell time of each digital position on the storage drum.

The "Sign Control" gate is normally positive except during "12" and "11" index times of each read feed cycle at which time it will be positive only during D–9 times. The function of the "sign control" gate is to control the recording of the value signs on the drum storage device when read from the "12" and "11" index positions of the record card. The "sign control" gate is controlled by the tubes 247 through 251 (Fig. 7*f*). The output from tube 251 is normally in an "up" condition. During "12" and "11" index times a plate potential is supplied to tube 249 via the contact points 226–12. Relay 226 (Fig. 7*b*) is energized during "12" and "11" index times under control of cam R–10. The output from tube 251 during "12" and "11" index times is "down" except during D–9 time when the D–9 timing pulse applied to the input grid of tube 247 and passed through the tubes 247 through 251 produces an "up" gate.

*Numeric read-in latch*

Figure 7J:
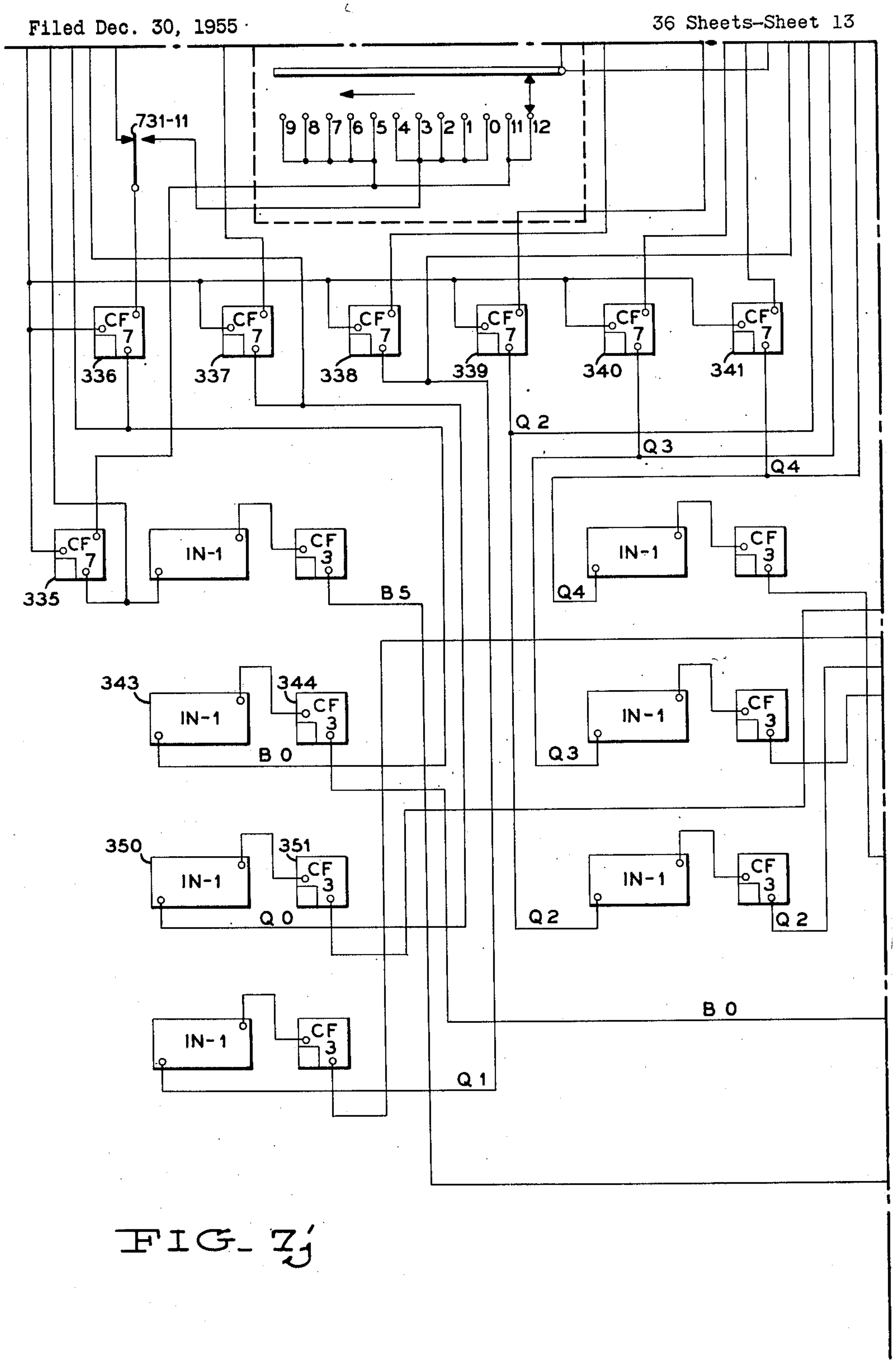
Figure 7K:
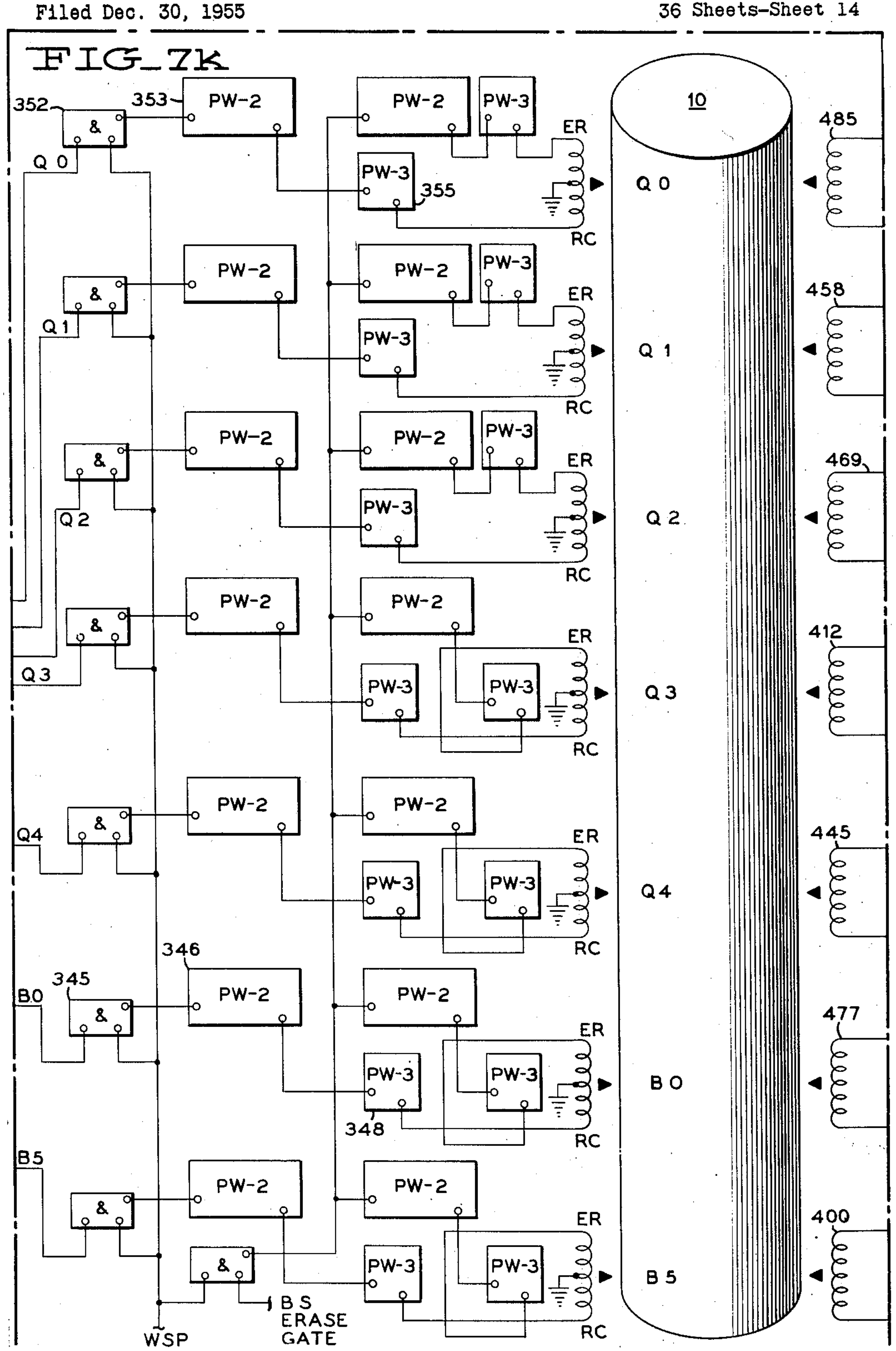

A coincident input of all four inputs to the "and" switch 326 will cause a resultant "DP" output that is passed through the "or" switch 328 and serves to turn "on" the numeric read-in latch 329, which will remain "on" until the ensuing NCP (negative "C" cell pulse) as applied to the "and" switch 327 turns the latch "off." The output of tube 325 as applied to an input of "and" switch 326 is an information gate as represented in line A of Fig. 58. In "and" switch 326 the information gate is switched with a "DP" (line B of Fig. 58) etc., to turn "on" the read-in latch 329 at the start of "D" cell time. Latch 329 remains in an "on" condition until the start of the succeeding "C" cell time when it is turned off by a "NCP" (line C, Fig. 58). The output from latch 329 is pulse lasting from "D" cell time until "C" cell time as shown by line D of Fig. 58. This numeric read-in latch 329 output is coupled to the grids of all the numeric translator tubes 335 through 341 (Fig. 7*j*).

*Numeric translator*

The plate potentials to the numeric translator tubes 335 through 341 are supplied under control of the read emitter 342. The emitter, schematically shown at 342 of Figs. 7*h* and 7*j* and with timing as indicated by line R–29 of Fig. 52, is a mechanically driven commutating device, which, in the subject system, is a part of the card reader. The emitter is similar in construction to the ones shown by Fig. 48*a* and described in Patent No. 2,615,569 to C. D. Lake et al., issued October 28, 1952. The emitter is capable of creating transient representations in the form of differentially timed pulses, which by their timing with reference to the cycle of operation of the card reader unit, are representative of digits corresponding to the index positions of the record card. Under control of the emitter, plate potentials are sequentially applied from the emitter segments to the plates of tubes 335 through 341 in predetermined combinations which are in accordance with the biquinary code of the preferred system.

During "early time 1" the plates of the B–0 tube 336 and the Q–0 tube 337 will be heated. Thus the numeric read-in latch 329 output signal applied to the numeric translator tubes 335 through 341 causes output signal pulses at the cathode outputs of tubes 336 and 337 to occur simultaneously. The pulse output from the B–0 tube 336 is passed through the IN–1 amplifier tube 343, the CF–3 tube 344 and applied to the "and" switch 345 wherein it is switched with a WSP (write sample pulse). A WSP is a positive pulse which is similar to a "BP" (B cell pulse). These pulses are used for sampling information gates which feed magnetic storage write amplifying circuitry and occur at a rate of 600 times per drum revolution. A coincident information pulse and WSP input to the "and" switch 345 produces a resultant record pulse output that is passed serially through the PW–2 tube 346 and the PW–3 tube 348 produces a write current, of the type indicated in line F of Fig. 58, to occur in the record coil for the B–0 track of the buffer storage band. The current flowing through a record coil produces a magnetic spot of a definite polarity on the surface of the drum which for the illustrative examples being described herein will be represented by a "+" mark in the appropriate position. In contradistinction the current flowing through an erase coil of the combinational heads would produce a magnetic spot of the opposite polarity. It may be assumed that the RBS portion was erased prior to the read-in of data from the record card. For purposes of simplification all the "—" marks which would normally appear in all bit storage positions other than those indicated by the "+" marks for the storage of data have been omitted from the fragmentary showings of the buffer storage tracks.

By reference to Fig. 58, it may be observed that in the wave forms for a write operation there is a delay of one digital position from the time the "A to A" information gate output from the read scan matrix is applied to the read-in latch and the time that the write current is produced in the record coil. Since the "early time 1" information pulse was passed through the read scan circuitry at D–0 time of W–1 and during the occurrence of an "RBS Timer" gate, according to the delay characteristics a record mark will be made on the B–0 track in the D–1 position of the 1st word of the RBS section of the buffer storage band, as schematically represented in Fig. 54.

Simultaneously and in a similar manner the pulse output from the Q–0 tube 337 is passed through the IN–1 amplifier tube 350, the CF–3 tube 351 and applied to the "and" switch 352 wherein it is switched with a WSP. The resultant output from the "and" switch 352 is passed serially through the PW–2 tube 353 and the PW–3 tube 355 to the record coil for the Q–0 track of the buffer storage band. This will cause a record mark to be made on the Q–0 track in the D–1 position of the 1st word of the RBS section of the buffer storage band, as schematically represented in Fig. 54.

Summarizing the above, it has been shown how an "early time 1" pulse has been passed through the alphabetic control relay points, the read scan matrix, the numeric translator and recorded as a zero in biquinary notation in the D–1 position of the 1st word of the RBS section of the buffer storage band.

Reverting back to the point where the plate potential was supplied to tube 306 of the read scan matrix at "early time 1," tube 306 is scanned with "D–1" pulses. The resultant outputs from the cathode of tube 306 is applied to the "and" switch 323 where it is switched with W–1 pulses. On each occasion that there is a coincident input of W–1 and signal impulses to the "and" switch 323 there will be a resultant pulse output which is transmitted to the alphabetic translator.

*Alphabetic translator*

The pulse output from "and" switch 323 is applied to the grids of tubes 360 and 361. The plate of tube 360 will be heated at this time because a read-in is being performed under an alphabetic mode of operation. As previously pointed out, the "IPU" control impulse caused the read alphabet control relays 741 and 744 (Fig. 7*b*) to be energized. Relay 744 in an energized condition causes the +150 volt line (Fig. 7*h*) to be connected through the relay points 744–6 transferred to the plate of tube 360. The coincident application of potentials to the plate and grid of tube 360 causes a resultant output at the cathode which is applied to the "and" switch 362 wherein it is switched with an "RBS Timer" gate and a "DP" (D cell pulse). The resultant "DP" output is passed through the "or" switch 363 and serves to turn "on" the alpha read-in latch 364 which is similar in its operation to the numeric read-in latch described above. The alpha read-in latch 364 output is coupled to the grids of all the alphabet translator tubes 365 through 372.

The plate potentials to the alphabet translator tubes 365 through 372 are supplied under control of the reader "R" cams. During "early time 1" the plates of the B–0 tube 367 and the Q–0 tube 368 will be heated. The coincident condition of potentials occurring at the plate and grid of tubes 367 and 368 causes cathode outputs to occur simultaneously. The pulse output from the B–0 tube 367 is passed through an IN–1 amplifier tube 343, the CF–3 tube 344 and applied to the "and" switch 345 wherein it is switched with a WSP (write sample pulse). A coincident information and WSP input to the "and" switch 345 produces a resultant record pulse output that is passed serially through the PW–2 tube 346 and the PW–3 tube 348 and applied to the record coil for the B–0 track of the buffer storage band. The information pulse was passed through the read scan circuitry at D–1 time of W–1 and during the occurrence of the "RBS Timer" gate, a record mark will be made in the B–0 track in the D–2 position of the 1st word of the RBS section of the buffer storage band, as shown by Fig. 54.

Simultaneously and in a similar manner, the pulse output from the Q–0 tube 368 is passed through the IN–1 amplifier tube 350, the CF–3 tube 351 and applied to the "and" switch 352 wherein it is switched with a WSP. The resultant output from the "and" switch 352 is passed serially through the PW–2 tube 353 and the PW–3 tube 355 to the record coil for the Q–0 track of the buffer storage band. This will cause a record mark to be made on the Q–0 track in the D–2 position of the 1st word of the RBS section of the buffer storage band (see Fig. 54).

Recapitulating, it has now been shown how at "early time 1," pulses have passed through the alphabetic control relay points, the read scan matrix, the numeric translator, the alphabetic translator and recorded as zeroes according to the biquinary code system in both the D–1 or numeric and D–2 or zone positions of the 1st word of the RBS section of the buffer storage band. In this manner during "early time 1," zeroes are entered in both the zone and numeric digit positions which correspond to the digit positions for the blank column 9 of the record card. Generally stated, at "early time 1" zeroes are inserted in the zone and numeric digit positions of the drum for all blank columns within any word of alphanumeric information in the record card media of storage.

As the record card continues to move in the second read cycle and towards the second analyzing station, during the 350° to 359° positions cam R–47 will close providing an "early time 2" potential impulse that is applied to various contact points of the zone control relays (Figs. 7*c* and 7*d*). The "early time 2" impulse will find a circuit path, in accordance with the relay conditions established during the time the card was passing through the first analyzing station, as follows: from the plus potential line 290 through contact points controlled by cam R–47, through relay points 729–2N/C, through relay points 730–2 transferred, through relay points 731–9N/C, through relay points 734–9N/C, through relay points 737–9N/C, through relay points 741–10 transferred to the plate of tube 308 in the read scan matrix.

The grid of tube 308 is repeatedly scanned by D–X pulses for each word timing of the magnetic storage drum. The output pulses from the cathode of tube 308 are applied to the "and" switch 323 wherein the pulses will be switched with a W–1 timing pulse. A coincident input of an information representing pulse and a W–1 timing pulse will produce a resultant output pulse which is transmitted via tube 360 to turn "on" the alpha read-in latch in the same manner as previously described. The resultant alpha read-in latch 364 output will be applied to the grids of tubes 365 through 372. During "early time 2" the plates of the B–5 tube 366 and the Q–4 tube 372 will be heated. The resultant output pulses at the cathodes of tubes 366 and 372 occur simultaneously. The pulse output from the B–5 tube 366 is passed through the amplifier circuitry and switched with a WSP to initiate a record pulse that causes a mark to be recorded in the B–5 track at the D–0 position of the 1st word in a manner similar to that explained above for the "early time 1" recordings. Similarly the pulse output from the Q–4 tube 372 is passed through the amplifier circuitry and switched with a WSP to provide a record pulse that causes a recording to be made in the Q–4 track at the D–0 position of the 1st word.

Recapitulating, it has now been shown how at "early time 2," a pulse has passed through the alphabetic control relay points, the read scan matrix, the alphabetic translator and recorded as a "9" in the D–0 position of the 1st word of the RBS section of the buffer storage band. In this manner during "early time 2," a nine is entered in the zone position of read buffer storage which corresponds to column 10 of the record card. Generally stated, at "early time 2" nines are entered into the zone positions of the drum for all numeric characters within any word of alphanumeric information in the record card media of storage.

As the record card continues in the second read cycle, at the 1° position the zone relays 721, 723 and 725 (Fig. 7*a*) which were picked up during the first read cycle and held under cam R–42, will now be restored to their normally de-energized position. Also the "card read timer alphabet" relay 731 (Fig. 7*b*) for word 1 will be energized under control of cam R–43 and will remain energized until the 241° position of the read cycle. Referring now to the circuitry of Figs. 7*c* and 7*d* in conjunction with the timing chart of Fig. 52, at "12" index time of the second read cycle the second station read sense brush for column 6 of the record card will sense the "12" perforation and complete a circuit from the common contact roll 23, through the read sense brush for column 6, through the pluggable connection, through relay points 741–12 transferred, through relay points 731–1 transferred, through relay points 734–1N/C, through relay points 737–1N/C, through relay points 741–2 transferred to the plate of tube 300 in the read scan matrix. Another circuit is completed from the common contact roll 23, through the read sense brush for column 6, through the pluggable connection, through relay points 741–12 transferred, through relay points 731–2 transferred, through relay points 734–2N/C, through relay points 737–2N/C, through relay points 741–3 transferred to the plate of tube 301 in the read scan matrix. Also under control of the cam R–50 (Fig. 7*h*) a positive potential is supplied through the relay points 744–5 transferred (Fig. 7*e*) to the plate of tube 310 in the read scan matrix.

The grid of tube 301 is scanned with D–6 pulses and the resultant outputs of tube 301 are applied to the "and" switch 322 wherein they are switched with W–1 pulses. A coincident condition at the inputs to "and" switch 322 produces a resultant output that is coupled through the "or" switch 324, the CF–1 tube 373 (Fig. 7*f*) and applied to the "and" switch 326. At this point the information pulse is blocked by the sign control gate, which during "12" and "11" index time of the reader is down except at D–9 drum time, as previously explained. This prevents a coincident input to "and" switch 326 during D–6 time.

The grid of tube 300 is scanned with D–7 pulses and the resultant outputs of tube 300 are applied to the "and" switch 323 wherein they are switched with W–1 pulses. A coincident condition of the inputs to the "and" switch 323 produces a resultant output that is applied to the grid of tubes 360 and 361. The output from tube 360 is applied coincidently with an "RBS Timer" gate and DP input to the "and" switch 362. The output of the "and" switch 362 serves to turn on the alpha read-in latch 364. The resultant latch 364 output is coupled to the grids of the alphabetic translator tubes 365 through 372. At "12" index time the plates of the B–5 tube 365 and the Q–1 tube 369 will be heated under control of the cams R–29 and R–50, respectively. The resultant B–5 and Q–1 outputs are passed through the amplifier and sampling tube stages to the record coils of the heads associated with the B–5 and Q–1 tracks and cause marks to be recorded in the respective tracks in the D–8 position of the 1st word of the RBS section in the same manner as previously described.

The grid of tube 310 is scanned with D–9 pulses and the resultant outputs of tube 310 are applied to the "and" switch 374 wherein they are switched with W–0 pulses. The reason for switching with W–0 pulses at this time instead of W–1 pulses, as previously used, is that in keeping with the system of recording in the preferred embodiment, a word of information is actually stored in the RBS section by a shift of two digital positions in advance of the true word layout on the drum surface. The reason for advancing the storage locations is to offset data transfer and switching delays that occur within the data processing machine.

A coincident condition of information and W–0 inputs to the "and" switch 374 produces a resultant output that is passed through the "or" switch 375, the CF–1 tube 325 and applied to the "and" switch 326. Herein the information signal is switched with an "RBS Timer" gate, a DP, and a sign control signal gate, which during "12" index time of the reader and D–9 time of drum timing will be positive thereby providing a resultant DP output from the "and" switch 326 that turns the numeric read-in latch 329 "on." The resultant latch output is coupled to the grids of the numeric translator tubes 335 through 341. At "12" index time the plates of the B–5 tube 335 and the Q–4 tube 341 will be heated under control of the read emitter 342. The resultant B–5 and Q–4 outputs are passed through the amplifier and sampling stages to the record coils of the heads associated with the B–5 and Q–4 tracks and cause marks to be recorded in the respective tracks in the D–10 position of word 0 of the RBS section.

Recapitulating, the drum recordings made during "12" index time, a "6" has been stored in biquinary code form in the D–8 position of word 1 of the RBS section of the drum, which corresponds to a zone position recording for the character "A" in column 6 of the record card. In the system of the preferred embodiment during read-in of alphanumeric information and at "12" index time of the reader a "6" will be stored in each of the zone positions of drum storage which correspond to any of the alphabetic characters A through I that may be included in any of the alphanumeric words of data in the record card storage media. A "9" has been stored in biquinary form in the D–10 position of word 0 of the RBS section of the drum, which corresponds to a + sign recording. As previously pointed out all alphanumeric words are stored as positive values.

As the record card continues in the second read cycle, at "11" index time the second station read sense brush for column 7 of the record card will sense the "11" perforation and complete a circuit from the common contact roll 23, through the read sense brush for column 7, through the pluggable connection, through relay points 744–1 transferred, through relay points 731–3 transferred, through relay points 734–3N/C, through relay points 737–3N/C, 741–4 transferred to the plate of tube 302 in the read scan matrix. Another circuit is completed from the common contact roll 23, through the read sense brush for column 7, through the pluggable connection, through relay points 744–1 transferred, through relay points 731–4 transferred, through relay points 734–4N/C, through relay points 737–4N/C, through relay points 741–5 transferred to the plate of tube 303 in the read scan matrix.

The grid of tube 303 is scanned with D–4 pulses and the resultant outputs of tube 303 are applied to the "and" switch 322 wherein they are switched with W–1 pulses. A coincident condition at the inputs to "and" switch 322 produces a resultant output that is coupled through the "or" switch 324, the CF–1 tube 373 and applied to the "and" switch 326. At this point the information pulse is blocked by the sign control gate, which as previously stated, during "12" and "11" index time of the reader is down execpt at D–9 drum time. This prevents a coincident input to the "and" switch 326 during D–4 time.

The grid of tube 302 is scanned with D–5 pulses and the resultant outputs of tube 302 are applied to the "and" switch 323 wherein they are switched with W–1 pulses. A coincident condition of the inputs to the "and" switch 323 produces a resultant output that is passed through tube 360 and coincidently switched with an "RBS Timer" gate and DP inputs to "and" switch 362. The resultant output serves to turn on the alpha read-in latch 364. The latch output is coupled to the grids of the alphabetic translator tubes 365 through 372. At "11" index time the plates of the B–5 tube 365 and the Q–2 tube 370 will be heated under control of the reader cams R–29 and R–51, respectively. The resultant B–5 and Q–2 outputs are passed through the amplifier and sampling tube stages to the record coils of the heads associated with the B–5 and Q–2 tracks and cause marks to be recorded in the respective tracks in the D–6 position of word 1 of the RBS section.

Recapitulating, the drum recordings made during "11" index time, a "7" has been stored in biquinary code form in the D–6 position of word 1 of the RBS section of the drum, which corresponds to a zone position recording for the character "N" in column 7 of the record card. During the read-in of alphanumeric information and at "11" index time of the reader a "7" will be stored in each of the zone positions of drum storage which correspond to any of the alphabetic characters J through R that may be included in any of the alphanumeric words of data in the record card.

As the record card continues in the second read cycle and between the "11" and "0" index times the "column split 11–0 alphabet" entry control relay 734 (Fig. 7*b*) will be energized under control of cam R–44. At "0" index time the second station read sense brush for column 8 of the record card will sense the "0" perforation and complete a circuit from the common contact roll 23, through the read sense brush for column 8, through the pluggable connection, through relay points 744–2 transferred, through relay points 726–4 transferred, through relay points 734–5 transferred, through relay points 737–5N/C, through relay points 741–6 transferred to the plate of tube 304 in the read scan matrix.

The grid of tube 304 is scanned with D–3 pulses and the resultant output is switched with W–1 pulses and passed through the "and" switch 323 to turn "on" the alphabet read-in latch 364 in the same manner as described above on several occasions. The latch output is coupled to the grids of the alphabetic translator tubes 365 through 372. At "0" index time the plates of the B–5 tube 365 and the Q–3 tube 371 will be heated.. The output signals caused recordings to be made in the D–4 position of word 1 of the B–5 and Q–3 tracks of the RBS section.

Recapitulating, the drum recordings made during "0" index time, an "8" has been stored in biquinary code form in the D–4 position of word 1 of the RBS section of the drum, which corresponds to the zone position recording for the character "Y" in column 8 of the record card. During the read-in of alphanumeric information and at "0" index time of the reader an "8" will be stored in each of the zone positions of drum storage which correspond to any of the alphabetic characters S through Z that may be included in any of the alphanumeric words of data in the record card.

As the record card continues in the second read cycle and between the "0" and "1" index times the "column split 0–1" control relays 737 and 740 (Fig. 7*b*) for word 1 will be energized under control of cam R–45. At "1" index time the second station read sense brush for column 6 of the record card will sense the "1" perforation and complete a circuit from the common contact roll 23, through the read sense brush for column 6, through the pluggable connection, through relay points 741–12 transferred, through relay points 737–1 transferred, through relay points 741–2 transferred to the plate of tube 300 in the read scan matrix. Due to the digital and word pulse scanning, the output of tube 300 will be passed through the alphabetic translator tubes and cause a recording to be made in the D–8 position of word 1 of the B–5 track of RBS section according to the techniques described above. As previously described, a recording was made in the D–8 position of word 1 of the B–5 at "12" index time. The re-recording does not complicate the operation but merely insures a recording in the particular position on the drum.

Also at "1" index time the second station read sense brush for column 6 of the card will make a circuit as follows: from the common contact roll 23, through the read sense brush for column 6, through the pluggable connection, through relay points 741–12 transferred, through relay points 737–2 transferred, through relay points 741–3 transferred, to the plate of tube 301 in the read scan matrix. The output of tube 301 will be passed through numeric read-in latch and translator tubes and cause recordings to be made in the D–7 position of word 1 of the B–0 and Q–1 tracks.

Also at "1" index time the second station read sense brush for column 10 will make a circuit as follows: from the common contact roll 23, through the read sense brush for column 10, through the pluggable connection through relay points 744–4 transferred, through relay points 737–9 transferred, through relay points 741–10 transferred to the plate of tube 308. The output of tube 308 passes through the alphabetic read-in and translator circuitry and results in a recording being made in the D–0 position of word 1 of the B–5 track. A second circuit is completed as follows: from the common contact roll 23, through the read sense brush for column 10, through the pluggable connection, through relay points 744–4 transferred, through relay points 737–10 transferred, through relay points 741–11 transferred to the plate of tube 309. The output of tube 309 passes through the numeric read-in and translator circuitry and results in recordings being made in the D–X position of word 1 in the B–0 and Q–1 tracks.

In a similar manner at "5" index time the perforation in column 7 will cause recordings to be made in the D–6 position of word 1 in the B–5 track and in the D–5 position of word 1 in the B–5 and Q–0 tracks. At "8" index time the perforation in column 8 of the card will cause recordings to be made in the D–4 position of word 1 of the B–5 track and in the D–3 position of word 1 in the B–5 and Q–3 tracks.

Summarizing, there has been shown and decsribed how the system operates to accomplish a read-in of alphanumeric data from a punched record card to a magnetic drum storage device. The magnetic storage of the alphanumeric data in the RBS of the magnetic storage drum is as represented by Fig. 54. Due to the difference in speed of operation between the card reader and the magnetic drum, an individual revolution of the drum storage device is assigned for the storage of each different kind of character. The storage of data in this manner during successive revolutions of the drum storage device involves the interspersion of magnetic recordings in order to provide a sequential arrangement of the data on the drum storage device.

*Numeric read-in*

It will now be shown how the same pluggable setup is used to accommodate the read-in of numeric data. For example, we may assume a record card about to enter the first read station and punched 0 through 9 in columns 1 to 10 with an "11" punch over the digit "9" in column 10 (Fig. 50). Column 11 contains no "11" punch thereby indicating that the card is numeric. The value represented is −0123456789 comprising ten digits and a sign. As the card advances through the first reading station, at "11" time the hole in column 10 will be sensed and causes an impulse that will energize the zone relay 729 (Fig. 7*a*). Nothing further occurs until "5" index time. At "5" index time an impulse will be available at the read sense brush for column 6 which will cause the numeric relay 722 to be energized. At "6" index time the impulse through the read sense brush for column 7 will cause numeric relay 724 to be energized. At "7" index time numeric relay 726 will be energized. At "8" index time, numeric relay 728 will be energized. At "9" index time, numeric relay 730 will be energized. The zone relay 729 will hold through its −1 point under control of cam R–42. The numeric relays 722, 724, 726, 728 and 730 will hold through their −1 points under control of cam R–41.

As the record card progresses from the first read station into the second read station an "early 1 time" impulse under control of cam R–48 (Fig. 7*c*) will be passed through circuitry formed through the contact points of the zone and numeric relays that are in an energized condition. However, the circuitry will not be entirely completed to the plates of the tubes in the read scan matrix because the alphanumeric control relays 741 and 744 (Fig. 7*b*) were not energized by an "11" index position hole in column 11 of the record card. Similarly in "early 2 time" impulse will be passed through circuitry of the energized zone and numeric relays but will fail to reach the plates of tubes in the read scan matrix. It should be apparent that unless the alphanumeric control relays for a given word are energized during the reading of the card in the first reading station, it is impossible for the early time impulses to cause recordings to be made in the RBS section of the storage drum.

As the card progresses and at "11" index time of the second read cycle, an impulse is developed at the read sense brush for column 10 (Fig. 7*e*). This impulse is pluggably wired to the D–1 plughub for word 1, through the column split relay point 220–9 transferred, relay 220 is energized for "12" and "11" index times under control of cam R–10 (Figs. 7*b* and 52), through the "sign over unit" relay control point 227–1 transferred, through the alphabetic control relay points 744–5 in a normal condition to the plate of tube 310 in the read scan matrix. Herein the impulse is switched with D–9 timing pulses and the resultant output of tube 310 is applied to the input of "and" switch 374 wherein it is switched with W–0 timing pulses. The resultant output pulse from "and" switch 374 turns "on" the numeric read-in latch 329. The numeric read-in latch 329 output is applied to the grids of the translator tubes 335 through 341. At "11" index time the plates of the B–5 tube 335 and the Q–3 tube 340 will be supplied with plate potential under control of the read emitter 342. Thus, the numeric read-in latch 329 output is translated into B–5 and Q–3 pulses which are recorded in the D–10 position of W–0 of the RBS section of the drum as represented in Fig. 55.

As the card progresses in the second read analyzing station and at "0" index time, an impulse is developed at the read sense brush for column 1 (Fig. 7*c*). This impulse is pluggably wired to the D–10 plughub for word 1 and through the normally closed contact points 741–2 to the plate of tube 300 in the read scan matrix. D–7 timing pulses are applied to the grid of tube 300 and the resultant outputs of tube 300 are coupled to the "and" switch 323 wherein the outputs of tube 300 are switched with W–1 timing pulses. The resultant output pulse from "and" switch 323 is applied to the grids of tubes 360 and 361. Since the particular example now being described is for a numeric mode of operation, relay 744 will be in a normal condition which causes the +150 volt potential to be connected through the relay contact points 744–6N/C to the plate of tube 361. The coincident plate and grid potentials for tube 361 causes a resultant output which is coupled through the "or" switch 375 and serves to turn on the numeric read-in latch 329. The numeric read-in latch 329 output is applied to the grids of the translator tubes and translated into B–0 and Q–0 pulses for recording purposes. The recordings are made in the B–0 and Q–0 tracks, in the D–8 position of word 1 in the RBS portion of the buffer storage band, as schematically shown by Fig. 55.

At "1" index time an impulse will be initiated at the read sense brush for column 2 (Fig. 7c). This impulse is pluggably wired to the D–9 plughub for word 1 and through the normally closed contact points 741–12 and 741–3 to the plate of tube 301 in the read scan matrix. D–6 pulses are applied to the grid of tube 301. The resultant outputs of tube 301 are coupled to the "and" switch 322 and switched with W–1 timing pulses. The output of the "and" switch 322 serves to turn on the numeric read-in latch 329. The latch output is applied to the grids of the translator tubes and translated into B–0 and Q–1 pulses for recording purposes. The recordings are made in the B–0 and Q–1 tracks, the D–7 position of word 1 in the RBS portion of the drum, as shown schematically by Fig. 55.

As the record card continues to advance through the second read analyzing station the columns 3 through 10 will be successively sensed and in a manner similar to that described above impulses will be initiated and passed through the numeric translator circuitry and translated into recording pulses according to the biquinary system for recording the digit values in the RBS section of the drum. After the record card has passed completely through the second analyzing station of the reader the complete value as read from the record card of Fig. 50 will be magnetically stored on the storage drum as schematically represented by Fig. 55.

Recapitulating, it has been shown how the numeric value −0123456789, as stored by punchings in a record card has been sensed, translated into biquinary code representations, and sequentially stored on the magnetic drum storage device.

*Data read-out*

Attention will now be directed to the operation of transferring data from PBS (punch buffer storage) to a record card which will be most easily understood by following the description of the transfer of an illustrative value from the buffer storage band to a record card.

As previously stated, in the preferred embodiment the PBS actually starts at the S–2, W–7, D–0 position of the drum and continues through the succeeding ten word positions. A fragmentary portion of the PBS section of the drum is shown by Fig. 56, representing an alphanumerical word of data ANY–1 stored in the first word position of PBS and beginning at the S–2, W–7, D–0 position. As previously pointed out, all alphanumerical words are stored on the drum storage device as positive values. In the illustrative example the digit "9" stored in the D–0 position of W–7 is indicative of the positive sign.

*Punch unit*

The read-punch unit 14 (Fig. 1) includes a record punching portion. The punch portion is similar in construction to the record card perforating machine disclosed in Reissue Patent No. 21,133 to C. D. Lake, issued June 27, 1939. For details of construction reference may be had to Reissue Patent No. 21,133.

The punch unit has the function of selectively perforating cards, in response to electrical signals representative of data which is to be recorded in the record card.

The punch unit comprises a card hopper for holding a quantity of blank record cards, a plurality of punching devices one for each column of the record card arranged in a single line, a punch control magnet for each of the punching devices, and card feeding mechanism for causing the cards to be moved past the line of punching devices. When a card feed cycle is initiated, a blank card is withdrawn from the card hopper and advanced "12" edge first towards the line of punching devices. The cards are intermittently moved past the line of punching devices. At the time the blank card is intermittently moved under the line of punching devices, data representing signals selectively energize the punch control magnets for controlling a related punch. The blank cards pause momentarily at each index point position so that if a perforation is to be made, the punching device has time to penetrate and withdraw from the punched card. In the punch unit, blank cards are moved past the line of punching devices so that the horizontal rows of index positions "12," "11" and "0" through "9" are successively aligned with the single row of punching devices. In other words all "12's" are simultaneously punched in the card and then all "11's" are simultaneously punched in the card, and so on through the "9" index position. This punching operation involves the interspersion of columnar perforations. In order to satisfy the operating conditions of the punch unit, it is necessary to read out all "12's" in the ten words stored in PBS and punch them in the card. This is followed by the read-out and punching of all "11's" and so on through the "nines." This type of operation requires a different revolution of the drum storage device for the read-out of each different kind of character. The operation will be elaborated in the following description. A schematic representation of the plugboard adapted for use in the preferred system is shown in Fig. 51. The plugboard includes eighty punch magnet plughubs, one for each of the eighty card columns of the record card and one hundred ten data storage exit plughubs corresponding to the one hundred ten digital storage positions in the PBS section of the drum. The interplughub wiring as shown is to accommodate an illustrative problem wherein a word value stored in the first word position of PBS is to be recorded in the first eleven columns of a record card. This will become more fully apparent as the description proceeds.

Fig. 51 includes the pluggable arrangement for the punch-out of data in accordance with the illustrative example. (6) The "Control Information" plughub 10 is plugged to the "Alpha Output" plughub for word 1 (W–1). (7) The "Storage Exit" plughubs for word 1 are plugged to the "Punch Magnet" plughubs 1 through 10. (8) Sign control for punch-out is plugged for sign over units. The above-described wiring will be applicable for the read-out of alphanumerical data now to be described.

The control for the read-out of alphanumerical data is signified in the preferred embodiment by a digit "8" stored in predetermined digital positions of word 10 in PBS. When a punch-out cycle of operation is initiated the control "8's" are read from the PBS and serve to set up the alphanumerical control read-out relays. The details of this control will become more apparent as the description proceeds.

We may assume a read-out cycle to have been initiated. This will cause a blank card to be fed from the card hopper to the punch station. In accordance with the pluggable wiring described above an "8" is stored in the D–10 position of word 10 of PBS to indicate that the first word in PBS is alphanumerical. This position for storing the "8" was arbitrarily chosen. Any other digital position within word 10 of PBS may have been selected provided the wiring of the plugboard was done so as to accommodate the selected position. During the first drum revolution following the initiation of the punch-out cycle the magnetic spots, recorded in the D–10 position of word 10 of the B–5 and Q–3 tracks and representative of a digit "8" in accordance with the biquinary system of coding, will produce signals in the combinational read-record heads associated with the B–5 and Q–3 tracks.

*Data reading from the storage drum*

The discrete spot system of recording used in the preferred embodiment produces a bi-polar read signal for every recorded spot. On each occasion that a magnetic spot located on a track of the drum passes the reading head associated with the track, a bi-polar signal will be developed in the read coil of the reading head. These bi-polar signals are of the type shown in line G of Fig. 58. A so-called down-up signal is the read signal developed when reading a spot that has been selected to represent a stored "+" signal. A so-called up-down signal is the read signal developed when reading a spot stored during an erase operation as a "—" signal.

For example, the signal developed in the read coil 400 (Fig. 7*k*) of the head for the B–5 track is coupled to the input grid of the voltage amplifier tube 401 of the VA–1 type for which the details of operation were presented previously. The VA–1 tube is a two stage class A voltage amplifier employed herein to amplify the low level read signal produced in the read coil.

The output from the plate output terminal of tube 401 is coupled to the grid input terminal of the two-stage shaping amplifier tube 402 of the SA–1 type, the operation being particularly described previously. The function of this tube is to develop pulses of approximately three microseconds for every magnetic "+" signal sensed, and a slightly narrower pulse for each magnetic "—" signal sensed, as indicated by the pulses shown in line H of Fig. 58. In the case of a magnetic "+" signal the pulse occurs just after the center of the bi-polar read signal or at approximately the midpoint of "D" cell time, while the "—" signal produces a pulse which starts in the beginning portion of the bi-polar read signal or just after the start of "C" cell time, as indicated by the timing chart of Fig. 58.

For the particular example being described the signal output for the "+" signal from the plate terminal of tube 402 is coupled to the grid input terminal of the cathode follower tube 403. This is a condenser coupled cathode follower utilizing diode clamping in the grid circuit for the purpose of restoring the reference axis of the unidirectional output pulse of the shaper amplifier tube 402. The positive signal output from the cathode output terminal of tube 403 is coupled to "and" switch 404. Herein the pulse is switched with a positive read sample pulse (RSP) applied to the "and" switch 404 for the purpose of turning "on" the B–5 read latch, comprising the IN–1 and CF–3 cathode follower tubes 405 (Fig. 7*m*).

Read sample pulses (RSP) are positive cyclically occurring pulses starting at the midpoint of "A" cell time and having a duration of substantially one cell time as indicated by line K of Fig. 58. The read sample pulses (RSP) are initiated by magnetic spot recordings from an "A" cell timing track on the drum through a record coil of a head physically located at a shifted position removed from the true "A" cell timing position.

Figures 1, 7:
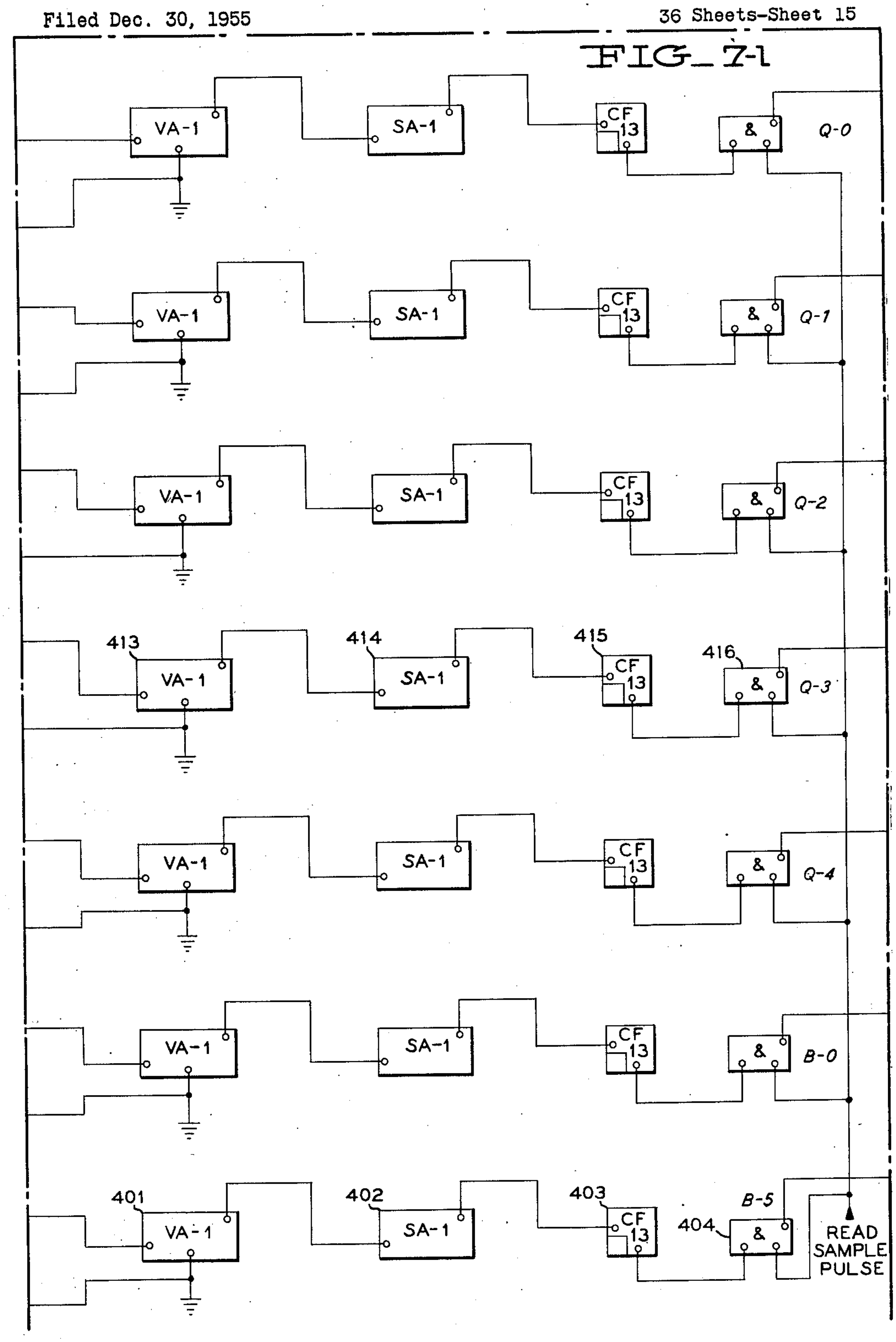
Figure 7M:
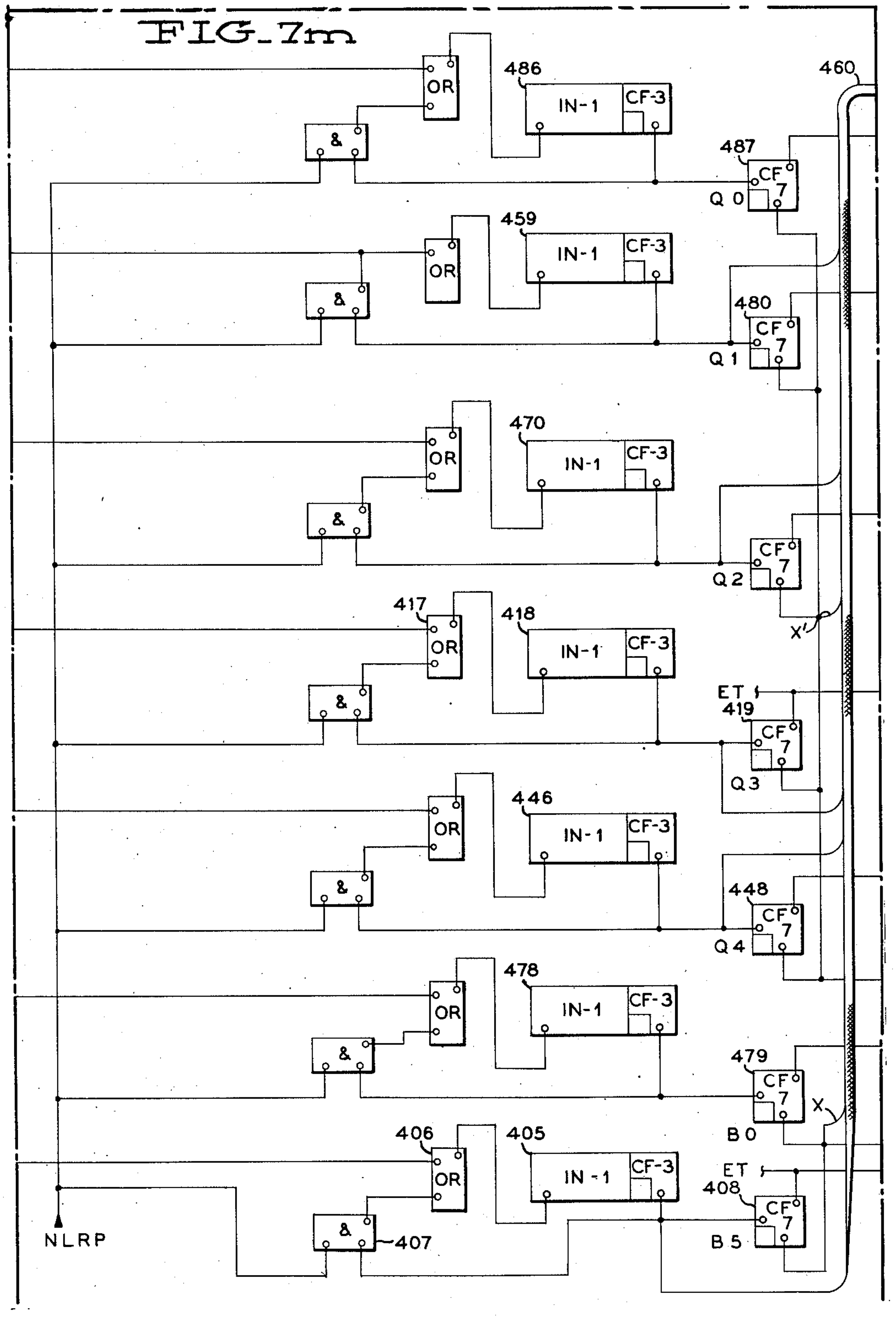

Referring now to Fig. 7–*l*, wherein the positive pulse output from tube 403 is applied to "and" switch 404 and switched with a "read sample pulse" also applied to the switch 404, the coincidence of these positive pulses provides a resultant pulse which is passed through the "or" switch 406 and serves to turn "on" the B–5 read latch 405. The B–5 read latch output is coupled to the "and" switch 407 wherein it is switched with a normally positive potential also applied to the switch and passed through the "or" switch 407 to maintain the B–5 read latch in an "on" condition. The B–5 read latch output is a positive pulse having a duration of approximately seven microseconds beginning at the midpoint of an "A" cell position and lasting until the beginning of the succeeding "A" cell position as indicated in line L of Fig. 58. The B–5 read latch is reset at the start of the succeeding "A" cell position by a negative latch reset pulse NLRP, shown by line J of Fig. 58 and applied to the "and" switch 407.

The B–5 read latch output is applied to the grid of the translator tube 408. At this particular moment, which is prior to the time that the "12" index position of the blank card in the punch feed has advanced to the punch station, the plate potential for tube 408 is supplied from a plus potential line under control of cam P–29 (Fig. 7*n*) (for cam timing, see Fig. 53). The coincidence of a plate potential and grid input signal to tube 408 causes a resultant output pulse from the cathode of tube 408 which is applied to an input of "and" switch 409.

It may be well to point out at this time and with reference to the read signal wave forms of lines G through L of Fig. 58, that for example a "+" signal recorded in D–2 position develops a read signal in the read coil of the read-record head. The read signal is passed through a shaper amplifier and produces a pulse as indicated by line H which begins at approximately the midpoint of "D" cell time. This pulse is switched with a "RSP" that occurs during D–3 time creating a read latch output pulse that occurs during D–3 time commencing at the midpoint of the "A" cell and lasting until the beginning of the succeeding "A" cell. Thus it may be observed that a signal recorded in the D–2 position has been delayed a single digital position in the electronic amplifying and switching circuitry for reading the data from the drum storage device.

Furthermore, it may be pointed out that the "—" signal produces a pulse which starts slightly after the beginning of "C" cell time and which is slightly narrower than the shaper output pulse produced by a "+" signal. This advancement in time for a "—" signal prevents a coincident condition with a "RSP" and therefore the read latch is not turned "on," which should be apparent from an observation of Fig. 58.

Simultaneous with the read-out of the B–5 bit for the "8" value recorded in the D–10 position of word 10 of the PBS section of the drum, the read-out of the Q–3 bit will likewise occur. The magnetic spot in the D–10 position of word 10 of the Q–3 track will produce a bi-polar down-up signal in the read coil 412 of the combinational head. The signal developed in the read coil is coupled to the input grid of the VA–1 tube 413 (Fig. 7–*l*) wherein the signal is amplified. The output from tube 413 is coupled to the grid input terminal of the SA–1 tube 414. The resultant signal output from tube 414 is coupled to the grid of the CF–13 tube 415. The positive signal output from tube 415 is coupled to the "and" switch 416. Herein the pulse is switched with a positive "read sample pulse" (RSP) also applied to the "and" switch 416. The coincident output from the switch 416 is passed through the "or" switch 417 and turns "on" the Q–3 read latch 418.

The Q–3 read latch output is applied to the grid of the translator tube 419. The plate potential for tube 419 is supplied from a plus potential line under control of cam P–28 (Fig. 7*n*) (cam timing, Fig. 53). The coincidence of a plate potential and grid input signal to tube 419 causes a resultant output pulse which is applied to an input of "and" switch 409. The B–5 and Q–3 signals applied to "and" switch 409 are switched with a "NEAP," a "punch out sign and zone digits control" gate, and a "PBS Timer" gate.

The "NEAP" input to "and" switch 409 is normally positive except for the negative early A cell pulse inputs which are cyclically occurring negative timing pulses lasting from the midpoint of "A" cell time until the midpoint of "A" cell time of each digital timing position of the drum. The "P. O. sign and zone digits control" input line to "and" switch 409 is normally positive except during "12" and "11" index times of punch timing, as will be more fully explained later.

The "PBS Timer" gate is a cyclically occurring positive gate pulse occurring during read-out operations and is positive for one-fifth of each drum revolution when the PBS section of the buffer storage band is passing under the read-record heads associated with the buffer storage band of the drum to dynamically control the read-out of data from the PBS section of the buffer band on the drum. The "PBS Timer" latch (Fig. 7*n*) comprises the tubes 530, "and" switches 531 and 532, and "or" switches 533 and 534. The "PBS Timer" latch is turned "on" by coincident S–2, W–7 and D–0 timing pulses applied to the "and" switch 531. The latch is turned "off" by coincident S–3, W–7 and D–0 timing pulses applied to the "and" switch 532. The details of the "on" and "off" switching in this type of latch were presented earlier.

The condition of coincident inputs to switch 409 causes a resultant output that is passed through the "or" switch 421, the IN–1 and CF–6 tubes 422 and 423 (Fig. 7*q*), respectively, and commonly applied to the "and" switches 424 through 434. These "and" switches serve as inputs to the punch scan matrix.

*Punch scan matrix*

The purpose of the punch scan matrix is to switch data representing signals with digit and word timing pulses in synchronism with potential furnished under control of the punch unit in order to provide the selective energization of punch control magnets for effecting selected punching of the record card.

Figure 7N:
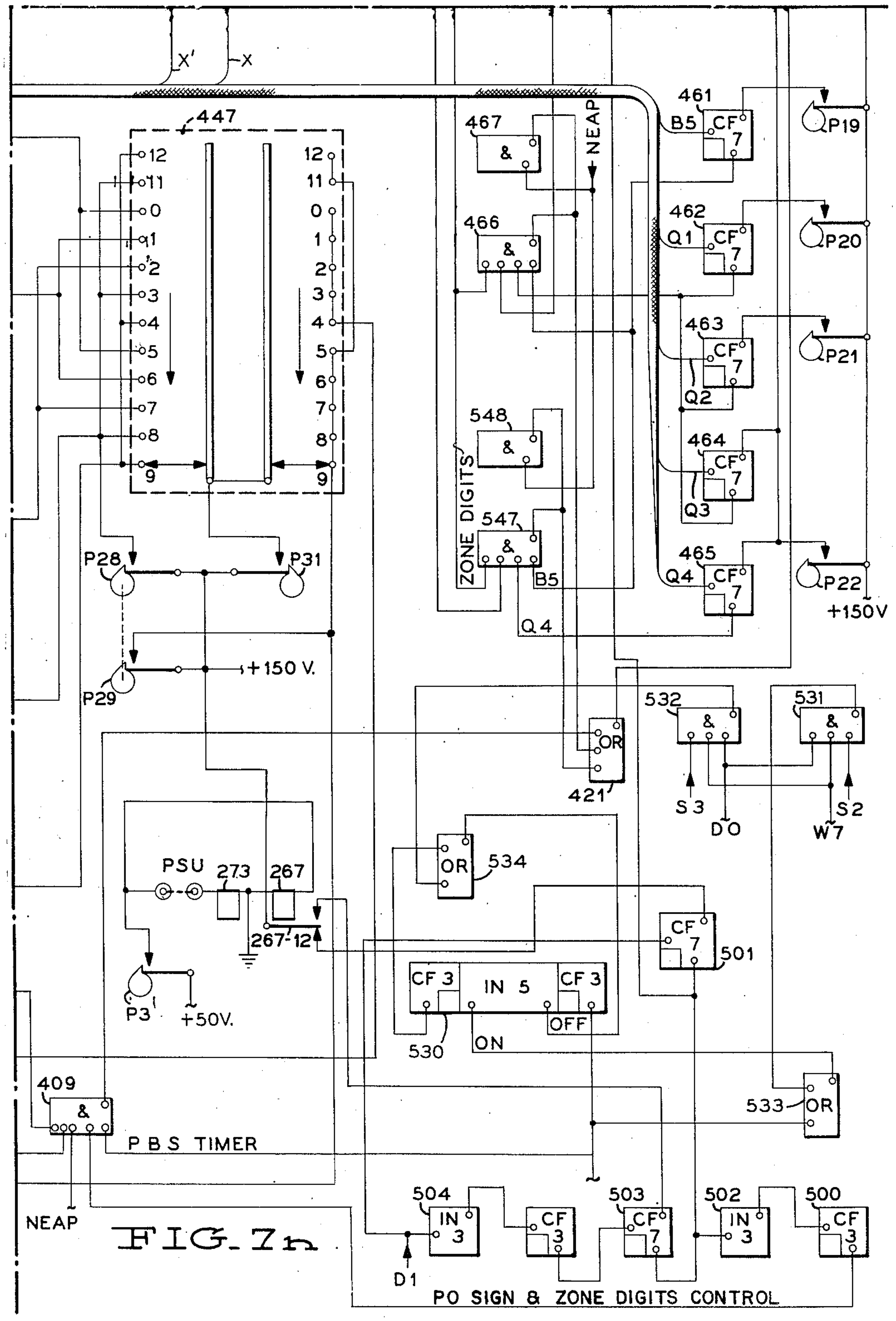
Figure 7O:
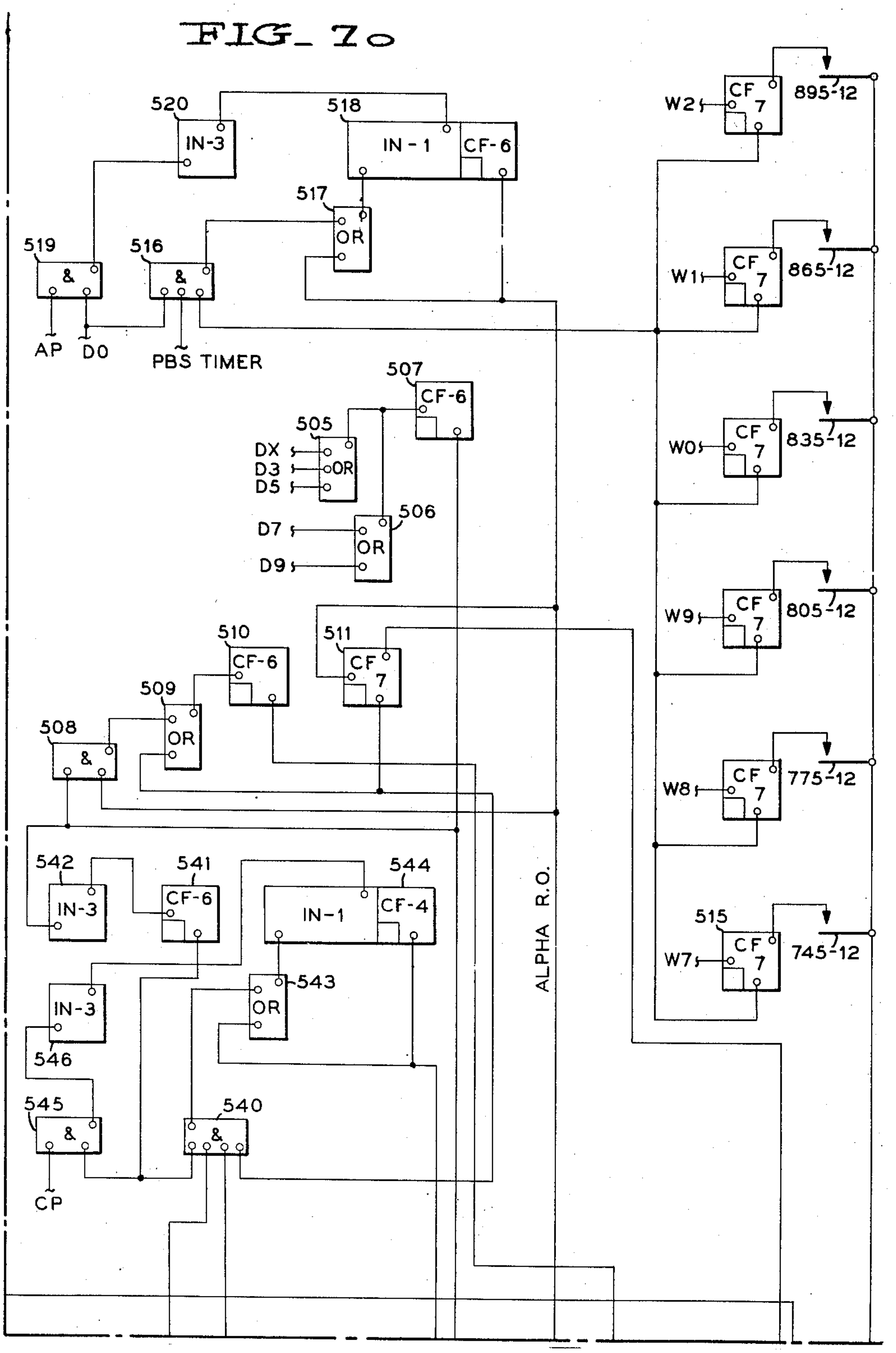
Figure 7P:
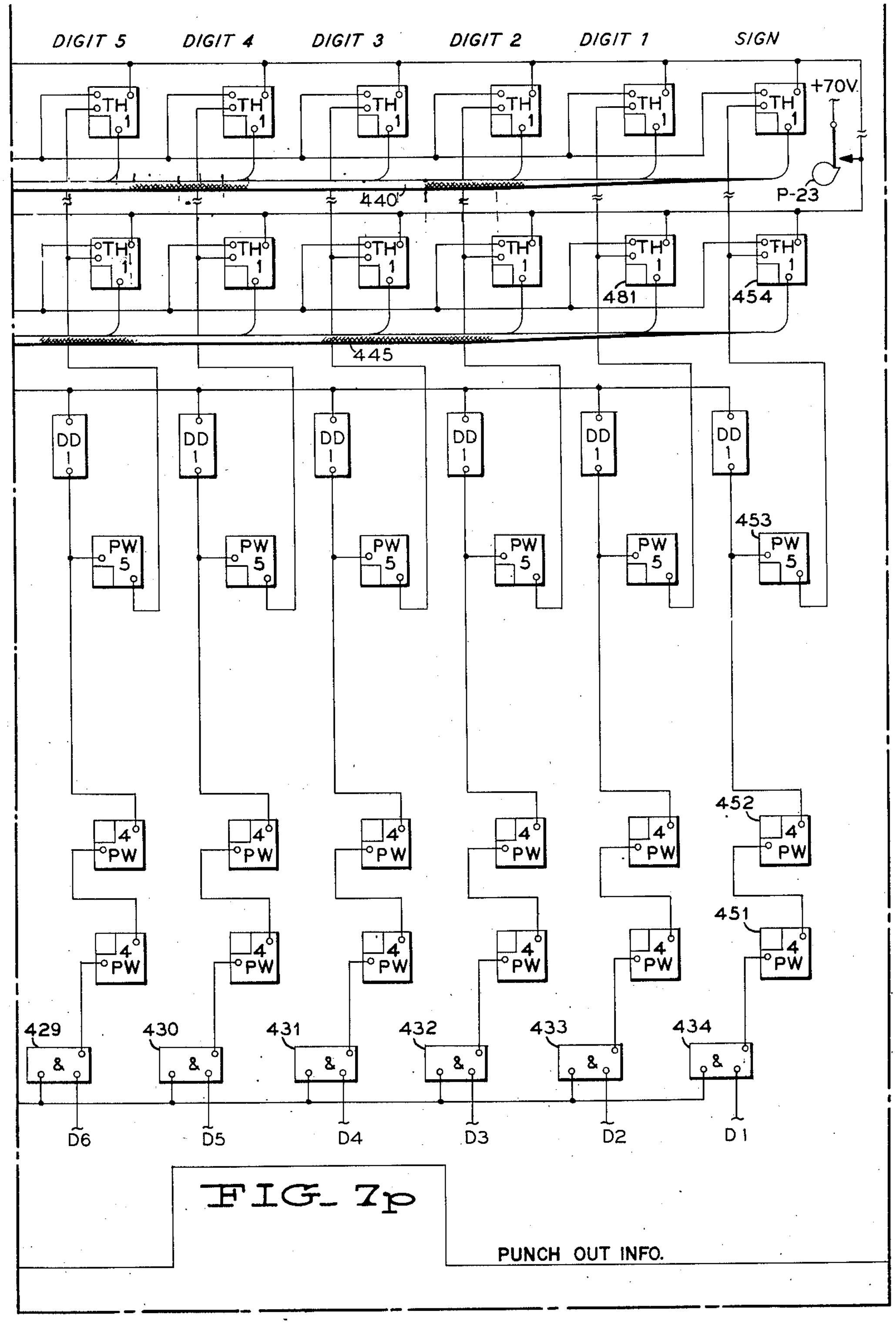
Figure 7A:
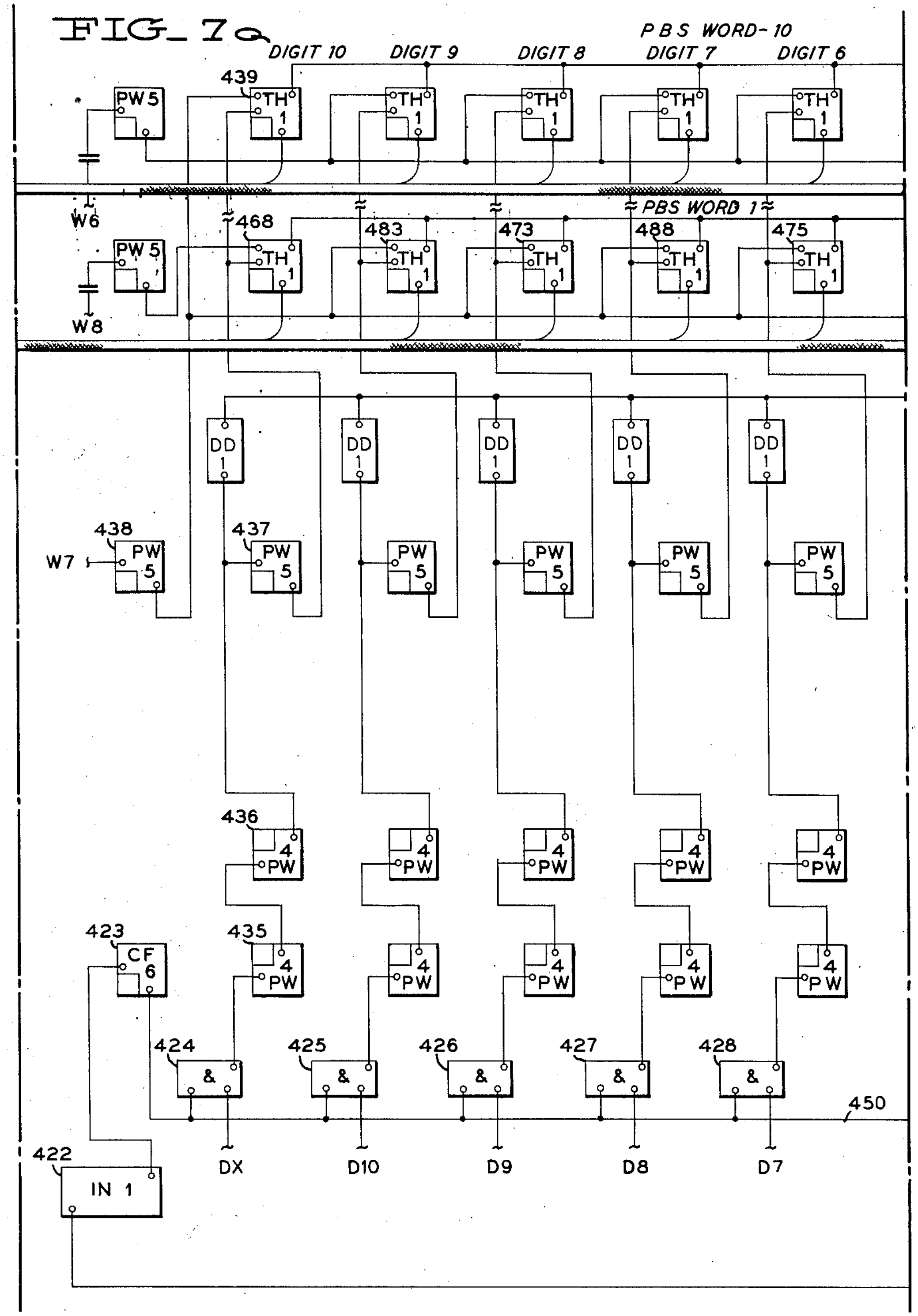
Figure 7R:
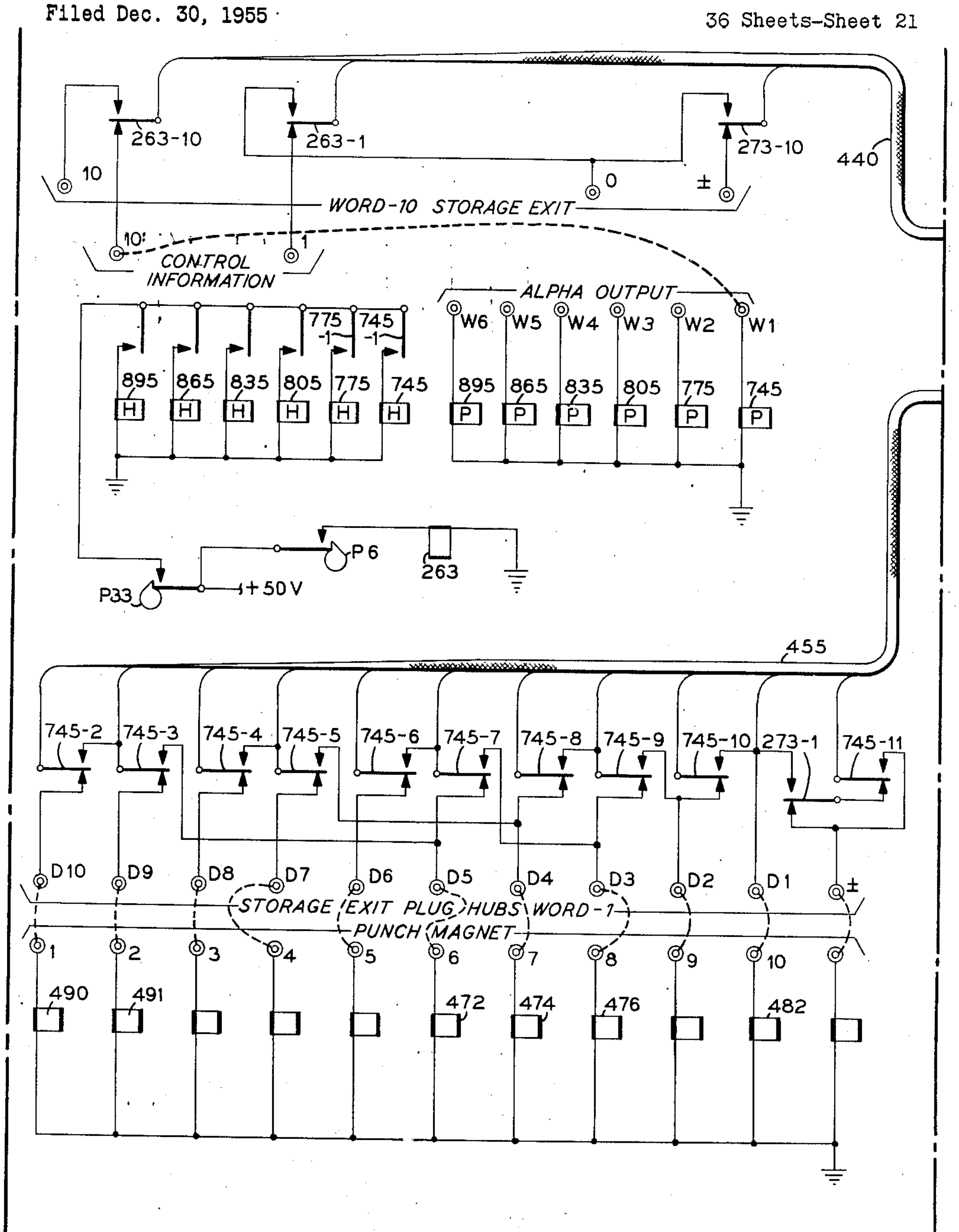

The wiring for the data output matrix is partially shown in a schematic manner by Figs. 7*p* and 7*q*. Actually the matrix comprises ten horizontal rows of Thyratron tube stages, each row having eleven Thyratron tube stages, there being 110 Thyratron tube stages in all. Consequently, there is one Thyratron tube stage for each character value of the ten words in PBS. The details of a Thyratron tube stage of the "TH–1" type being presented earlier, in the description relating to Figs. 31 and 32. The No. 1 control grids of the Thyratron tubes in each vertical row are commonly connected and are pulsed by resultant signals produced from the coincidence switching of digital representing pulses and digital timing pulses. The No. 2 control grids in each of the horizontal rows are commonly connected and are pulsed cyclically and successively from the bottom row to the top row with word timing pulses. The plate potentials for all Thyratron tube stages are intermittently supplied through the cam controlled contacts which are mechanically actuated by a cam P–23 that is driven by the punch unit (Fig. 7*p*) (For cam timing see Fig. 53). The plate potentials are connected to the Thyratron tube stages as indicated by the timing chart shown in Fig. 53. The cathode output terminals for each of the Thyratron tube stages are directly and individually connected with the storage exit plughubs in the plugboard, partially shown in Fig. 7*r*. When a coincidence condition of positive plate potential and positive signals at both the No. 1 and No. 2 control grids of any particular Thyratron tube in the matrix exists, that tube is rendered conductive. Once fired the Thyratron tube remains conductive until such time as the plate supply potential is interrupted by the cam P–23 (Fig. 7*p*). A Thyratron tube in the conductive state causes a positive potential signal to occur at the storage exit plughubs to which the cathode output terminal of the Thyratron tube is connected. The plugboard provides a flexible connecting means for manually and selectively connecting the storage exit plughubs with punch control magnet plughubs also located in the plugboard.

According to the illustrative example, we have shown and described how a positive pulse is produced and applied to the "and" switches 424 through 434 at S–3, W–7, D–X time and representing the value "8" in the D–10 position of the tenth word in PBS.

Referring to Fig. 7*q*, the positive signal pulse applied to the "and" switches 424 through 434 will be coincident with the D–X timing pulse applied to "and" switch 424 causing a resultant pulse output that is passed through the PW–4 tubes 435 and 436, the PW–5 tube 437 and coupled to the No. 1 control grids of the TH–1 tubes in the vertical row for digit 10. This pulse will be coincident with a W–7 timing pulse passed through the PW–5 tube 438 and applied to the No. 2 control grid of the TH–1 tube 439 rendering tube 439 conductive. The resulting cathode output potential is passed via cable 440, the N/C contact points 263–10 to the control information plughub 10, which is pluggably connected with the alpha output plughub for word 1 (W–1), and serves to energize the pick coil of relay 745. Relay 745 when energized will hold under control of cam P–33 for the remainder of the punch-out cycle.

Summarizing the above, it has been shown how the "8" recorded in the D–10 position of the tenth word in PBS was read out, converted to a signal according to the decimal system, and selectively switched in the Thyratron scan matrix and utilized to pick up the alphanumerical punch-out control relay 745. This establishes the controls of the punch for the punch out of alphanumerical data, now to be described.

The blank card in the punch feed advances to the point where the "12" index position is in alignment with the punch station. In accordance with the chart of Fig. 4, at this time all "6's" stored in PBS and representing the zone portion of the alphabetic characters A though I should be sensed for effecting a "12" zone punching in the record card. Since, as previously pointed out, "12" index position perforations in the record card may be representative of plus signs, then all "9's" in sign storage positions of PBS and representative of plus signs should be sensed.

After the "12" index position of the record card is in alignment in the punch station, on the first subsequent revolution of the drum the plus sign for the first word in PBS, which is represented as a "9" and denoted by the "+" marks in S–2, W–7, D–0 position of the B–5 and Q–4 tracks as shown by Fig. 56, will be read. The "+" marks in the B–5 and Q–4 tracks of drum 10 (Fig. 7*k*) will simultaneously produce signals in the read coils 400 and 445, respectively, on passing the associated combinational read-record heads for these tracks. The signal produced in read coil 400 will be passed through the VA–1 tube 401, SA–1 tube 402, CF–13 tube 403 and switched with an RSP in "and" switch 404. The resultant output from switch 404 will serve to turn on the B–5 read latch 405, as previously described. Similarly the signal produced in read coil 445 will be amplified and switched to turn on the Q–4 read latch 446 (Fig. 7*m*).

The output from the B–5 read latch 405 is applied to the grid of the translator tube 408, the plate of which is supplied with a potential at "12" index time under control of the punch emitter 447 (Fig. 7*n*) (see cam P–31 timing, Fig. 53). The output from the Q–4 read latch 446 is applied to the grid of the translator tube 448, the plate of which is likewise supplied with a potential at "12" index time under control of the punch emitter 447. The coincident grid input signal with a plate potential to each of the tubes 408 and 448 causes resultant simultaneous outputs. The binary signal output from tube 408 is applied to "and" switch 409 and the quinary signal output from tube 448 is also applied to "and" switch 409. Herein the binary and quinary signals are switched with a "NEAP," a "PBS Timer" gate and a "Punch-out sign and zone digits control" gate.

*Punch-out sign and zone digits control*

The "punch-out sign and zone digits control" gate is primarily to control the read-out of sign and zone digital positions from PBS for punching in the record card. This control gate is basically initiated from several different sources. For example, the control gate output from tube 500 (Fig. 7*n*) is normally a positive potential or in an "up" state. Under control of a 150 volt plate potential furnished to the plate of tube 501 through relay points

267–12 in a N/C position and D–1 timing pulses applied to the grid of tube 501 a resultant positive signal is produced at D–1 times that is passed through the IN–3 tube 502 rendering tube 500 non-conductive and thereby changing the control gate to a "down" condition.

During a card punch-out cycle relay 267 (Fig. 7*n*) is energized during "12" and "11" index times under control of cam P–3. This causes the 150 volt plate potential to be coupled through the contact points 267–12 transferred and applied to the plate of tube 503. During "12" and "11" index times tube 503 is normally conductive with a positive potential at the cathode output of tube 503 being inverted in tube 502 and applied to tube 500. This causes the control gate to be in a "down" condition. D–1 timing pulses applied to the grid of the IN–3 tube 504 reverses the state of tube 503 from conductive to non-conductive which results in the control gate being in an "up" condition.

Summarizing the above, it may be stated that the punch-out sign and zone digits control gate is normally in an "up" condition except during D–1 drum times and "12" and "11" punch index times. The control gate is normally in a "down" condition during "12" and "11" times except at D–1 times.

The control gate is also affected by the D–X, D–3, D–5, D–7 and D–9 timing pulses as applied to the "or" switches 505 and 506 (Fig. 7*o*) and passed through the CF–6 tube 507 and applied to "and" switch 508 in coincidence with an "alpha read-out" gate, the details of which will be presented later. The resultant positive output pulse from "and" switch 508 is passed through "or" switch 509 and CF–6 tube 510 and inverted by the IN–3 tube (Fig. 7*n*) causing tube 500 to be made non-conductive. Thus, the control gate will be in a "down" condition at D–X, D–3, D–5, D–7 and D–9 times during the punch out of a word of alphanumerical data.

At "0" index time under control of cam P–22 (Fig. 7*n*) a plate potential is applied to the plate of tube 511 (Fig. 7*o*). When an "alpha read-out" gate is coincidently applied to the grid input of tube 511 there will be a resultant positive pulse output that is passed through "or" switch 509, the CF–6 tube 510 and inverted by the IN–3 tube 502 causing tube 500 to be made non-conductive. Consequently the control gate will be in a "down" condition at "0" index time for the read-out of an alphanumerical word of data.

*Alpha read-out gate*

The "alpha read-out" gate is a cyclically occurring positive gate pulse for each word of alphanumerical data in the PBS during a data punch-out operation. For the particular illustrative example being described the "alpha read-out" gate will occur on each occasion that the first word in PBS is passing under the read-record heads. It was previously described how the alphanumerical control relay 745 (Fig. 7*r*) for the first word in PBS became energized. With relay 745 in an energized condition, the relay contact points 745–12 (Fig. 7*o*) will be closed connecting potential to the plate of tube 515. On each occasion that a W–7 timing pulse is applied to the grid input of tube 515, there will be a resultant positive pulse output from the cathode that is applied to the "and" switch 516. Herein the pulse is switched with a "PBS Timer" gate and D–0 timing pulses. The resultant output from "and" switch 516 is passed through the "or" switch 517 and serves to turn on the alpha read-out latch 518 at W–7, D–0 time of every PBS time. Consequently the "alpha read-out" gate will be positive or in an "up" condition for the read-out of the first word in PBS on every drum revolution during the read-out of data from the drum to the punch operation.

The alpha read-out latch 518 is reset by the coincident application of D–0 and AP timing pulses applied to "and" switch 519 and passed through the IN–3 tube 520 to the plate of the latch 518.

Returning now to the point where we had applied binary and quinary signals, which are representative of the "9" stored in the D–0 position of the first word in PBS, to the "and" switch 409 (Fig. 7*n*) in coincidence with a "NEAP," a "PBS Timer" gate, and a "P. O. sign and zone digits control" gate, there will be a resultant output from "and" switch 409. This resultant pulse is passed through "or" switch 421, tubes 422 and 423 and occurs on line 450, which furnishes a common input to the "and" switches 424 through 434. The pulse signal on line 450 represents the "9" stored in the D–0 position of the first word in PBS and occurs on digital time later or at W–7, D–1 time of PBS in accordance with the delay in read-out characteristics previously described. Consequently the signal on line 450 will be switched with the D–1 timing pulse applied to the "and" switch 434. The resultant pulse output from switch 434 is passed through the PW–4 tubes 451 and 452, the PW–5 tube 453 and applied to the No. 1 control grids of the vertical "sign" row of TH–1 tubes in the punch scan matrix. This signal pulse will be in coincidence with the plate potential and the W–7 timing pulse applied to the No. 2 control grid of tube 454. The resulting output from the cathode of tube 454 is connected via a line in cable 455 through relay points 745–11 transferred to relay points 273–1, which are transferred because relay 273 is energized during "12" and "11" index times under control of cam P–3 (Fig. 7*n*) and due to the plugging of the PSU (Punch sign over units) wiring on the plugboard (Fig. 51). The pulse terminates at the relay points 273–1 and does not effect a punching. As previously pointed out, all alphanumerical words are handled as positive values and no punching is necessary for the positive indication of the word value in this particular example.

Remembering that the punch is still at the "12" index position, and during the same drum revolution the "9" stored in the D–2 position of the first word in PBS will be sensed and serve to turn on the B–5 read-out latch 405 and the Q–4 read-out latch 446 in the same manner as described above. The output signals from latches 405 and 446 will be passed to the "and" switch 409 at S–2, W–7, D–3 time in accordance with the one digit delay in read-out as previously described. However, there will not be a coincident condition of positive input pulses and gates to "and" switch 409 at this time. As previously described the "P. O. sign and zone digit control" gate will be in a "down" state at D–3 times during the read-out of words of alphanumerical data. Consequently this "9" is not passed to the Thyratron scan matrix.

In the same drum revolution the "6" in D–10 position of the first word in PBS recorded as "+" in the B–5 and Q–1 tracks (Fig. 56) will develop signals in the read coils 400 and 458 (Fig. 7*k*) respectively associated with the B–5 and Q–1 tracks. These signals will turn "on" the B–5 read-out latch 405 and the Q–1 read-out latch 459 in the same manner as previously described. The output signals from the B–5 and Q–1 read-out latches 405 and 459, which occur at S–2, W–8, D–X time are coupled via the B–5 and Q–1 lines in cable 460 to the input grid of tubes 461 and 462 (Fig. 7*n*) respectively. With reference to the timing diagram of Fig. 53, it may be noted that at "12" index time plate potentials will be supplied to tube 461 under control of cam P–19 and to tube 462 under control of cam P–20. The pulse outputs from tubes 461 and 462 are applied to "and" switch 466 wherein they are coincidently switched with an "alpha read-out" gate and a D–X timing pulse also applied to "and" switch 466 and a "NEAP" applied to "and" switch 467. The resultant output signal is passed through "or" switch 421, tubes 422 and 423 to line 450 (Figs. 7*p* and 7*q*). The signal on line 450 will be switched with a D–X timing pulse in "and" switch 424 and passed to the No. 1 control grids of the TH–1 tubes in the vertical row for digit 10. The application of the signal to the No. 1 control grid of tube 468 coincidently with a W–8 timing pulse applied to the No. 2 control grid of tube 468 produces a resultant output which is coupled via a line in cable 455 to the common contact of points 745–2 (Fig. 7*r*), through the contact points 745–2 transferred through the contact points 745–3 transferred to the D–5 storage exit plughub for word 1. This plughub is plugged with the punch magnet plughub for column 6. Thus, the signal will serve to energize the punch magnet 472 for column 6. When the punches are actuated for the "12" index position a hole will be punched in the "12" index position of column 6 of the record card as shown in Fig. 49. This is a zone perforation for the alphabetic character "A" in accordance with the card code as indicated in the chart of Fig. 4.

The card in the punch feed now advances to the position that the "11" index point is in alignment with the punch station. In accordance with the chart of Fig. 4, at this time all "7's" stored in PBS and representing the zone portion of the alphabetic characters J through R should be sensed for effecting an "11" zone punching in the record card.

After the "11" index position of the record card is in alignment in the punch station, on the succeeding drum revolution, the digit "7" in the D–8 position of the first word in PBS will be sensed. The "+" marks in the PBS, W–7, D–8 position of the B–5 and Q–2 tracks will develop signals in the read coils 400 and 469 (Fig. 7k) that serve to turn "on" the B–5 read-out latch 405 and the Q–2 read-out latch 470. The output signals from the B–5 and Q–2 latches 405 and 470, which occur at S–2, W–7, D–9 time, are coupled via the B–5 and Q–2 lines in cable 460 to the input grid of tubes 461 and 463 (Fig. 7*n*) respectively. At "11" index time plate potentials will be supplied to tube 461 under control of cam P–19 and to tube 463 under control of cam P–21. The pulse outputs from tubes 461 and 463 are applied to "and" switch 466 and switched with an "alpha read-out" gate, a D–9 timing pulse, and a NEAP. The resultant output signal is passed through "or" switch 421, tubes 422 and 423 to line 450 (Figs. 7*p* and 7*q*). The signal on line 450 will be switched with a D–9 timing pulse in "and" switch 426 and passed to the No. 1 control grids of the tubes in the punch scan matrix vertical row for digit 8. The application of the signal to the No. 1 control grid of tube 473 coincidently with a W–7 timing pulse applied to the No. 2 control grid of tube 473 produces a resultant output which is coupled via a line in cable 455 to the common contact of points 745–4, through the contact points 745–4 transferred, through the contact points 745–5 transferred to the D–4 storage exit plughub for word 1. This plughub is plugged with the punch magnet plughub for column 7. Thus, the signal will serve to energize the punch magnet 474 for column 7. When the punches are actuated a perforation will be made in the "11" index position of column 7 as shown by the record card of Fig. 49. This is a zone perforation of the alphabetic character "N" in accordance with the card code as indicated in the chart of Fig. 4.

The card in the punch feed will advance to the "0" index position. In accordance with the chart of Fig. 4, at this time all "8's" stored in PBS and representing the zone portion of the alphabetic characters S through Z should be sensed for effecting a "zero" zone punching in the record card. It may be noted that a blank character position is numerically stored in drum storage as a "00" (blank character) and in the system of the preferred embodiment it is desired that no perforations be made in the record card for the read-out of a blank character. Furthermore a numeric zero is stored in drum storage as a "90" and for the read-out of a numeric zero a perforation must be made in the 0 index position of the record card. The details of the operations for distinguishing between the read-out of a "00" and a "90" will now be presented.

*Blank column—numeric zero punch control*

After the "0" index position of the record card is in alignment in the punch station, on the succeeding drum revolution, the digit "0" in the D–3 position of the first word in PBS (Fig. 56) will be sensed. The "+" marks in the PBS, W–7, D–3 position of the B–0 and Q–0 tracks will produce signals in the read coils 477 and 485 (Fig. 7*k*) that serve to turn "on" the B–0 and Q–0 latches 478 and 486 (Fig. 7*m*). The outputs from the B–0 and Q–0 latches 478 and 486, which occur at S–2, W–7, D–4 time, are applied to the grid inputs of the translator tubes 479 and 487, respectively. At "0" index time the potential to the plate of tubes 479 and 487 is furnished under control of the cam P–31 and the punch emitter 447 (Fig. 7*n*). The coincident plate potential and grid input signals to tubes 479 and 487 produce resultant output signals that are applied to input terminals of the "and" switch 490 (Fig. 7*n*). At this time there is not a coincident condition of positive inputs to the "and" switch 409. As previously pointed out in the description relating to the "P. O. sign and zone digits control" gate, at "0" index time under control of cam P–22 (Fig. 7*n*) a plate potential is applied to the plate of tube 511 (Fig. 7*o*). When an "alpha read-out" gate is coincidently applied to the grid of tube 511, there will be a resultant positive pulse output that is passed through "or" switch 509, tubes 510 and 502 causing tube 500 to be made non-conductive. Consequently the control gate will be in a "down" condition at "0" index time for the read-out of an alphanumerical word of data. Thus, there can be no resultant pulse output from "and" switch 409 during "0" index time.

The B–0 and Q–0 read latch output signals from tubes 479 and 487, which result from the zero stored in the D–3 first word position of PBS and occur at S–2, W–7, D–4 time as represented by the 0–1 pulse in line B of Fig. 59, are coupled via the quinary common line X′ and the binary common line X (Fig. 7*m*), respectively, in cable 460 to inputs of the "and" switch 540 (Fig. 7*o*). Herein the B–0 and Q–0 signals are switched with an "inverted zone digit" input as represented by line D of Fig. 59 and the "zero index alpha read-out" gate (line C of Fig. 59).

The "inverted zone digit" input to the lefthand input terminal of "and" switch 540 is normally positive due to the normally conductive state of the CF–6 tube 541. The application of positive D–3, D–5, D–7, D–9 and D–X timing pulses to "or" switches 505 and 506 passed through tube 507 and inverted in tube 542 causes tube 541 to be made non-conductive at these times. Thus it may be stated that the "inverted zone digit" input to "and" switch 540 is normally in an "up" condition except at D–3, D–5, D–7, D–9 and D–X times.

The "zero index alpha read-out" gate is a cyclically occurring pulse during the time that the record card in the punch feed is in the "0" index position. A potential is applied to the plate of tube 511 during "0" index time under control of cam P–22. The application of the "alpha read-out" gate, which as previously pointed out is a cyclically occurring positive gate pulse for each word of alphanumerical data in the PBS during a data punch-out operation, to the grid of tube 511 produces a resultant positive pulse output from the cathode of tube 511 that is connected with the right-hand input terminal of "and" switch 540.

It should be apparent from the timing chart of Fig. 59 that at D–4 time there will be a coincident positive condition of 0–1 pulses on the quinary common line X′ and the binary common line X (line B), the "zero index read-out" gate (line C), and the "inverted zone digit" (line D). This will produce a resultant positive pulse output from "and" switch 540 which is passed through the "or" switch 543 and turns "on" the "punch zero" latch 544. The "punch zero" latch 544 output (line F, Fig. 59) from the CF–4 portion is coupled via "or" switch 543 to maintain the latch in an "on" condition. The latch will be turned "off" by a coincident CP (line E, Fig. 59) and "inverted zone digit" pulse (line D, Fig. 59) applied to the "and" switch 545. The positive output from "and" switch 545 is inverted in tube 546 and applied to a plate terminal of the latch 544 for resetting the latch. With reference to Fig. 59 line F it may be noted that the "punch zero" latch is turned "on" at the mid A cell point of D–4 time and will remain in an "on" condition until the C cell time of the succeeding D–6 time.

The function of the "punch zero" latch is to store a zero from a numeric digital position in PBS for determining if a "9" is stored in the succeeding zone digital position. In the illustrative example being used for descriptive purposes, a zero was stored in the D–3 position of the first word in PBS. As described above, this zero served to turn "on" the "punch zero" latch.

The zero in the D–3 position is followed by another zero in the D–4 zone digital position denoting a blank column for which no punching in the record card is to be effected. The "+" marks in the D–4 position of the first word in PBS (Fig. 56) will produce signals that serve to turn "on" the B–0 and Q–0 latches 478 and 486 (Fig. 7*m*) at S–2, W–7, D–4 time. The outputs from the B–0 and Q–0 latches, as represented in a time relationship by the 0–2 pulse in line B of Fig. 59, are applied to the inputs of "and" switch 409. As previously pointed out the "P. O. sign and zone digits control" gate is down at "0" index time and consequently there can be no resultant pulse output from "and" switch 409. It may be noted that the output of the "punch zero" latch 544 (Fig. 7*o*) is coupled as one of the inputs to "and" switch 547 (Fig. 7*n*). Other inputs to "and" switch 547 include B–5 and Q–4 signal pulses. There is no provision for coupling the B–0 and Q–0 latch output signals to any of the zone translator tubes 461 through 465. Consequently B–0 and Q–0 signals cannot be coincidently switched in the "and" switches 547 and 548. Therefore, the zero in the D–4 position will be ineffective to cause perforations to be made in the "0" index position of the record card.

If the "zero" in the D–3 position of the first word in PBS had been followed by a "nine" in the D–4 position denoting a numeric zero according to the card code (Fig. 4), then the B–5 and Q–4 latches 405 and 446 (Fig. 7*m*) would have been turned "on" at S–2, W–7, D–5 time. The outputs of the B–5 and Q–4 latches 405 and 446 would be coupled via the B–5 and Q–4 lines in cable 460 to the grid inputs of tubes 461 and 465 (Fig. 7*n*) respectively. The B–5 and Q–4 outputs of tubes 461 and 465, as represented by the 0–2 pulse in line B of Fig. 59 would be applied to inputs of "and" switch 547 and herein coincidently switched with the "punch zero" latch pulse (line F of Fig. 59), the zone digit D–5 pulse (line G of Fig. 59) also applied to "and" switch 547 and a NEAP applied to "and" switch 548. A resultant pulse output from the "and" switches 547 and 548 would be coupled through "or" switch 421, tubes 422 and 423 to line 450 for application to the punch scan matrix. This would effect a "0" index punch being made in column 9 of the record card, which is not the case in the illustrative example but serves to show the operation of the data transfer system.

Summarizing the above, it has been shown and described how the read-out of a "00," characteristic of a blank column, from the drum storage device was ineffective to cause a perforation to be made in the "0" index position of the record card, as distinguished from the read-out of a "90," characteristic of a numeric zero in an alphanumeric word, from the drum storage device which would be operative to effect a "0" index perforation in the record card.

Returning now to the read-out of the illustrative example, the punch still in the "0" index position and the zeroes in the D–3 and D–4 positions of the first word of PBS having been ineffective to cause one of the punch magnets to be energized, in the same drum revolution, the "+" marks in the PBS, W–7, D–6 position of the B–5 and Q–3 tracks will produce signals in the read coils 400 and 412 that serve to turn "on" the B–5 and Q–3 latches 405 and 415. The output from the B–5 and Q–3 latches 405 and 418, which occur at S–2, W–7, D–9 time, are coupled via the B–5 and Q–3 lines in cable 460 to the input grids of tubes 461 and 464 (Fig. 7*n*) respectively. At "0" index time plate potentials will be supplied to tube 461 under control of cam P–19 and to tube 464 under control of cam P–22. The pulse outputs from tubes 461 and 464 are applied to "and" switch 466 and switched with an "alpha read-out" gate, a D–7 timing pulse, and a NEAP. The resultant output signal is passed through "or" switch 421, tubes 422 and 423 to line 450. The signal on line 450 will be switched with a D–7 timing pulse in the "and" switch 428 and passed to the No. 1 control grids of the tubes in the punch scan matrix vertical row for digit 6. The application of the signal to the No. 1 control grid of tube 475 in coincidence with a W–7 timing pulse applied to the No. 2 control grid of tube 475 produces a resultant output which is coupled via a line in cable 455 to the common contact of points 745–6, through the contact points 745–6 transferred, through the contact points 745–7 transferred to the D–3 storage exit plughub for word 1. This plughub is plugged with the punch magnet plughub for column 8. The signal will serve to energize the punch magnet 476 for column 8. When the punches are actuated a perforation will be made in the "0" index position of column 8 as shown by the record card of Fig. 49. This is a zone perforation of the alphabetic character "Y" in accordance with the card code as shown by Fig. 4.

The card in the punch feed will advance to the "1" index position. On the succeeding drum revolution, the digit "1" position of the first word in PBS will be sensed. The "+" marks in the PBS, W–7, D–1 position of the B–0 and Q–1 tracks will produce signals in the read coils 477 and 458 that serve to turn "on" the B–0 and Q–1 latches 478 and 459. The outputs from the B–0 and Q–1 latches 478 and 459, which occur at S–2, W–7, D–2 time, are applied to the grid of tubes 479 and 480, respectively. At "1" index time the potential to the plate of tubes 479 and 480 is furnished under control of the cam P–31 and punch emitter 447 (Fig. 7*n*). The output of tube 479 is coupled to "and" switch 409 and the output of tube 480 is also coupled to "and" switch 409. Herein these binary and quinary read signal pulses are switched with a NEAP, a "PBS Timer" gate, and a "Punch-Out sign and zone digits control" gate. The resultant output from "and" switch 409 is passed through the "or" switch 421, tubes 422 and 423 to line 450. The signal on line 450 will be switched with a D–2 timing pulse in the "and" switch 433 and passed to the No. 1 control grids of the tubes in the punch scan matrix vertical row for digit 1. The application of the signal to the No. 1 control grid of tube 481 in coincidence with a W–7 timing pulse applied to the No. 2 control grid of tube 481 produces a resultant output which is coupled via a line in cable 455 to the D–1 storage exit plughub. This plughub is plugged with the punch magnet plughub for column 10. The signal will serve to energize the punch magnet 482 for column 10.

As the drum continues to rotate the digit "1" in the D–9 position of the first word in PBS will be sensed. The "+" marks in the PBS, W–7, D–9 position of the B–0 and Q–1 tracks will produce signals in the read coils 477 and 458 that serve to again turn "on" the B–0 and Q–1 latches 478 and 459. The outputs from the B–0 and Q–1 latches 478 and 459, which now occur at the S–2, W–7, D–10 time are applied to the grid of tubes 479 and 480, respectively. The outputs from these tubes will be switched in the "and" switch 409 with the resultant output signal being passed on to line 450 in the same manner as described above. The signal on line 450 will be switched with a D–10 timing pulse in the "and" switch 425 and passed to the No. 1 control grids of the tubes in the punch scan matrix vertical row for digit 9. The application of the signal to the No. 1 control grid of tube 483 in coincidence with a W–7 timing pulse applied to the No. 2 control grid of tube 483 produces a resultant pulse output which is coupled via a line in cable 455 to the common contact of points 745–3, through the contact points 745–3 transferred, to the D–5 storage exit plughub for word 1. This plughub is plugged with the punch magnet plughub for column 6. The signal will cause punch magnet 472 to be energized. We have now shown how both punch magnets 482 and 472 have been energized at "1" index time. When the punches are actuated perforations will be made in the "1" index position of columns 6 and 10 of the record card as shown by Fig. 49.

The card in the punch feed will advance intermittently to the "2," "3" and "4" index positions without any perforations being made in the record card. Then when the card has advanced to the "5" index position on the succeeding drum revolution the digit "5" in the D–7 position of the first word in PBS will be sensed. The "+" marks in the PBS, W–7, D–7 position of the B–5 and Q–0 tracks will produce signals in the read coils 400 and 485 that serve to turn "on" the B–5 and Q–0 latches 405 and 486. The outputs from the B–5 and Q–0 latches 405 and 486, which occur at the S–2, W–7, D–8 time, are applied to the grid of tubes 408 and 487, respectively. At "5" index time the potential to the plate of tubes 408 and 487 is furnished under control of the cam P–31 and punch emitter 447. The outputs from these tubes will be switched in the "and" switch 409 with the resultant output signal being passed to line 450 in the same manner as previously described. The signal on line 450 will be switched with a D–8 timing pulse in the "and" switch 427 and passed to the No. 1 control grid of the tubes in the vertical row for digit 7. The application of the signal to the No. 1 control grid of tube 488 in coincidence with a W–7 timing pulse applied to the No. 2 control grid produces a resultant pulse output which is coupled via a line in cable 455 to the common contact of line 745–5, through the contact points 745–5 transferred to the D–4 storage exit plughub for word 1, to the punch magnet plughub for column 7 and energizes punch magnet 474. When the punches are actuated a perforation will be made in the "5" index position of column 7 of the record card (see Fig. 49).

The card in the punch feed will again advance intermittently past the "6" and "7" index positions without any perforations being made in the card. Then when the card has advanced to the "8" index position, the digit "8" in the D–5 position of the first word in PBS will be sensed and cause a perforation to be made in the "8" index position of column 8 in a similar manner to which the other perforations have been made, as described above. The card will now be intermittently passed through the "9" index position and then into a stacker hopper to complete the card punching cycle.

Recapitulating, it has been shown and described how the data transfer system and controls operate to accomplish a read-out of alphanumerical data from a drum storage device for punching the data into a punched hole type of record card.

*Numeric read-out*

It will now be shown how the read-out of numeric data is accomplished under the same pluggable setup which was used for the read-out of alphanumeric data. We may assume a value of —0123456789, comprising ten digits and a sign, as being stored in the first word position of PBS as represented in Fig. 57. In the illustrative example the digit "8" stored in the D–0 position of W–7 is indicative of the minus sign.

In the read-out of numeric data from PBS the control, as signified by a digit "8" stored in a predetermined digital position of word 10 of PBS and described above in conjunction with the read-out of alphanumeric data, is unnecessary. We may assume a read-out cycle to have been initiated. This will cause a blank card to be fed from the card hopper towards the punch station. The blank card in the punch feed advances to the point where the "12" index position is in alignment with the punch station. However, at this time no digits are read from PBS of the drum that will produce perforations in the record card. The card in the punch feed will now be advanced to the "11" index position. On the first subsequent revolution of the drum the minus sign for the first word in PBS, which is represented as an "8" and denoted by the "+" marks in S–2, W–7, D–0 position of the B–5 and Q–3 as shown by Fig. 57, will be sensed. The "+" marks in the B–5 and Q–3 tracks of drum 10 (Fig. 7*k*) will simultaneously produce signals in the read coils 400 and 412 on passing the associated combinational read-record heads for these tracks. The signals produced in the read coils 400 and 412 will serve to turn "on" the B–5 and Q–3 read latches 405 and 418, respectively, in the manner as previously described. The B–5 and Q–3 output signals from latches 405 and 418 are applied to "and" switch 409 wherein they are switched with a "NEAP," a "PBS Timer" gate and a "P. O. sign and zone digits control" gate. In accordance with the previously described delay characteristics that occur during read-out, the B–5 and Q–3 latch output signals are applied to "and" switch 409 during W–7, D–1 time. As previously explained, the "P. O. sign and zone digits control" gate is normally down during "12" and "11" index times except at D–1 drum time.

The condition of coincident inputs to "and" switch 409 produces a resultant output that is passed through the "or" switch 421, the tubes 422 and 423 (Fig. 7*q*) and applied via line 450 to the "and" switches 424 through 434. The signal on line 450 will be switched with the D–1 timing pulse applied to the "and" switch 434. The resultant pulse output from switch 434 is passed through the PW–4 tubes 451 and 452, the PW–5 tube 435 and applied to the No. 1 control grids of the vertical "sign" row of TH–1 tubes in the punch scan matrix. This signal pulse will be coincident with the plate potential and the W–7 timing pulse applied to the No. 2 control grid of tube 454. The resulting output from the cathode of tube 454 is connected via a line in cable 455 through the N/C relay points 745–11 (Fig. 7*r*), through relay points 273–1 which are transferred, because relay 273 is energized during "12" and "11" index times under control of cam P–3 (Fig. 7*n*) and due to the plugging of the PSU (Punch sign over units) wiring on the plugboard (Fig. 51), to the D–1 storage exit plughub for word 1. This plughub is plugged with the punch magnet plughub for column 10. The signal will energize the punch magnet 482 for column 10. When the punches are actuated for the "11" index position a hole will be punched in the "11" index position of column 10 of the record card as shown in Fig. 50. This perforation represents the minus sign for the negative value of the illustrative example.

The card in the punch feed now advances to the "0" index position. On the succeeding drum revolution, the digit "0" in the D–10 position of the first word in PBS will be sensed. The "+" marks in the PBS, W–7, D–10 position of the B–0 and Q–0 tracks will develop signals in the read coils 477 and 485 (Fig. 7*k*) that serve to turn "on" the B–0 latch 478 and the Q–0 latch 486. The output signals from the B–0 and Q–0 latches 478 and 486, respectively, and which ocur at S–2, W–8, D–X time, are applied to inputs of the "and" switch 409 (Fig. 7*n*). Herein these binary and quinary read signals are switched with a NEAP, a "PBS Timer" gate, and a "P. O. sign and zone digits control" gate. The resultant output from "and" switch 409 is passed through "or" switch 421, tubes 422 and 423 to line 450. The signal on line 450 will be switched with a D–X timing pulse in the "and" switch 424 and passed to the No. 1 control grids of the tubes in the punch scan matrix vertical row for digit 10.

The application of the signal to the No. 1 control grid of tube 468 in coincidence with a W–8 timing pulse applied to the No. 2 control grid of tube 468 produces a resultant output which is coupled via line 455 and the N/C contact points 745–2 (Fig. 7*r*) to the D–10 storage exit plughub. This plughub is plugged with the punch magnet plughub for column 1. The signal will serve to energize the punch magnet 490 for column 1. When the punches are actuated a perforation will be made in the "0" index position of column 1 of the record card as shown by Fig. 50.

The card in the punch feed now advances to the "1" index position. On the succeeding drum revolution the digit "1" in the D–9 position of the first word in PBS will be sensed. The "+" marks in the PBS, W–7, D–9 position of the B–0 and Q–1 tracks will develop signals in the read coils 477 and 458 (Fig. 7*k*) that serve to turn "on" the B–0 latch 478 and the Q–1 latch 459. The output signals from the B–0 and Q–1 latches, which occur at S–2, W–7, D–10 time, are applied to inputs of the "and" switch 409 wherein they are switched with a NEAP, a "PBS Timer" gate, and a "P. O. sign and zone digits control" gate. The resultant output from "and" switch 409 is passed through "or" switch 421, tubes 422 and 423 to line 450. The signal on line 450 will be switched with a D–10 timing pulse in the "and" switch 425 and passed to the No. 1 control grids of the tubes in the punch scan matrix vertical row for digit 9. The application of the signal to the No. 1 control grid of tube 483 in coincidence with a W–7 timing pulse applied to the No. 2 control grid of tube 483 produces a resultant output which is coupled via line 455 and the N/C contact points 745–3 (Fig. 7*r*) to the D–9 storage exit plughub. This plughub is plugged with the punch magnet plughub for column 2. The signal will serve to energize the punch magnet 491 for column 2. When the punches are actuated a perforation will be made in the "1" index position of column 2 of the record card as shown by Fig. 50.

The card in the punch feed will continue to advance intermittently through each of the index positions 2 through 9. Each of the digital representations 2 through 9 stored in the PBS, W–7, D–8 through D–1 positions, respectively, will be sequentially sensed and produce signals that serve to cause holes to be punched in the record card in the same manner as described above. When the card in the punch feed has been moved past the punch station into the stacker hopper, the digital information will be stored in the record card as shown by Fig. 50.

Recapitulating, it has been shown and described how the data transfer system and controls operate to accomplish a read-out of an illustrative example of numeric data from a drum storage device for punching the data into a record card.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing system, the combination of a data storage device for a word of data having a plurality of possible interpretations, each word including a plurality of digit positions for storing data thereat in preselected coded character representations and a position for a control character to indicate one of a plurality of modes of interpretation for the word, data receiving means, means for selectively transmitting the word of data between said storage device and said data receiving means in the plurality of modes, and means for checking the control character position prior to the delivery of the data word, said last-named means being responsive to a predetermined condition of the control position for transmitting the entire word of data is one of the plurality of modes.

2. In a data processing system, the combination of a data storage device for a group of words, each of the words including a plurality of digit positions for storing data thereat in preselected coded representations and a control position therefor to indicate various modes of interpretation of the related word, data receiving means, selectively operated data delivery means disposed between said storage device and said data receiving means for transmitting the words of data in the mode as predetermined by the condition of the control position, means for interrogating the control position of each data word prior to delivery of the latter to determine the mode of interpretation of the same, and means responsive to the output of said interrogation means for each control position to selectively direct each of the related data words from said storage device over the data delivery means to said data receiving means in one of the various modes.

3. In a data processing system, the combination of a data storage device for an intermixed group of numeric and alphabetic words, comprising a plurality of data words, each of said words including a plurality of digit positions for storing data thereat in preselected coded character representations and a position for a control digit stored therewith to indicate a numeric or alphabetic word, data receiving means, selectively operated data transmission means for delivering data between said storage device and said data receiving means in a numeric or an alphabetic mode, and means for interrogating the control digit position of each data word prior to the delivery of the latter and operative on said selectively operated transmission means to selectively deliver each related data word to said receiving means in either the numeric or alphabetic modes.

4. In a translating system for alphabetic data, the combination of a first storage device for a word of data, said word including a plurality of zone and numeric digit positions for storing data thereat in a first code, each alphabetic character including a zone and a numeric digit position, a second data storage device for the alphabetic word of data including a plurality of zone and numeric digit positions for storing data thereat in a second code, data translation means including first and second sections, selectively operated transmission means for directing the data delivered from said first storage device to said first and second translating sections, means acting on said transmission means for directing the data in all of the zone positions through said first translating section and all of the numeric digit positions through said second translating section to deliver the data in the second code, and means for coupling said first and second translating sections to said second storage device to selectively deliver the data for storage in the zone and numeric digit positions in the second code.

5. In a data translating system for alphabetic and numeric data, the combination of a first storage device for a word of data intermixed with alphabetic and numeric characters, said word including a plurality of zone and numeric digit positions for storing data thereat in first coded character representations, each alphabetic character requiring a zone and numeric digit position and each numeric character requiring at least a numeric digit position in the first code, data translating means including first and second sections, selectively operated data transmission means associated with said first and second sections and said first storage device, means for selecting all of the zone characters in said first storage device representing alphabetic data for delivery over said transmission means to said first translating section and for selecting all of the numeric digit positions representing both alphabetic and numeric data for delivery to said second translating section, a second data storage device having zone and digit positions for storing data in second coded character representations, means for connecting said second storage device to said first and second translating sections to receive the translated data for storage in the zone and numeric digit positions in the second coded character representations, means for detecting numeric values in the alphabetic data word, and means responsive to the detection of the numeric values for modifying the operation of the translating means to maintain the identity of the numeric values.

6. A data transfer system comprising a cyclically movable storage member having a magnetizable surface, a band extending in the direction of movement of said member, said band containing a series of consecutive character positions, magnetic recording means associated with said band for selectively magnetizing said character positions; data storage means capable of storing alphabetic and/or numeric data, sensing means for sensing the data stored in said data storage means and operative to emit signals corresponding to the different kinds of stored characters, and data transfer means coupling said sensing means with said magnetic recording means, said data transfer means including means to sequence the transfer of data from said data storage means to said cyclically movable storage member so that character designations are asynchronously recorded in the character positions of said storage member as they are read from said data storage means.

7. A system for transferring data comprising a cyclically movable member having a magnetizable surface, a band extending in the direction of movement of said member, said band containing a series of character storing positions, magnetic recording means associated with said band for selectively magnetizing said character positions, data storage means comprising a plurality of zone and numeric index positions for storing alphabetic characters according to a predetermined code configuration, means for sensing the data stored in said data storage means and capable of initiating zone and numeric representing signals for each alphabetic character, and means for transmitting the signals to said magnetic recording means in a manner such that the zone representing signals are asynchronously stored magnetically on said cyclically movable member followed by the asynchronous and interspersed storing of numeric representing signals with the previously stored zone representing signals.

8. A system for transferring data comprising a cyclically movable member having a magnetizable surface, a band extending in the direction of movement of said member, said band containing a series of consecutive character positions, magnetic recording means associated with said band for selectively magnetizing said character positions according to a first code configuration, data storage means capable of storing alphabetic and/or numeric data according to a second code configuration, sensing means for sensing the data stored in said data storage means and operative to emit signals corresponding to the different kinds of stored characters, sequencing means connected with said sensing means and operative to sequence the transfer of data representing signals from said sensing means, and data transfer means coupling said sequencing means with said magnetic recording means, said data transfer means including data conversion means for converting the data representing signals according to the second code configuration into signals according to the first code configuration for recording in the character positions of the band on said cyclically movable member.

9. A data transfer system comprising a cyclically movable member having a magnetizable surface, a band extending in the direction of movement of said member, said band containing a series of consecutive character positions, magnetic recording means associated with said band for selectively magnetizing said character positions according to a first code configuration, means for feeding a source record having columns of index positions selectively perforated singly or in combination to represent characters according to a second code configuration, sensing means for simultaneously sensing like perforations in a source record and operative to emit signals at differentially timed intervals corresponding, respectively, to the different kinds of characters which may be represented by the perforations, means connected with the sensing means to sequence the transfer of the character representing signals emitted by said sensing means, conversion means controlled conjointly by the source record feeding means and the sequencing means and operative to selectively emit recording signals representative of the characters of data in the source record according to the first code configuration, and means for coupling the conversion means to the magnetic recording means for said band so that the character representations may be recorded on the cyclically movable member as they are read out of the source record.

10. A system for translating alphabetic and/or numeric characters delivered from a first data storage medium for transfer to a second data storage medium comprising a first and second sensing means for simultaneously sensing like characters encoded in the first data storage medium and operative to emit character representing signals, means responsive to the signals emitted by said first sensing means to manifest the presence of alphabetic and numeric characters, means responsive to said second sensing means and under control of said manifesting means for translating the characters encoded in the first storage medium into digital values representing signals according to a prescribed arbitrary value scale, means coupled to said translating means to sequence the transmission of signals therefrom, said second data storage medium including a cyclically movable storage member having a magnetizable surface and a series of consecutive character storage locations on said surface, magnetic recording means associated with said member for selectively magnetizing said character storage locations, and means coupling said sequencing means to said recording means for asynchronously storing the data characters in the storage locations on said member whereby the transfer and recording of individual characters of the same kind occurs within a single cycle of said member and the transfer and recording of different kinds of characters occurs during respective cycles of said cyclically movable member.

11. A data transfer system comprising a cyclically movable member having a magnetizable surface, a band extending in the direction of movement of said member, said band containing a series of consecutive character positions, magnetic recording means associated with said band for selectively magnetizing said character positions according to a first code configuration, means for feeding a source record having columns of index positions selectively perforated singly or in combination to represent characters according to a second code configuration, first and second sensing means for simultaneously sensing like perforations in a source record and operative to emit signals at different time-spaced intervals corresponding respectively, to the different kinds of characters which may be represented by the perforations, storage means responsive to the signals emitted by the first sensing means to manifest the presence of singly or combinationally occurring perforations in the columns of the source record, means to sequence the transfer of character representing signals emitted by the second sensing means, data transfer means coupling the second sensing means with the sequencing means controlled by the storage means, conversion means controlled conjointly by the source record feeding means and the sequencing means and operative to selectively emit recording signals representing the characters of data in the source record according to the first code configuration, and means for coupling the conversion means to the magnetic recording means for said band so that the character representations may be recorded in the band on the cyclically movable member as they are read out of the source record.

12. A data transfer system comprising a cyclically movable member having a magnetizable surface; a band comprising a plurality of tracks on said member extending in the direction of movement of said member, one track assigned to each element of a first code configuration, each track having a series of consecutive locations for storing an element of a character according to the first code configuration; magnetic recording means associated with each track of said band for selectively magnetizing the element locations; means for feeding a source record having columns of zone and numeric index positions perforated according to a second code configuration to represent alphabetic and/or numeric characters in a field of denominationally ordered columns; first and second sensing means for simultaneously sensing like perforations in a source record and operative to emit signals at differentially timed intervals corresponding, respectively, to the different kinds of characters which may be represented by the perforations; storage means responsive to the signals emitted by the first sensing means to manifest the presence of a numeric perforation occurring alone or with an accompanying zone perforation in the columns of the source record; means to sequence the transfer of character representing signals emitted by said second sensing means so that the perforations representing different kinds of characters are read out during respective cycles of said cyclically member and so that the read-out of like characters occurs during a single cycle of said member; data transfer means controlled by the storage means coupling the second sensing means with the sequencing means; conversion means controlled conjointly by the source record feeding means and the sequencing means and operative to selectively emit a combination of recording signals representing the characters of data in the source record according to the first code configuration; and means for coupling the conversion means to the magnetic recording means for recording the translated data in the selected locations.

13. A data transfer system comprising a cyclically movable member having a magnetizable surface; a band comprising a plurality of tracks on said member extending in the direction of movement of said member, one track assigned to each element of a first code configuration, each track having a series of consecutive locations for storing an element of a character according to the first code configuration; magnetic recording means associated with each track of said band for selectively magnetizing said character positions; means for feeding a source record having columns of zone and numeric index positions perforated according to a second code configuration to represent alphabetic and/or numeric characters in a field of denominationally ordered columns; first and second sensing means for simultaneously sensing like perforations in a source record and operative to emit signals at differentially timed intervals corresponding, respectively, to the different kinds of characters which may be represented by the perforations; storage means responsive to the signals emitted by the first sensing means to manifest the presence of a numeric perforation occurring alone or with an accompanying zone perforation in the columns of the source record; means to sequence the transfer of character representing signals emitted by said second sensing means so that the perforations representing different kinds of characters are read out during respective cycles of said cyclically movable member and so that the read-out of like characters occurs during a single cycle of said member; data transfer means controlled by the storage means coupling the second sensing means with the sequencing means; signal generating means conditionally coupled with the sequencing means under control of said storage means for supplementing the numeric representing signals emitted by the second sensing means when the data transfer system is operating in an alphabetic mode; conversion means controlled conjointly by the source record feeding means and the sequencing means and operative to selectively emit a combination of recording signals representing the characters of data in the source record according to the first code configuration; and means for coupling the conversion means to the magnetic recording means for said band so that the character representations may be recorded in the band on the cyclically movable member as they are read out of the source record.

14. A data transfer system comprising a cyclically movable member having a magnetizable surface; a band comprising a plurality of tracks on said member extending in the direction of movement of said member, one track being assigned to each element of a first code configuration, each track having a series of consecutive locations for storing an element of a character according to the first code configuration; magnetic recording means associated with each track of said band for selectively magnetizing said locations; timing means controlled by said cyclically movable member serving to produce a cyclically occurring pattern of timing signals; means for feeding a source record having columns of zone and numeric index positions perforated according to a second code configuration to represent alphabetic and/or numeric characters in a field of denominationally ordered columns; first and second sensing means for simultaneously sensing like perforations in a source record and operative to emit signals at differentially timed intervals corresponding, respectively, to the different kinds of characters which may be represented by the perforations; storage means responsive to the signals emitted by the first sensing means to manifest the presence of a numeric perforation occurring alone or with an accompanying zone perforation in the columns of the source record; means to sequence the transfer of character representing signals emitted by said second sensing means controlled by said cyclically occurring pattern of timing signals so that the perforations representing different kinds of characters are read out during respective cycles of said cyclically movable member and so that the read-out of like characters occurs during a single cycle of said member; data transfer means controlled by the storage means coupling the second sensing means with the sequencing means; signal generating means conditionally coupled with the sequencing means under control of the storage means for supplementing the numeric representing signals emitted by the second sensing means when the data transfer system is operating in an alphabetic mode; conversion means controlled conjointly by the source record feeding means and the sequencing means and operative to selectively emit a combination of recording signals representing the characters of data in the source record according to the first code configuration; and means for coupling the conversion means to the magnetic recording means for recording the translated data at the selected locations in said track.

15. A data transfer system comprising a storage means adapted to store alphabetic and/or numeric data according to a prescribed arbitrary digital value code including first and second digital positions for each character representation; a predetermined portion of said storage means being reserved for the storage of a control word having at least one control digit for each word of data stored in said storage means; timing means controlled by said storage means serving to produce a cyclically occurring pattern of timing signals; a recording station including a plurality of recording devices; record feeding means adapted to advance a record intermittently through said recording station; means associated with said first storage means and operative to produce signals representative of the digital characters stored in said storage means; a translator coupled with said signal producing means and under control of said record feeding means and a word instruction signal being operative to translate the signals delivered from said first and second digital positions into character representing signals according to a second system of notation; means coupled with said translator and under control of said record feeding means and signals from said timing means for manifesting all like-character representing signals; and means under control of said manifesting means coupled with said perforating devices for operating the same so that all like characters are simultaneously recorded on the record.

16. A data transfer system comprising a first storage medium adapted to store data characters according to a first code configuration, said first storage medium being capable of storing a plurality of data words comprising alphabetic and/or numeric characters, each alphabetic and numeric character in an alphabetic word being represented by a zone digit and a numeric digit occupying a pair of storage positions in said first storage medium, each numeric character in a numeric word being represented by a single digit stored in individual storage positions in said first storage medium; a predetermined portion of said first storage medium adapted to store a control word having at least one control digit for each word of data stored in said storage medium; means associated with said first storage medium for producing signals representative of the stored digits; a second data storage medium adapted to store data according to a second code configuration; means responsive to said control digits for translating the same into word instruction signals; conversion means coupled with said signal producing means and controlled by the word instruction signals to translate pairs of zone and numeric digit representing signals into signals according to said second code configuration; means coupled with said conversion means and under control of said second storage medium for selectively and cyclically manifesting all like character representing signals delivered from the zone digit positions and the numeric digit positions of said first storage medium; and means under control of said manifesting means for recording the data in said second data storage medium.

17. A data transfer system comprising a cyclically movable member having a magnetizable surface; a band comprising a plurality of tracks on said member extending in the direction of movement of said member, one track being assigned to each bit element according to a first code configuration, each track having a series of consecutive locations for storing bit elements of a character according to the first code configuration, said band being capable of storing a plurality of data words comprising alphabetic and/or numeric characters, each alphabetic and numeric character in an alphabetic word being represented by a zone digit and a numeric digit occupying a pair of adjacent storage positions on said band, each numeric character in a numeric word being represented by a single digit stored in individual storage positions on said band; a predetermined portion of said band adapted to store a control word having at least one control digit for each word of alphabetic data stored on said band; transducing means associated with each of said tracks for producing signals representative of bit element storage; a punch station including a plurality of card perforating devices; card feeding means adapted to advance blank record cards having rows of index points arranged thereon to be successively positioned in alignment with said punch station; means responsive to said control digits for translating the same into word instruction signals; conversion means coupled with said transducing means and controlled by the word instruction signals to translate pairs of zone and numeric digit representing signals into signals according to a second code configuration; means coupled with said conversion means and under control of said card feeding means for selectively and successively manifesting all like-character representing signals from the zone digit positions and the numeric digit positions which are transferred from said band within a single cyclic of said member; and means under control of said manifesting means for operating said perforating devices so that all like index position perforations are simultaneously made in a record card.

18. A data transfer system comprising a cyclically movable member having a magnetizable surface, a band on said member extending in the direction of movement of said member and containing a series of consecutive digit storage positions for storing digital representations according to a first code configuration, said band capable of storing a plurality of data words, said data words comprising alphabetic and/or numeric characters, each alphabetic and numeric character in an alphabetic word being represented by a zone digit and a numeric digit occupying a pair of digital storage positions on said band, each numeric character in a numeric word being represented by a single digit stored in individual storage positions on said band; a predetermined portion of said band for the storage of a control word having at least one control digit for each word of data stored on said band; reading means associated with said band for producing digital representing signals; timing means controlled by said cyclically movable member serving to produce a cyclically occurring pattern of timing signals; a punch station including a plurality of card perforating devices; card feeding means adapted to advance blank record cards having rows of index points arranged thereon to be successively and intermittently positioned in alignment with said punch station; means for translating said control digits into word instruction signals; conversion means connected with said reading means and controlled by the alphabetic word instruction signals and operative to combine and translate pairs of zone and numeric digital representing signals according to the first code into signal representations according to a second code; an intermediate storage means controlled conjointly by signals emitted by said conversion means, signals from said timing means, and by the card feeding means for successively storing all like zone digit representing signals delivered from said band within a single cycle of said member followed by the successive storing of all like numeric digit representing signals delivered from said band within succeeding single cycles of said member; and means under control of said intermediate storage means for operating said perforating devices so that all like index position perforations are simultaneously made in the record card.

19. A data transfer system comprising a cyclically movable storage member having a band thereon extending in the direction of movement of said member and containing a series of consecutive digit storage locations adapted to store alphabetic and/or numeric data according to a prescribed arbitrary digital value code including first and second digital positions for each character representation; a predetermined portion of said band being reserved for the storage of a control word having one control digit for each word of alphabetic data stored on said band; timing means controlled by said cyclically movable member serving to produce a cyclically occurring pattern of timing signals; a punch station including a plurality of card perforating devices; card feeding means adapted to advance record cards having columns of zone and numeric index positions arranged thereon for storing data according to a combinational code so that the rows of zone and numeric positions are successively positioned in alignment with said punch station; transducing means associated with said band and operative to serially produce signals representative of the digital characters stored on said band; a translator comprising first and second switching means coupled with said transducing means and under control of said card feeding means and a word instruction signal, said first switching means being operative to translate the signals from the first digital positions on said storage member into zone representing signals according to said combinational code, said second switching means being operative to translate the signals from the second digital positions and control digit positions on said storage member into numeric representing signals according to said combinational code; means coupled with said translator and under control of said card feeding means and signals from said timing means for successively manifesting all like-zone representing signals which are transferred from said first digital positions within a single cycle of said storage member followed by the successive manifestations of all like numeric representing signals which are transferred from said second digital positions with succeeding single cycles of said storage member; means for converting said control digits into word instruction signals; pluggable rearranging means coupling said manifesting means with said converting means; and means under control of said manifesting means pluggably coupled with said perforating devices for operating the same so that all like-index positions are simultaneously made in a record card as each of the zone and then the numeric index positions are intermittently and successively moved through the punch station.

20. A data transfer system comprising a cyclically movable storage member having a band thereon extending in the direction of movement of said member and containing a series of consecutive digit storage locations adapted to store alphabetic and/or numeric data according to a prescribed arbitrary digital value code including first and second digital positions for each character representation; a predetermined portion of said band being reserved for the storage of a control word having one control digit for each word of data stored on said band; timing means controlled by said cyclically movable member serving to produce a cyclically occurring pattern of timing signals; a recording station including a plurality of recording devices; record feeding means adapted to advance a record arranged for storing data thereon according to a combinational code; transducing means associated with said band and operative to serially produce signals representative of the digital characters stored on said band; a translator comprising first and second switching means coupled with said transducing means and under control of said second feeding means and a word instruction signal, said first switching means being operative to translate the signals from the first digital positions on said storage member into zone representing signals according to said combinational code, said second switching means being operative to translate the signals from the second digital positions and control digit positions on said storage member into numeric representing signals according to said combinational code; means coupled with said translator under control of said record feeding means and signals from said timing means for successively manifesting all like-zone representing signals which are transferred from said first digital positions within a single cycle of said storage member followed by the successive manifestations of all like-numeric representing signals which are transferred from said second digital positions within succeeding single cycles of said storage member; means for converting said control digits into word instruction signals; pluggable rearranging means coupling said manifesting means with said converting means; and means under control of said manifesting means pluggably coupled with said recording devices for operating the same so that all like-character recordings in accordance with said combinational code are simultaneously made on the record as it is moved through the record station.

21. A data transfer system comprising a cyclically movable storage member, a band comprising a plurality of tracks on said member extending in the direction of movement of said member, one track being assigned to each bit value according to a first code configuration, each track having a series of consecutive locations for magnetically storing a bit element of a character according to the first code configuration, said band being capable of storing a plurality of data words comprising alphabetic and/or numeric characters, each alphabetic and numeric character in an alphabetic word being represented by a first and a second digit according to a prescribed arbitrary digital value scale and occupying a pair of adjacent character storage positions on said band, each numeric character in a numeric word being represented by a single digit stored in individual character storage positions on said band; a predetermined portion of said band adapted to store a control word having one control digit for each word of alphabetic data stored on said band; transducing means associated with each of said tracks for serially producing signals representative of bit elements stored in the respective track of said band; means responsive to said control digits for translating the same into word instruction signals; a punch station having a row of card perforating devices; card feeding means adapted to advance blank record cards having rows of index points arranged thereon so that the rows of index positions are successively positioned in alignment with said punch station; a translator having a first digit section, a second digit section, each coupled with said transducing means for translating the signals according to said first code configuration into signals according to a second code configuration; said first digit section under control of said word instruction signals, said card feed means responsive to the first digit signals for characters within alphabetic words for conversion into signals according to said second code configuration; said second digit section under control of said card feed means and responsive to second digit representations of characters within alphabetic words and single digit representations for numeric characters in numeric words for conversion into signals according to said second code configuration; means coupled with said first and second digit sections and responsive to the signals therefrom and under control of said card feed means to successively manifest all like-digit representing signals which are transferred from the first digit sections of said band within a single cycle of said member followed by the successive manifestations of all like-digit representing signals which are transferred from the second digit sections of said band within succeeding single cycles of said member; and means under control of said manifesting means for operating said perforating devices so that all like-index position data recording perforations are simultaneously made in the record card as it is advanced in the card feeding means.

22. A data translating device for translating data delivered from a first storage medium having a plurality of storage locations adapted to store alphabetic and/or numeric data according to a prescribed arbitrary digital value scale including first and second digital positions for each character representation for delivery to a second storage medium having zone and numeric element storage positions for each character representation stored therein according to a combination code configuration, comprising a plurality of lines for receiving signals from the first storage medium, a plurality of lines for delivering signals to the second storage medium, the translator having a first digit section and a second digit section, and means coupled with said first and second digit sections for selectively gating the digital data through the translator for application to said output signal lines for transfer to said second storage medium.

23. A system for translating alphabetic and/or numeric data comprising a cyclically movable storage member having a series of consecutive storage locations and adapted to store alphabetic and/or numeric data according to a prescribed arbitrary value scale, magnetic reading means associated with said member for producing character representing signals, means coupled with said magnetic reading means for translating the character representing signals into codal form, means coupled with said translating means for manifesting all like character signals read out of said cyclically movable storage member during a single cycle, a static storage means, and means coupling said static storage means with said manifesting means so that all like characters represented therein can be simultaneously transferred to said static storage means for recording therein, the transfer of different kinds of characters occurring during respective cycles of said cyclically movable member.

24. A data processing device for translating data delivered from a first storage medium having a series of consecutive storage locations adapted to store alphabetic and/or numeric data according to a prescribed arbitrary digital value scale including single digit repretentation for numeric characters and first and second digit representation for alphabetic characters with bit elements of storage in each digital position according to a first code configuration for delivery to a second storage medium adapted to store data according to a second code configuration including a numeric element representation for numeric characters and zone and numeric element representation for alphabetic characters comprising a plurality of input signal lines for receiving bit element signals significant of digital representations according to the first code configuration from the first storage medium, a plurality of output signal lines according to the second code configuration for delivering signals to the second storage medium, a translator having a first digit section and a second digit section for receiving the first and second digit representations, and means coupled with said first and second digit sections for selectively gating the digital character representations through the translator for application to said output signal lines, said first digit section being responsive to first digit representations of alphabetic characters for conversion into zone element representations according to said second code configuration, said second digit section being responsive to second digit representations of alphabetic characters and single digit representations for numeric characters for conversion into numeric element representations according to said second code configuration.

25. A data translating device for translating data delivered parallel by bit and serially by digit from a first storage medium having a series of consecutive storage locations adapted to store alphabetic and/or numeric data words, each comprising a predetermined number of characters according to a prescribed arbitrary digital value scale including single digit representations for numeric words and first and second digit representations for alphabetic and numeric characters within alphabetic words with bit elements of storage in each digital position according to a first code configuration for delivery to a second storage medium adapted to store data according to a second code configuration including a numeric element representation for numeric characters and zone and numeric element representation for alphabetic characters comprising a plurality of input signal lines for receiving bit element signals significant of digital representations according to the first code configuration from the first storage medium; a plurality of output signal lines according to the second code configuration for delivering signals to the second storage medium; the translator having a first digit section, a second digit section, and a single digit buffer device; and means coupled with said first and second digit sections and said single digit buffer device for selectively gating the digital character representations through the translator for application to said output signal lines; said first digit section being responsive to first digit representations of characters within alphabetic words for conversion into zone element representations according to said second code configuration, said second digit section being responsive to second digit representations of characters within alphabetic words and single digit representations for numeric characters in numeric words for conversion into numeric element representations according to said second code configuration, said single digit buffer operative to store first digit representations of characters within alphabetic words for comparison with second digit representations of characters within alphabetic words for distinguishing between like zone and numeric digital representations.

26. In a translating system for alphabetic and numeric data, the combination of a first storage device for groups of alphabetic and numeric data words comprising alphabetic and numeric characters, each word including a plurality of digit positions for storing data thereat in a first code, each numeric word having a single digit position for each numeric character and each alphabetic character in the alphabetic words occupying a pair of digits defined by a zone and a numeric digit position, a control digit position associated with each of said words, data translating means including first and second sections for converting the delivered data to a second code, selectively operated transmission means coupling said first and second sections to said first storage device, means for interrogating the control digit position of each of the data words prior to the delivery of the same, means dependent upon the condition of the control digit position of each word for conditioning said transmission means for delivery of the related data to said translating means in the alphabetic or numeric modes, a second storage device coupled with said first and second translating sections to receive data delivered thereby, said second storage device having a plurality of digit positions for storing the delivered data in the second code wherein the alphabetic characters occupy a pair of digits defined by a zone and numeric digit position, and means for sensing and then directing all of the zone positions of a alphabetic word over said transmission means to said first section for translating to the second code and later storage in zone positions in said second storage device, said sensing means being thereafter operative to direct all of the numeric digit positions in both the alphabetic and numeric words through said second translating section for conversion therein and delivery to all of the numeric digit receiving positions in said second storage device.

27. In a translating system for alphabetic and numeric data, the combination of a first storage device for groups of numeric and alphabetic words of data wherein an alphabetic word contains at least one numeric value along with the alphabetic characters, each word including a plurality of digit positions for storing data thereat in a first code, each numeric word having a single digit position for each numeric character and each alphabetic character in the alphabetic words occupying a pair of digit positions and defining a zone and a numeric digit, a control digit position associated with each of said words, data translating means including first and second sections for converting the delivered data to a second code, selectively operated transmission means coupling said first and second sections and said first storage device, means for interrogating the control digit position of each of the data words prior to the delivery of the same, means dependent upon the condition of the control digit position for each word for conditioning said transmission means for delivery of the related data to said translating means in the alphabetic or numeric modes, a second storage device coupled with said first and second translating sections to receive data delivered thereby, said second storage device having a plurality of digits for storing the delivered data in the second code wherein the translated numeric characters occupy single digit positions in numeric words and the alphabetic and numeric characters in the alphabetic words occupy a pair of digit positions defined by a zone and a numeric digit, means for sensing and directing all of the zone positions of an alphabetic word over said transmission means for delivery to said first section for translation to the second code and later storage in the zone positions in said second storage device, said sensing means being thereafter operative to direct all of the numeric digit positions in both the alphabetic and numeric words through said second translating section for conversion therein and delivery to all of the numeric digit receiving positions in said second storage device, and means operative during the sensing of the zone positions of an alphabetic word for inserting a character in the related zone position for each numeric character to be stored in said second storage device.

28. In a translating system for alphabetic and numeric data, the combination of a first storage device for a word of data including at least one alphabetic and a numeric character, said word including a plurality of zone and numeric digit positions for storing data thereat in a first code, each alphabetic character occupying a zone and numeric digit position and each numeric character having a single numeric digit position, data translating means including first and second sections for converting the delivered data to a second code, selectively operated transmission means coupling said translation means and the first storage device, a second storage device coupled with said first and second translating sections to receive the data delivered thereby, said second storage device having a plurality of zone and numeric digit positions for storing the data delivered thereto wherein each translated alphabetic and numeric character occupies a zone and a numeric digit position, means for sensing and directing all of the zone positions of the alphabetic characters over said transmission means and through said first translating section for storage in the respective zone positions in the second code in said second storage device, said sensing means being thereafter effective to direct all of the numeric digit positions for both the alphabetic and numeric characters through said second translating section for conversion therein and delivery to all of the numeric digit receiving positions in said second storage device, and means operative after the sensing of the last zone position in the first storage device for generating a related zone position character for each numeric character to be stored in said second storage device.

29. The combination as claimed in claim 28 wherein said first storage device includes a data storage index position wherein an alphabetic character zone indication and a numeric character representation occupy a common index position, said sensing means including a pair of separate sensing stations, means for consecutively passing the stored data through the first and second sensing stations, switch means associated with said first sensing station and selectively operative by the alphabetic and numeric data therein to modify said transmission means leading to the first and second translating sections, and means operative when the common zone and numeric position in said storage device passes said second sensing station, in the absence of a numeric value following the zone indication in the first sensing station, for generating a numeric zone character for transmission through said first translating section to the zone positions in said second storage device.

30. The combination as claimed in claim 29 including means for generating a specific zone character as the stored data passes the second sensing station, in the absence of a zone indication at the first sensing station, for delivery through said first translating section to said second storage device.

31. In a data translating system, the combination of a first storage device including a record card for a word of data having a plurality of columns selectively perforated to store data characters therein, said word including a plurality of zone and numeric digit positions for storing the characters thereat in a first code, data translating means including first and second sections for converting the delivered data to a second code, a selectively operated transmission means coupling said translation means and said first storage device, a second storage device coupled with said first and second translating sections to receive the data delivered thereby, said second storage device having a plurality of zone and numeric digit positions for storing the data delivered thereto and wherein each character occupies a zone and a numeric digit position, means for sensing and directing all of the zone positions of the characters over said transmission means and through said first translating section for storage in respective zone positions in the second code in said second storage device, said sensing means being thereafter effective to direct all of the numeric digit positions through said second translating section for conversion therein and delivery to all of the numeric digit receiving positions in said second storage device, and means associated with said sensing means and operative, in the absence of a perforation in any one of the columns, for directing a blank column character over said transmission means to the first and second translating sections for storage in the appropriate zone and numeric digit positions in said second data storage device.

32. A data transfer system comprising a first storage medium containing a series of digit storage positions for storing digital representations according to a first code configuration, said storage medium capable of storing a plurality of data words comprising alphabetic and/or numeric characters, each alphabetic and numeric character in an alphabetic word being represented by a zone digit and a numeric digit occupying a pair of digital storage positions in said first storage medium, each numeric character in a numeric word being represented by a single digit stored in individual storage positions in said storage medium; a predetermined portion in said storage medium for the storage of a control word having at least one control digit for each word of data stored in said storage medium; signal producing means associated with said storage medium for producing digital representing signals; a punch station including a plurality of card perforating devices; feeding means adapted to advance blank record cards having rows of index points arranged thereon to be successively and intermittently positioned in alignment with said punch station; means for translating said control digits into word instruction signals; conversion means connected with said signal producing means and controlled by the word instruction signals and operative to combine and translate series of zone and numeric digital representing signals according to the first code into signal representations according to a second code; intermediate storage means controlled conjointly by signals emitted by said conversion means and by the card feeding means for successively storing all like zone digit representing signals delivered from said first storage medium followed by the successive storing of all like numeric digit representing signals delivered from said first storage medium; and means under control of said intermediate storage means for operating said perforating devices so that all like index position perforations are simultaneously made in the record card.

33. A data transfer system comprising a first storage medium adapted to store data characters according to a first code configuration, said first storage medium being capable of storing a plurality of data words comprising alphabetic and/or numeric characters, each alphabetic and numeric character in an alphabetic word being represented by a zone digit and a numeric digit occupying a pair of storage positions in said first storage medium, each numeric character in a numeric word being represented by a single digit stored in individual storage positions in said first storage medium; a predetermined portion of said first storage medium adapted to store a control word having at least one control digit for each word of data stored in said storage medium; means associated with said first storage medium for producing signals representative of the stored digits; a second data storage medium adapted to store data according to a second code configuration; means responsive to said control digits for translating the same into word instruction signals; a translator having a first digit section, a second digit section, and a single buffer device coupled with said signal producing means and controlled by the word instruction signals to translate pairs of zone and numeric digit representing signals into signals according to said second code configuration; said first digit section being responsive to first digit representations of characters within alphabetic words for conversion into zone element representations according to said second code configuration, said second digit section being responsive to second digit representations of characters within alphabetic words and single digit representations for numeric characters in numeric words for conversion into numeric element representations according to said second code configuration, said single digit buffer operative to store first digit representations of characters within alphabetic words for comparison with second digit representations of characters within alphabetic words for distinguishing between like zone and numeric digital representations; means coupled with said translator and under control of said second storage medium for selectively and cyclically manifesting all like character representing signals delivered from the zone digit positions and the numeric digit positions of said first storage medium; and means under control of said manifesting means for recording the data in said second data storage medium.

34. In a data translating system for alphabetic and numeric data, the combination of a first storage device for groups of alphabetic data words comprising alphabetic and numeric character representations, each word including a plurality of digit positions for storing data thereat in a first code, the numeric character representations in the data words occupying a pair of digit positions for each numeric and alphabetic character appearing in an alphabetic word, a control digit associated with each word whose condition determines the mode of translation of the related data word, data translating means including first and second sections for converting the delivered data to a second code, transmission means coupling said first storage device to said translating means, means for interrogating the control digits of each of the data words, switching means associated with said interrogation means and responsive to the condition of the control digits for conditioning said translating means to receive the delivered word of data in the alphabetic and numeric modes, means for selecting and delivering the zone digit position of each alphabetic word over said transmission means to said first translating section and for selectively directing the data at the numeric digit positions to said second translating section, means for retaining the numeric digit data in said second translating section for comparison with the related zone data in the first translating section to determine whether the numeric digit data represents a numeric character, means for blocking the delivery of the zone character if a numeric character is indicated, and data receiving means coupled with said translating means for receiving the data delivered therefrom.

No references cited.